(12) United States Patent
Edmonds et al.

(10) Patent No.: US 10,538,911 B2
(45) Date of Patent: Jan. 21, 2020

(54) STRUCTURAL SUBFLOOR PRODUCT AND METHOD OF MANUFACTURING SAME

(71) Applicant: Innovative Construction Technologies, LLC, Cleveland, OH (US)

(72) Inventors: Robert Edmonds, Chagrin Falls, OH (US); Brian Siers, Kirtland, OH (US)

(73) Assignee: Innovative Construction Technologies, LLC, Cleveland, OH (US)

( * ) Notice: Subject to any disclaimer, the term of this patent is extended or adjusted under 35 U.S.C. 154(b) by 0 days.

(21) Appl. No.: 16/285,152

(22) Filed: Feb. 25, 2019

(65) Prior Publication Data

US 2019/0186125 A1 Jun. 20, 2019

Related U.S. Application Data

(63) Continuation-in-part of application No. 15/797,651, filed on Oct. 30, 2017, now Pat. No. 10,214,900.
(Continued)

(51) Int. Cl.
*E04B 1/82* (2006.01)
*E04F 15/02* (2006.01)
(Continued)

(52) U.S. Cl.
CPC .............. *E04B 1/8209* (2013.01); *B32B 7/05* (2019.01); *B32B 7/12* (2013.01); *E04B 1/8409* (2013.01);
(Continued)

(58) Field of Classification Search
CPC ..... E04F 15/041; E04F 15/107; E04F 15/102; E04F 15/02016; E04F 15/02022; E04F 15/091; E04F 15/096; E04F 15/0203; E04F 15/02038; E04F 15/02044; E04F 15/0215; E04F 2290/041; E04F 2201/0107;
(Continued)

(56) References Cited

U.S. PATENT DOCUMENTS 1,995,264 A * 3/1935 Mason .................. E04F 15/022
  52/591.1
7,181,891 B2 * 2/2007 Surace ..................... B32B 7/12
  52/642

(Continued)

*Primary Examiner* — Babajide A Demuren
(74) *Attorney, Agent, or Firm* — Benesch, Friedlander, Coplan & Aronoff LLP

(57) ABSTRACT

A flooring product is disclosed herein. The flooring product comprises a pair of oriented strand boards and an acoustic barrier layer. Each oriented strand board includes a first surface, a second surface, a first profiled edge, a stepped section, a second profiled edge, and a recessed section. The acoustic barrier layer is positioned between and at least partially secured to the oriented strand boards. Upon the securing of the acoustic barrier layer to the oriented strand boards, the stepped sections are arranged to form a tongue, where the acoustic barrier layer extends from the tongue to form a first rounded bulge. The recessed sections are arranged to form a groove, where the acoustic barrier layer extends into the groove to form a second rounded bulge. When two flooring products are assembled, the first rounded bulge of one flooring product contacts the second rounded bulge of the other flooring product.

14 Claims, 54 Drawing Sheets

Related U.S. Application Data which is a continuation of application No. 15/490,422, filed on Apr. 18, 2017, now Pat. No. 9,803,358, which is a continuation of application No. 15/150,792, filed on May 10, 2016, now Pat. No. 9,771,726.

(60) Provisional application No. 62/252,125, filed on Nov. 6, 2015, provisional application No. 62/163,201, filed on May 18, 2015.

(51) Int. Cl.
*E04F 15/10* (2006.01)
*E04B 1/84* (2006.01)
*B32B 7/05* (2019.01)
*B32B 7/12* (2006.01)

(52) U.S. Cl.
CPC ...... *E04F 15/02038* (2013.01); *E04F 15/102* (2013.01); *E04F 15/107* (2013.01); *B32B 2307/102* (2013.01); *B32B 2307/514* (2013.01); *B32B 2419/04* (2013.01); *E04F 2201/0107* (2013.01); *E04F 2203/06* (2013.01); *E04F 2290/041* (2013.01)

(58) Field of Classification Search
CPC .. E04F 2203/06; E04B 1/8409; E04B 1/8209; B32B 7/05; B32B 7/12
See application file for complete search history.

(56) References Cited

U.S. PATENT DOCUMENTS

| | | | |
|---|---|---|---|
| 8,397,864 B2* | 3/2013 | Tinianov | E04B 1/86 181/290 |
| 9,394,697 B2* | 7/2016 | Ramachandra | B32B 37/1207 |
| 2007/0094950 A1* | 5/2007 | Surace | B32B 7/12 52/144 |
| 2009/0223162 A1* | 9/2009 | Chen | E04F 15/02 52/588.1 |
| 2009/0277128 A1* | 11/2009 | Chen | E04C 2/12 52/782.1 |
| 2018/0187424 A1* | 7/2018 | Chen | E04F 15/107 |

* cited by examiner

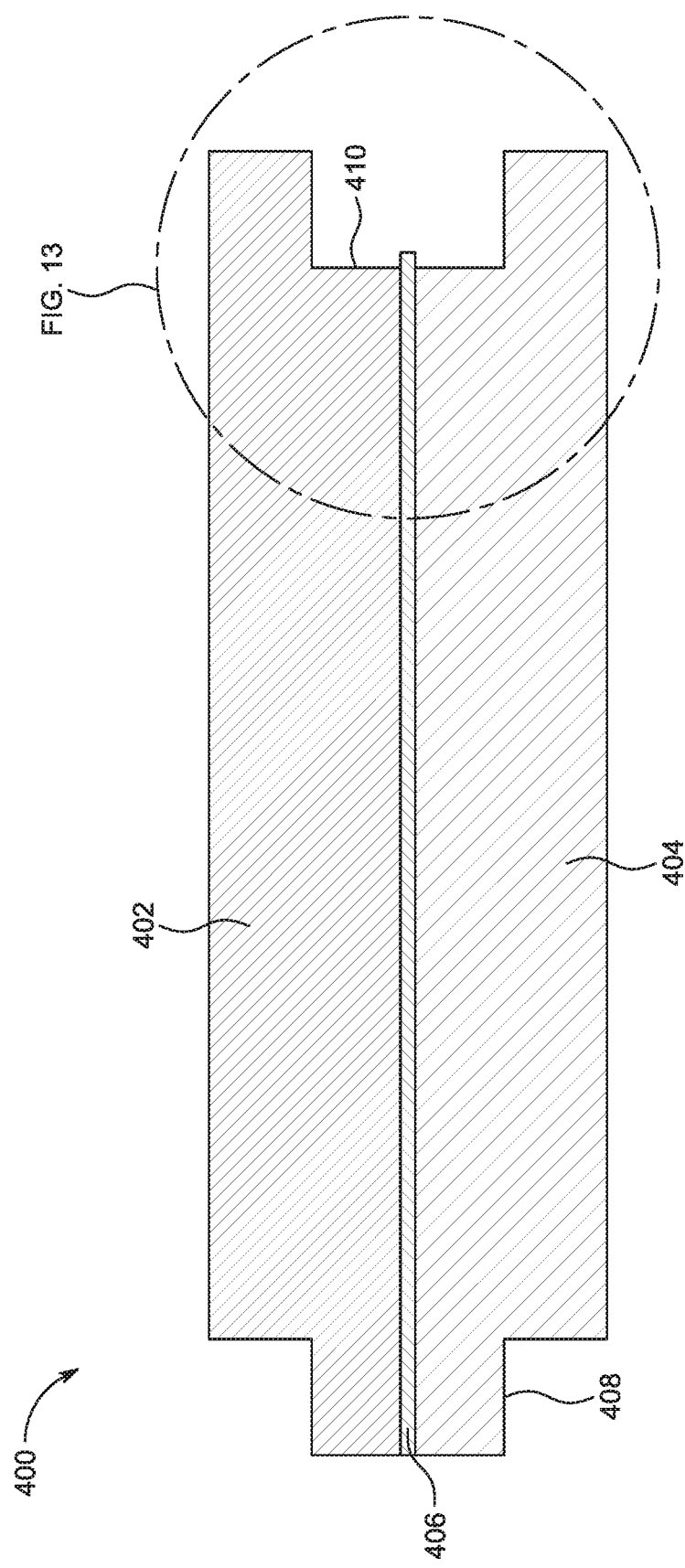

STRUCTURAL SUBFLOOR PRODUCT AND METHOD OF MANUFACTURING SAME

RELATED APPLICATION

This application claims priority to U.S. patent application Ser. No. 15/797,651, titled "Structural Subfloor Product and Method of Manufacturing Same," filed on Oct. 30, 2017, now U.S. Pat. No. 10,214,900, which claims priority to U.S. patent application Ser. No. 15/490,422, titled "Structural Subfloor Product and Method of Manufacturing Same," filed on Apr. 18, 2017, now U.S. Pat. No. 9,803,358, which claims priority to U.S. patent application Ser. No. 15/150,792, titled "Floor Product and Method of Manufacturing Same," filed on May 10, 2016, now U.S. Pat. No. 9,771,726, which claims priority to U.S. Provisional Patent Application Ser. No. 62/163,201, titled "Floor Assembly System and Method for Acoustic Barrier," which was filed on May 18, 2015, and U.S. Provisional Patent Application Ser. No. 62/252,125, titled "Floor Assembly System and Method for Acoustic Barrier," which was filed on Nov. 6, 2015, all of which are expressly incorporated by reference herein in its entirety.

FIELD OF INVENTION

The present disclosure generally relates to systems and methods for forming barriers to the propagation of acoustic energy. More specifically, the present disclosure relates to multi-layered products and methods of manufacturing and assembling such multi-layer products for use as flooring that facilitate forming barriers to the propagation of acoustic energy that meet or exceed building code requirements as tested by a Sound Transmission Class protocol and as tested by an Impact Insulation Class protocol.

BACKGROUND

It is common to create barriers to the transfer or propagation of acoustic energy (e.g. noise) from one location to another. Noise generated in one location may be unwanted and unwelcomed in an adjacent location. One common situation where it is desirable to control acoustic energy is in enclosed structures that house multiple groups of people such as multi-family residential and multi-tenant commercial buildings. Specifically, in a multi-family residential apartment building, condominium building, or hotel, occupants have expectations that they can enjoy the comfort of their residence, offices, and other such spaces without disturbances caused by noise generated by adjacent neighbors.

As will be understood, in a multi-family residential building, for example, noise can propagate from one apartment to an adjacent apartment through the walls separating apartments located on the same story of the building and through the floor/ceiling separating adjacent apartments located on different stories of the building. With regard to noise propagating through a floor/ceiling of adjacent apartments, the noise can be "air-borne" (which can be measured by standardized Sound Transmission Class testing) or caused by "impact" (which can be measured by standardized Impact Insulation Class testing). Air-borne noise is typically generated by occupants conversing, televisions, stereos, etc. Impact noise is typically generated by objects impacting the floor of one apartment and propagating to the apartment below. For example, items dropped on the floor, or occupants walking with hard-soled shoes on wood or tiled flooring can generate unwanted impact noise in the apartment below.

For current multi-occupant buildings, builders commonly use a cementitious underlayment product such as gypsum concrete (sometimes referred to as Gyp-Crete®) to create acoustic dampening between adjacent stories of the building. Cementitious underlayment products have some sound reduction properties; however, the use of cementitious underlayment products and other similar products pose significant challenges for builders. One significant issue is that such products are applied as a wet product (e.g., poured as a thick fluid onto a subfloor) into an otherwise dry environment (e.g., a wood framed building). When such a wet product is applied to a dry environment, the moisture can adversely affect the building process. Issues such as warping of wooden elements, splashing onto unintended surfaces, etc. are common. Furthermore, introducing moisture into any environment increases the chances of mold growth in the environment, which is always an unwanted condition. Another issue is that the application of any wet product typically requires a drying, curing, or setting period following the pouring or application of the wet product. Such periods can cause delays in construction and complicate the planning and project management between various contractors and workers. An additional issue with pouring processes such as applying cementitious underlayment products is that the pouring processes can be limited by weather conditions such as ambient temperature. Both high and low temperatures can negatively affect the pouring of cementitious underlayment products, and thus, create delays and unpredictability in the construction processes.

It would be advantageous to develop products, assemblies, systems and methods for facilitating the constructing the floor/ceiling structure of multi-occupant buildings that provide for acoustic controlling properties and overcome the limitations of using prior art techniques and products such as cementitious underlayment products.

SUMMARY

In one embodiment, a flooring product includes a first oriented strand board layer, an acoustic barrier layer, and a second oriented strand board layer. The acoustic barrier layer is secured between the first oriented strand board layer and the second oriented strand board layer to form the flooring product. The flooring product can be arranged such that a plurality of flooring products can be positioned adjacently to comprise a complete flooring assembly for a portion of a room, the entire room, or a story of a building.

A flooring product can be dimensionally arranged such that the flooring product can be efficiently transported from one location to another and efficiently installed during construction of a building. For example, the flooring product can be arranged so that a single workman or a pair of workman can efficiently transport the flooring product from a storage or staging area to the installation location. Select exemplary embodiments include flooring products that are dimensionally arranged as a four foot by eight foot flooring product, a two foot by eight foot product, and so on.

The flooring product can be arranged with features that facilitate securing or engaging one flooring product to another adjacent flooring product to form a flooring assembly. For example, the flooring product can be arranged to form a tongue and groove joint where one edge of each flooring product can be arranged as a tongue and an opposing edge of the flooring product can be arranged as a groove. Thus, the tongue of one flooring product can be fitted into the groove of an adjacent flooring product to secure or engage the two flooring products together.

In another embodiment, the flooring product can be arranged to form a lap joint where one edge of each flooring product can be arranged as a top lap portion and an opposing edge of the flooring product can be arranged as a bottom lap portion. Thus, the top lap portion of one flooring product can be secured to or engaged with the bottom lap portion of an adjacent flooring product to secure or engage the two flooring products.

In another embodiment, flooring products can include edges that are arranged for tongue and groove joints as well as edges arranged for lap joints. For example, in a two foot by eight foot flooring product, one eight foot edge can be arranged as a tongue, the opposite eight foot edge can be arranged as a groove, one two foot edge can be arranged as a top lap portion, and the opposite two foot edge can be arranged as a bottom lap portion. In such an arrangement, a plurality of flooring products can be positioned such that adjacent flooring products can be secured or engaged by tongue and groove joints along the eight foot edges and secured or engaged by lap joints along the two foot edges. A plurality of flooring products so secured or engaged can form a flooring assembly that forms a continuous floor for a portion of a room, an entire room, a portion of a story of a building, or the entire story of a building.

In another embodiment, a method of manufacturing a flooring product comprises the steps of preparing a first surface of a first oriented strand board, preparing a first surface of a second oriented strand board, and preparing a first surface and second surface of an acoustic barrier layer. The method further comprises the steps of applying an adhesive to the first surface of the first oriented strand board, and applying an adhesive to the first surface of the second oriented strand board. The method further comprises the steps of placing the first surface of the first oriented strand board in contact with the first surface of the acoustic barrier layer, and placing the first surface of the second oriented strand board in contact with the second surface of the acoustic barrier layer. In an alternative example, adhesive can be applied to the first side of the acoustic barrier layer or the second side of the acoustic barrier layer to facilitate the manufacturing of a flooring product.

In another embodiment, a method of assembling a flooring product during construction of a building includes the step of providing a first oriented strand board, a second oriented strand board, and an acoustic barrier layer. The method further includes the step of securing the first oriented strand board, the second oriented strand board, and the acoustic barrier layer to a truss system. Optionally, the first oriented strand board, the second oriented strand board, and the acoustic barrier layer can be provided as a premanufactured or prefabricated composite or assembly, where the acoustic barrier layer is secured between the first oriented strand board and the second oriented strand board using adhesives or mechanical fasteners. Alternatively, the acoustic barrier layer can be secured between the first oriented strand board and the second oriented strand board during the construction of the building using adhesives or mechanical fasteners.

In another embodiment, a method of assembling a flooring assembly during construction of a building includes the step of installing a plurality of flooring products comprising a first oriented strand board, a second oriented strand board, and an acoustic barrier layer, where such flooring products are installed until the flooring for a story of the building is complete. The method further includes the step of constructing the framing for that story of the building (i.e., the walls that define the rooms and other areas of the story) on top of installed flooring assembly. Each flooring product can be assembled on site in advance of installation into the flooring system, or alternatively, the flooring products can be provided as premanufactured composite and transported to the worksite for installation into the flooring system.

In another embodiment the combination of a first oriented strand board, a second oriented strand board, and an acoustic barrier layer once installed meets or exceeds building code requirements as tested and measured by a Sound Transmission Class protocol and as tested and measured by an Impact Insulation Class protocol.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

FIG. 12 schematically illustrates a cross-sectional view of a flooring product with tongue and groove features and the acoustic barrier layer extending into the groove feature.

DETAILED DESCRIPTION

Figure 1:
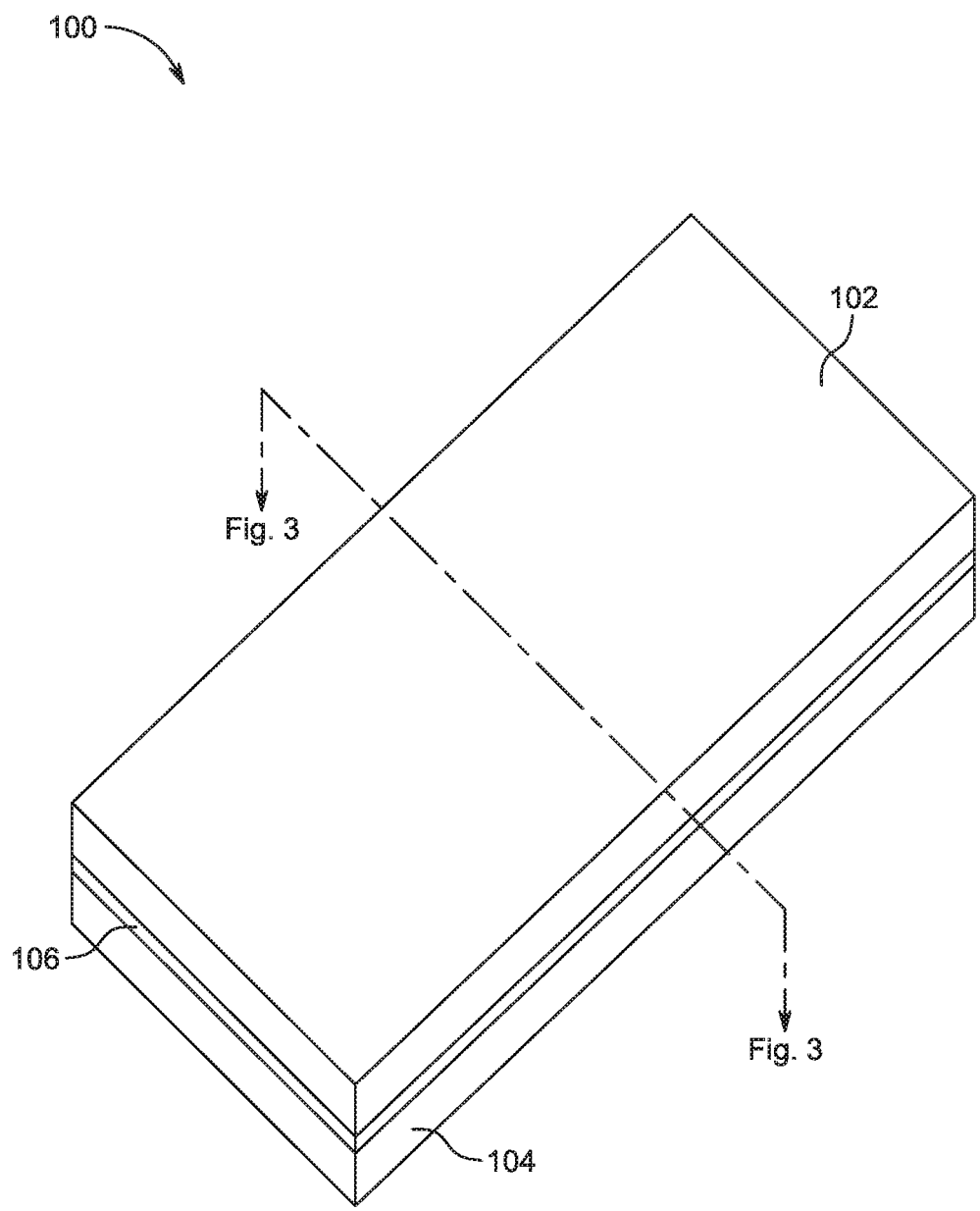
FIG. 1 schematically illustrates an exemplary perspective view of a flooring product.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for flooring products and flooring assemblies that can provide acoustic barriers are hereinafter disclosed and described in detail with reference made to FIGS. 1-54.

Disclosed herein are flooring products and flooring assemblies for use in buildings. Flooring products are generally an assembly of multiple layers of material. A flooring product can be manufactured, fabricated, or otherwise assembled in a manufacturing facility and shipped to a construction site for installation into a building. Alternatively, flooring products can be assembled at the construction site prior to or as the flooring product is installed into the building. As illustrated and designed herein, the arrangement of the multiple layers, the dimensions of the multiple layers, and features designed into the flooring products can be varied while remaining within the scope of the inventive flooring products described and claimed herein.

As will be described herein, a plurality of flooring products can be positioned together or otherwise arranged to form a flooring assembly. A flooring assembly as described herein can vary in size, shape, and application. Flooring assemblies can be arranged to form a floor for a portion of a room or form a complete floor for a room within a building. In another example, a flooring assembly can be arranged to span the complete width and length of a building to form a continuous floor for a story of a building. Such an example can include spanning the width and length from each outside wall to the opposing outside wall. This is to say that as a story of a building is constructed, the flooring assembly is installed and subsequently the framing of the interior walls of the building is built or otherwise erected on top of the flooring assembly, including interior walls that are either adjacent to or incorporated into the external walls.

As will be described in further detail herein, for flooring products that are placed adjacent to one another to form a continuous flooring assembly, the flooring products can include features that can engage or secure one flooring product to one or more adjacent flooring products. Such features include, but are not limited to, tongue and groove features formed along edges of the flooring products, lap joint features formed along edges of the flooring products, the extension of certain layers beyond the edge of other layers of the flooring product, the profiling of edges of the flooring products, and combinations thereof.

Figure 2:
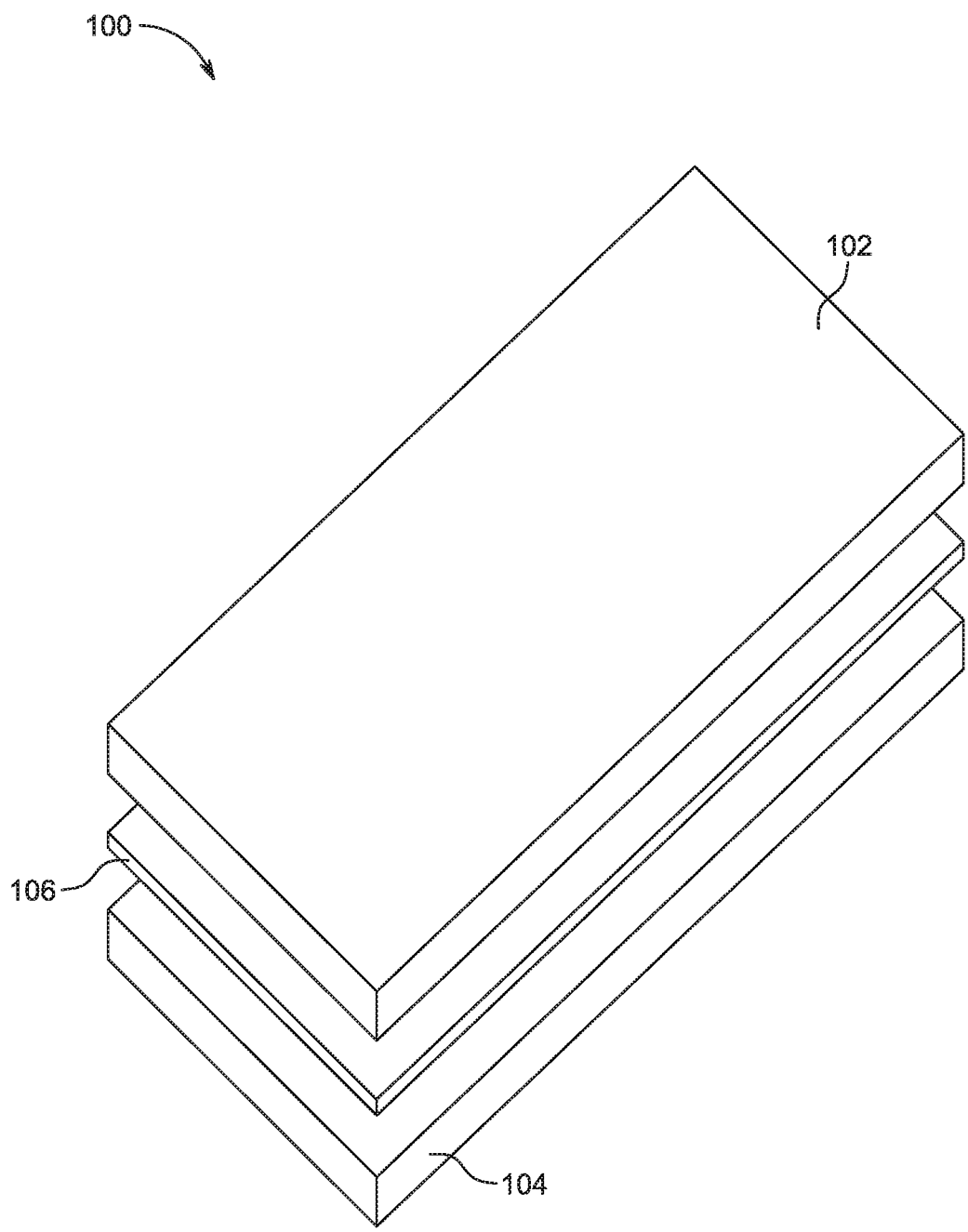
FIG. 2 schematically illustrates an exploded view of the flooring product of FIG. 1.
Figure 3:
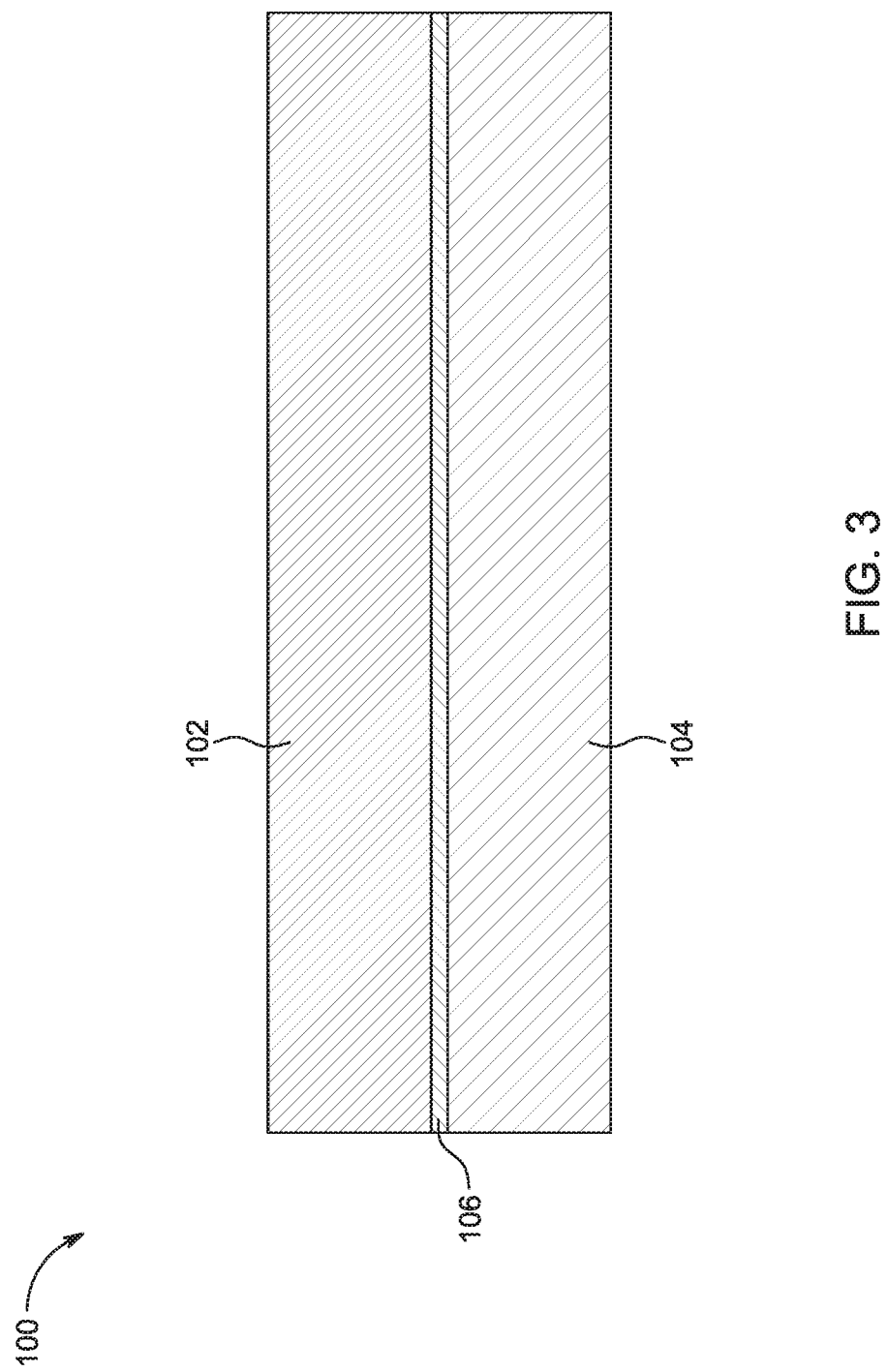
FIG. 3 schematically illustrates a cross-sectional view taken of the flooring product of FIG. 1 taken along the line shown in FIG. 1.

FIGS. 1 through 3 illustrate an exemplary flooring product 100, which can be assembled, fabricated, or otherwise used as disclosed herein. FIG. 1 illustrates a perspective view of the flooring product 100; FIG. 2 illustrates an exploded perspective view of the flooring product 100, and FIG. 3 illustrates a cross-sectional view of the flooring product 100 taken along the line shown in FIG. 1. The flooring product 100 can be installed to form a floor during the construction of various types of buildings, including multi-story and multi-occupant buildings.

Generally, the flooring product 100 is installed as a "dry" product. A "dry" product refers to a product that generally includes components that are already formed into a usable shape (i.e., already sized for installation or sized as to facilitated the cutting of components to an appropriate shape and size for installation) as opposed to including certain materials that are in a liquid state and require "pouring" on-site that dry, set, or cure over time into a final shape or form. In certain embodiments, the flooring product 100 can include certain components that are of "high density." "High density" materials can include acoustic absorbing or deflecting properties that assist or facilitate the controlling or channeling of acoustic energy.

Generally, the flooring product 100 as described herein is arranged so that the flooring product 100 can form a barrier to the propagation of acoustic energy. One method of determining whether a floor product sufficiently restricts the propagation of acoustic energy is by comparing the performance of the product to the standards for acoustic testing in the construction industry. Such standards include protocols that determine ratings for the Sound Transmission Class ("STC") and Impact Insulation Class ("IIC") for a product or arrangement of multiple products. Exemplary procedures for determining STC ratings include a measuring procedure conducted according to ASTM E90-09 (Standard Test Method for Laboratory Measurement of Airborne Sound Transmission Loss of Building Partitions and Elements) and calculating the rating according to ASTM E413-10. Exemplary procedures for determining IIC ratings include a measuring procedure conducted according to ASTM E492-09 (Standard Test Method for Laboratory Measurement of Impact Sound Transmission Through Floor-Ceiling Assemblies Using the Tapping Machine) and calculating the rating according to ASTM E989-10.

The flooring product 100 can comprise multiple layers of materials and can be designed to be installed as a building is constructed or substantially remodeled. The flooring product 100 can be prefabricated or manufactured off-site and transported on-site to a building under construction. For example, two or more layers of the flooring product 100 can be secured together using, for example, adhesives, mechanical fasteners or the like during a fabrication process and subsequently delivered to a construction site as a ready to install product. Alternatively, components or portions of the flooring product 100 can be transported on-site to a building under construction and two or more layers can be secured together by workers prior to or during installation of the flooring product 100 using, for example, adhesives or mechanical fasteners.

As illustrated in FIG. 1, the flooring product 100 can includes a first oriented strand board ("OSB") layer 102, a second OSB layer 104; and an acoustic barrier layer 106 positioned between the first OSB layer 102 and second OSB layer 104. In one example, the OSB layers 102, 104 can be approximately ¾ inches in thickness. Although the first and second OSB layers 102 and 104 are described as having a thickness of approximately ¾ inches, for other examples, the thickness can range from ¼ to 1⅛ inches. In one example, the first OSB layer 102 has a thickness of approximately ½ inches, and the second OSB layer 104 has a thickness of approximately ¾ inches. In one example, the acoustical barrier layer 106 can be approximately 1/16 to ¼ inches in thickness. In one example, the first and second OSB layers 102 and 104 have a density of approximately 0.024 pounds per cubic inch (0.66 grams/cm³). It will be understood that the first and second OSB layers can include densities higher or lower than 0.024 pounds per cubic inch, and that certain embodiments can include OSB layers and an acoustic barrier layer that can be of a relatively high density. For example, the density of the OSB layers can range from 0.020 pounds per cubic inch (approximately 0.55 grams per cubic centimeter) and 0.026 pounds per cubic inch (approximately 0.72 grams per cubic centimeter). In such examples, an 8 foot by 4 foot sheet of ¾ inch thick OSB layer can range between about 69 pounds (approximately 31.4 kilograms) and 90 pounds (approximately 40.8 kilograms). The density and weight ranges provided herein are exemplary. It will be understood by those of ordinary skill in the art that such densities and weights can vary to some degree below and above the stated values and remain within the disclosure provided herein.

In one embodiment, the OSB layers 102 and 104 can be manufactured in the form of panels from woods of relatively high densities. The OSB layers 102 and 104 can be arranged so as to provide structural integrity for its use as flooring material and to withstand environmental conditions such as resisting absorption of moisture from rain and other sources, which can prevent or limit swelling, warping, and delamination of the OSB layers 102 and 104. It will further be understood that although examples disclosed herein include the use of OSB layers, a flooring product can be comprised of other types of layers such as plywood, recycled plastic boards, plastic boards reinforced with fiberglass, and other engineered products.

Figure 4:
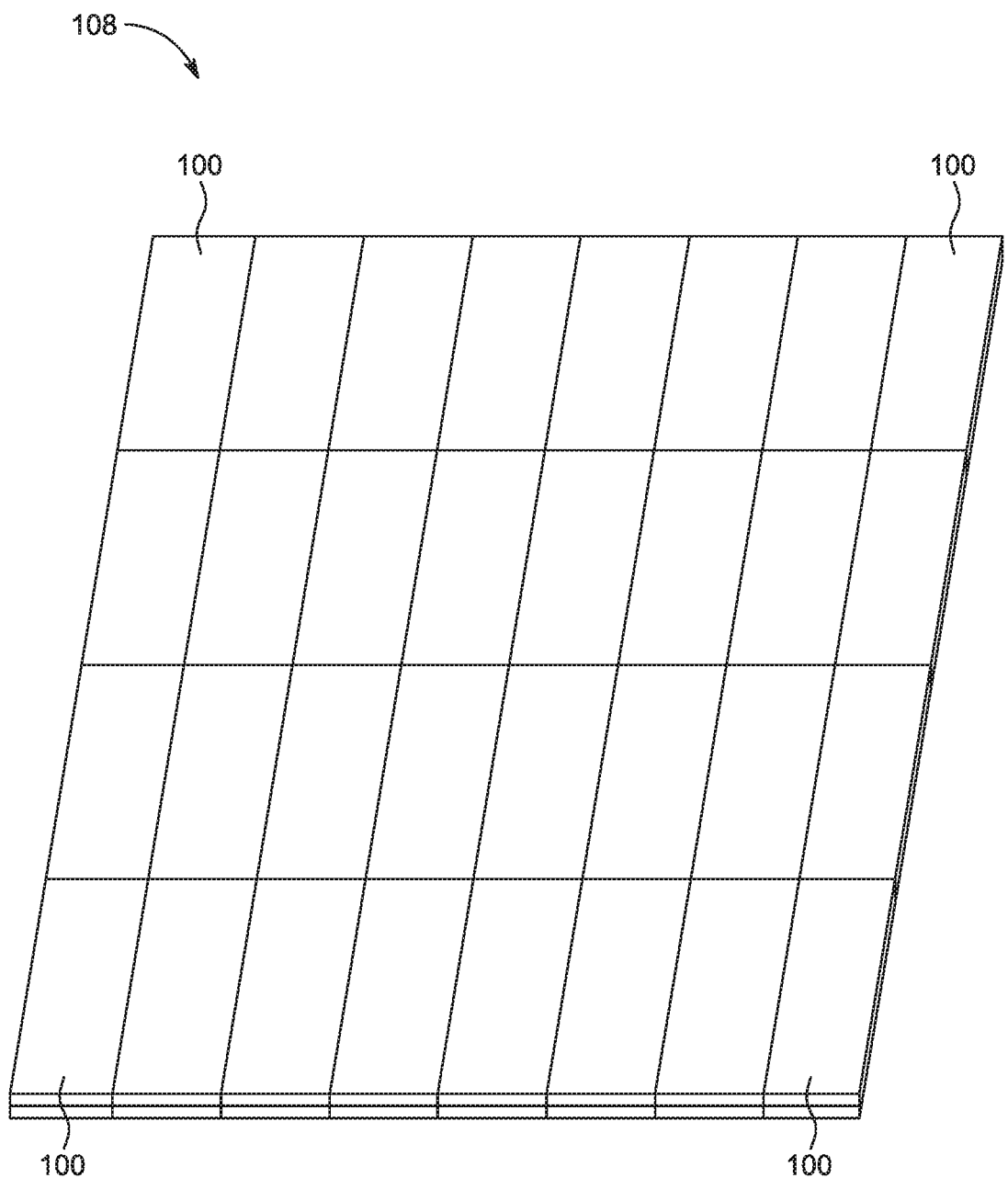
FIG. 4 schematically illustrates an exemplary perspective view of a flooring assembly comprised of a plurality of flooring products.

A plurality of flooring products 100 can be arranged adjacent to one another to form a flooring assembly. FIG. 4 illustrates an exemplary flooring assembly 108. The exemplary flooring assembly 108 is comprised of an eight by four matrix of flooring products 100. Each flooring product 100 is abutted to each adjacent flooring product 100. This is to say that the flooring products 100 are arranged such that the flooring assembly 108 is a generally continuous floor spanning the combined length and width of the flooring products 100. Although the flooring assembly 108 of FIG. 4 is illustrated as a matrix of eight by four flooring products 100 of equal length and width, it will be understood that a flooring assembly 108 can be comprised of any number of flooring products 100, and such flooring products could vary in length and width. For example, if a flooring assembly 108 is constructed for a building that is 50 feet in length and 50 feet in width with internal features such as stairwells and plumbing, certain flooring products 100 can be cut prior to assembly into a flooring assembly 108 to accommodate the precise outer perimeter of the building and internal features.

Figure 5:
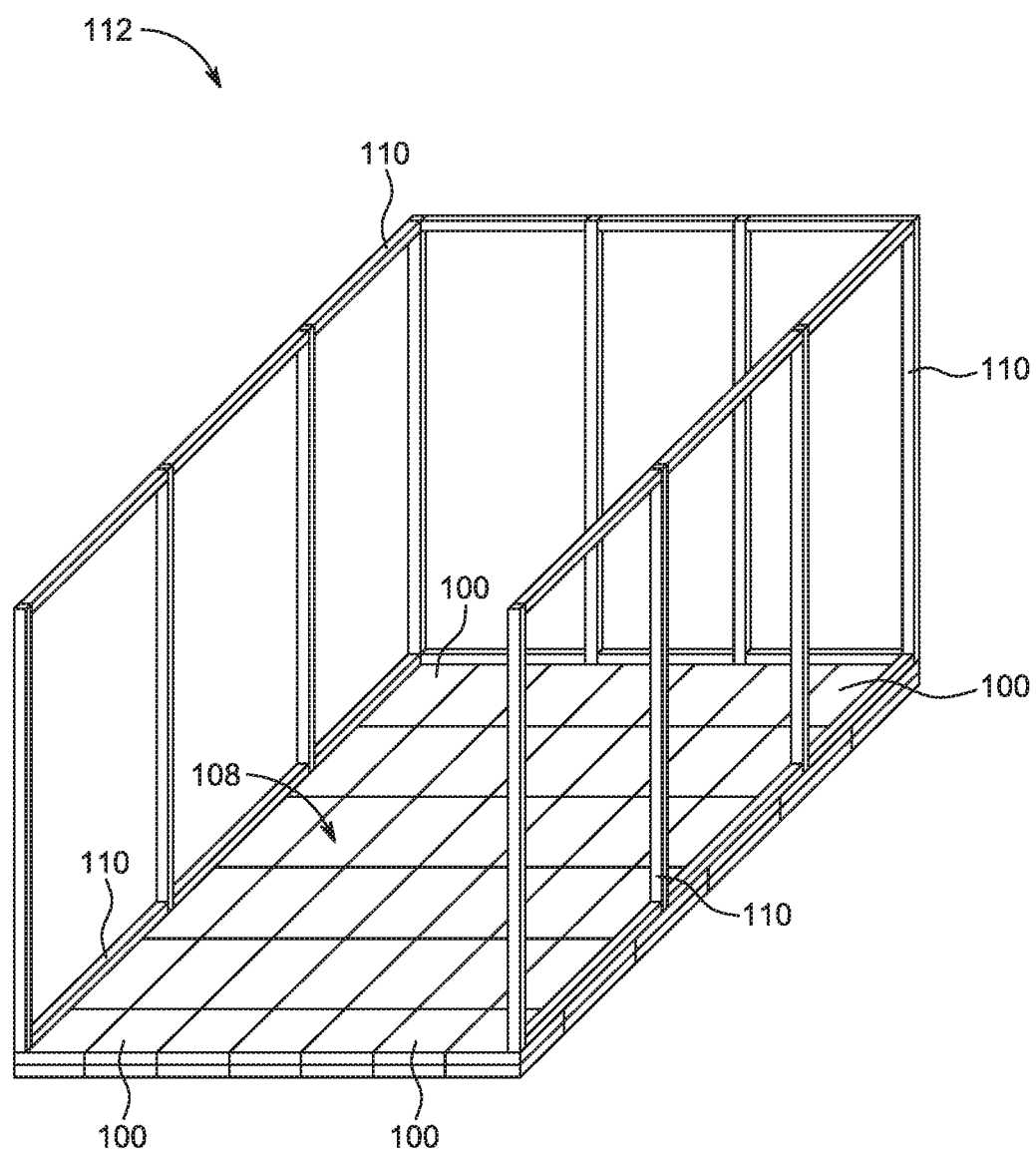
FIG. 5 schematic illustrates framing constructed on top of a flooring assembly.

A flooring assembly 108 can be arranged to span the complete width and length of a building to form a continuous floor for a story of a building. In such an arrangement, the framing for the story can be built on top of the flooring assembly. FIG. 5 illustrates a plurality of flooring products 100 assembled to comprise a flooring assembly 108. A number of structural members 110 are built on top of the flooring assembly 108 to from the framing 112 that will define walls, doorways, etc. for a story of a building. As will be understood, the method of installing a flooring assembly 108 followed by building the framing 112 on top of the flooring assembly 108 can be used selectively for certain rooms of a building, used for certain stories of a building, or used throughout the entire building. For example, when a flooring assembly 108 spans the width and length of each story of a building, all framing 112 can be built on top of the flooring assembly 108, including all interior walls throughout each story and walls adjacent to or incorporated into the external walls of the building.

Flooring products can be arranged to include features that facilitate securing or engaging one flooring product to adjacent flooring products to form a flooring assembly. As illustrated in FIGS. 6-9, a flooring product 200 can be constructed of three layers—a first OSB layer 202, a second OSB layer 204, and an acoustic barrier layer 206 sandwiched between the first and second OSB layers 202 and 204. In one example, the OSB layers 202 and 204 can be high density OSB layers. In one example, the acoustic barrier layer 206 can be a rubber layer. In other examples, the acoustic barrier layer 206 can be comprised of materials such as polymers (including recycled plastics), cotton (and other similar materials), and binders and other additives. The acoustical barrier layer 206 can be approximately ¹⁄₁₆ to ¼ inches in thickness. In one example, the acoustical barrier layer 206 is approximately ⅛ inches in thickness (i.e., approximately 3 millimeters). In additional examples, the acoustic barrier layer 206 can itself be comprised of multiple layers.

The flooring product 200 includes a feature in the form of a tongue and groove system. A tongue feature 208 can be formed along a first edge of the flooring product 200 and a groove feature 210 can be formed along the opposite edge of the flooring product 200. Such tongue 208 and groove 210 features can form a connection system to facilitate the installation of the flooring product 200 during construction or remodeling of a building. The first OSB layer 202 can be approximately ¾ inches in thickness and the second OSB layer 204 can be approximately ⅞ inches in thickness. The acoustical barrier layer 206 can vary in thickness and density depending on the desired application. For example, the thickness of the acoustical barrier layer 206 can range from ¹⁄₁₆ to ¼ inches. In other embodiments, the OSB layers 202 and 204 can range in thickness from ¼ to 1⅛ inches. FIG. 7 illustrates an exploded view of the flooring product 200, and FIG. 8 illustrates a cross-sectional view of the flooring product 200 taken along the line illustrated in FIG. 6. In another example, the first OSB layer 202 can be approximately ½ inches in thickness and the second OSB layer 204 can be approximately ¾ inches in thickness.

In one embodiment, the flooring product 200 can be precut to facilitate efficient installation of a flooring assembly. For example, flooring product 200 can be precut into 2 foot by 8 foot sections. Such sections of the flooring product 200 are comparable in weight to 4 foot by 8 foot sections of OSB board commonly used in construction. Typically a single workman can carry, position, and install the flooring product 200 without assistance, thus, creating an efficient installation processes. In other embodiments, the flooring product 200 can be precut into alternative sizes. For example, the flooring product 200 can be precut into 4 foot by 8 foot sections or the flooring product 200 can be cut in sections with widths anywhere between 2 foot and 4 foot.

Figure 7:
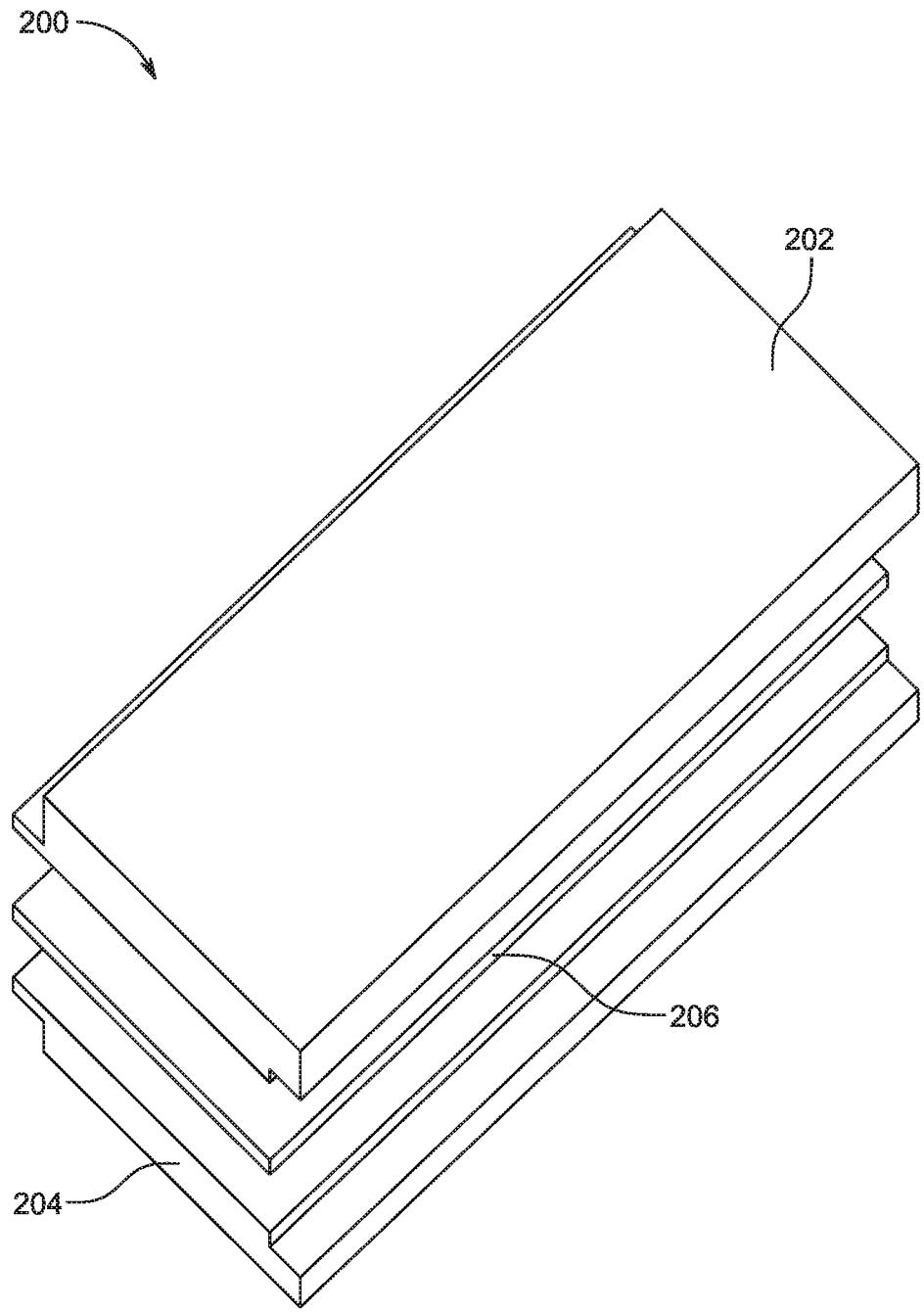
FIG. 7 schematically illustrates an exploded view of the flooring product of FIG. 6.
Figure 8:
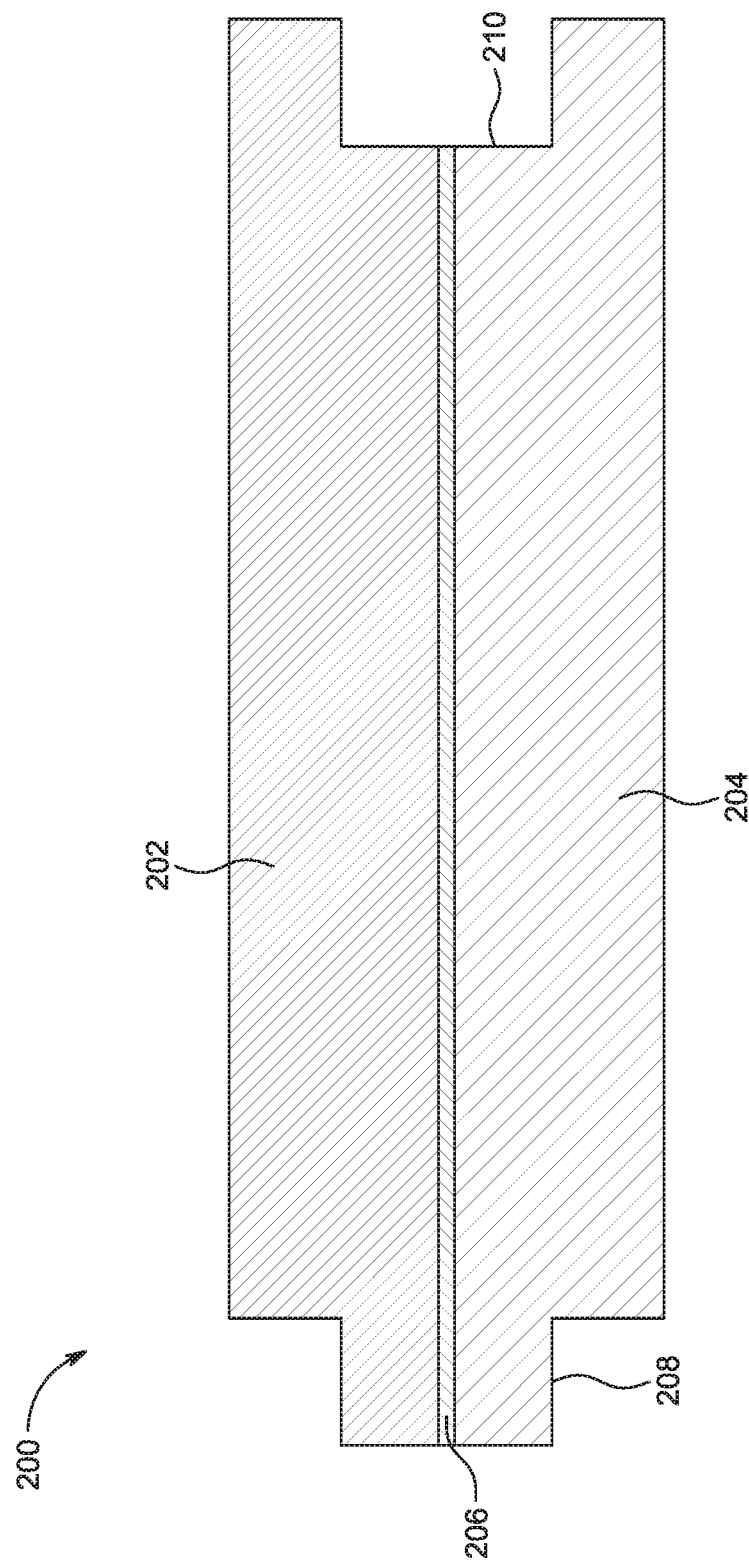
FIG. 8 schematically illustrates a cross-sectional view taken of the flooring product of FIG. 6 taken along the line shown in FIG. 6.
Figure 9:
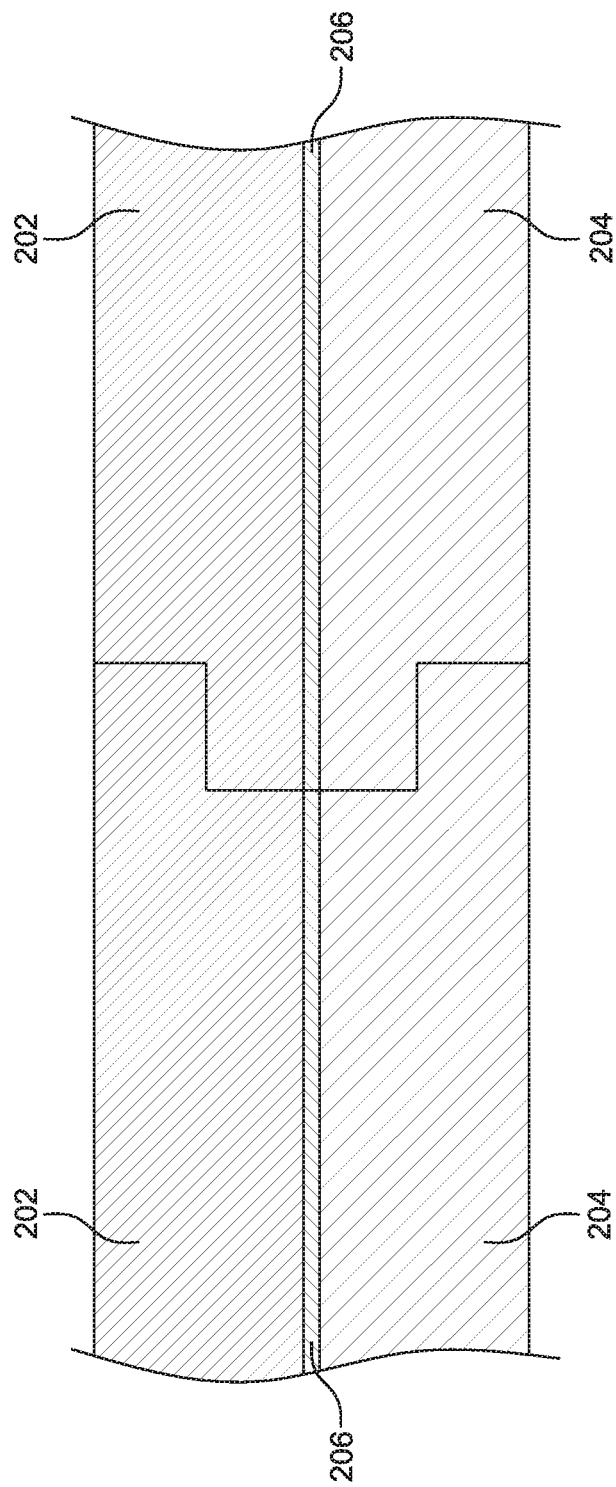
FIG. 9 schematically illustrates a cross-sectional view of two flooring products of FIG. 6 engaged via a tongue and groove system.

As will be understood by those of ordinary skill in the art of building construction, the flooring product 200 as described herein and illustrated in FIGS. 6-9, along with other flooring products disclosed herein, can serve as a sub-decking and have substantial strength and stiffness. In addition to the substantial thicknesses of the first and second OSB layers 202 and 204, the tongue and groove systems further facilitate stiffness. FIG. 9 schematically illustrates a cross-sectional view of two flooring products 200 with the tongue 208 of one flooring product 200 engaged with the groove 210 of another flooring product 200. As will be understood, the tongue and groove system facilitates the sharing and transfer of weight and load forces between adjacent flooring products 200 thus, forming a system that is stiffer than comparable boards that are installed by simply abutted the boards next to each other and securing to the underlying truss systems. Furthermore, the flooring product 200 itself and its tongue and groove system of installation can provide continuity to the sound barrier properties of the flooring product 200.

Such strength and stiffness of the flooring product 200 can facilitate alteration to standard truss systems designed to support standard floors. Typically, trusses are spaced 24 inches apart to support anticipated loads applied to the floor. However, with the added strength and stiffness of the flooring product 200, the trusses can be spaced at least 32 inches apart. It will be understood that such an alteration in the truss system can lower the cost of construction while maintaining the structural integrity of the floors.

Figure 10:
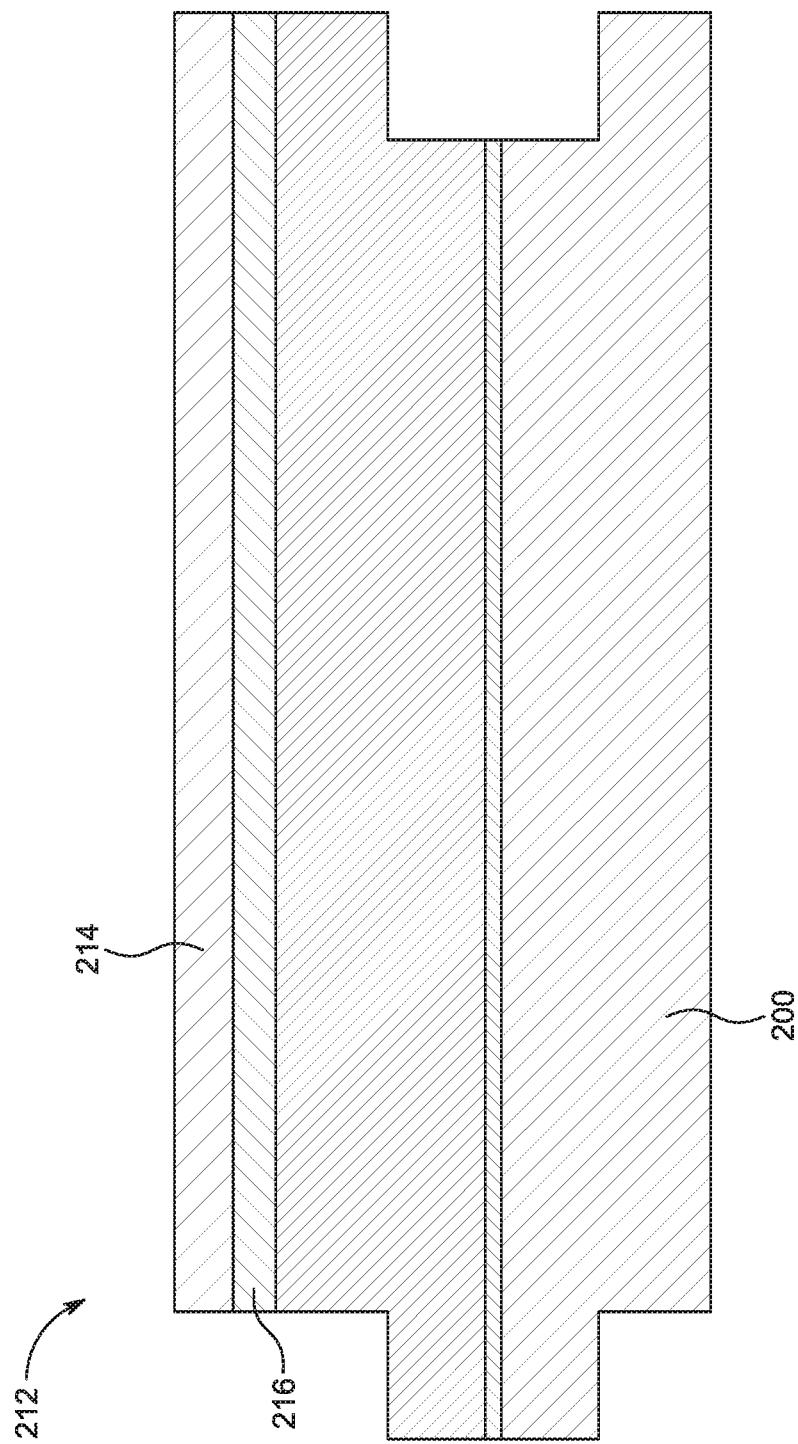
FIG. 10 schematic illustrates a cross-sectional view of the flooring product of FIG. 6 with additional layers engaged with the flooring product.
Figure 11A:
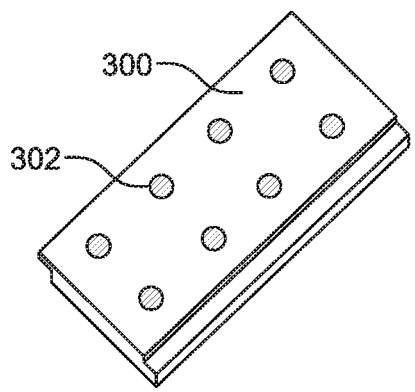
FIG. 11A-11D schematically illustrate adhesive patterns on an oriented strand board layer of the flooring product of FIG. 6.
Figure 11B:
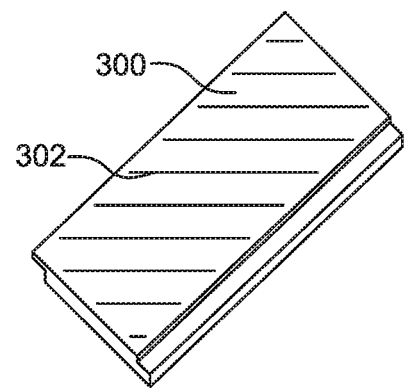
Figure 11C:
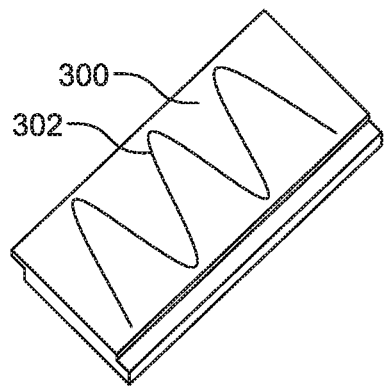
Figure 11D:
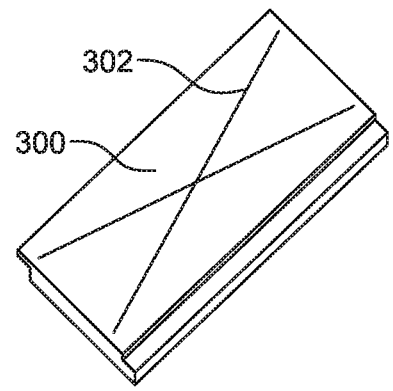

As illustrated in FIG. 10, additional layers can be added to the flooring product 200 to form a finished flooring product 212. In one example, a finished flooring product 212 (i.e., the portion above the trusses) can be assembled from three layers: a top finished layer 214, an acoustic underlayment layer 216, and a flooring product 200. The acoustic underlayment layer 216 can be positioned between the top finished layer 214 and the flooring product 200. The term "finished flooring product" is generally used to mean that the finished flooring product can be secured to previously installed trusses to complete a segment of flooring in a building.

The top finished layer 214 can be comprised of any number of materials considered "finished flooring," such as vinyl tile, hardwood, manufactured material, engineering flooring, etc. The top finished layer 214 is designed and manufactured such that it can be directly exposed to the occupants and furnishings of a room once construction has been completed. In one example, the top finished layer 214 is a luxury vinyl tile ("LVT"). The LVT can be comprised of planks that "click together" or "loose lay" and, in one embodiment, can be approximately 1/16 to 1/4 inches in thickness. In one embodiment, the top finished layer 214 can be approximately 1/8 inches (i.e., approximately 3 millimeters) in thickness. The top finished layer 214 can float or be held in place by a variety of adhesives or other such methods.

The acoustic underlayment layer 216 positioned between the top finished layer 214 and the flooring product 200 can be fabricated for any of a number of materials such as, for example, rubber, a polymer, cotton, or other such materials. The acoustic underlayment layer 216 can be approximately 1/8 to 1/4 inches in thickness (i.e., approximately 3 millimeters to 6 millimeters). In an alternative arrangement, the finished flooring product 212 can include a pair of acoustic underlayment layers in place of the single acoustic underlayment 216 illustrated in FIG. 10. When a pair of acoustic underlayment layers are included in the finished flooring product 212, each acoustic underlayment layer can be approximately 1/16 to 1/8 inches in thickness (i.e., approximately 1.5 millimeters to 3 millimeters). When a pair of acoustic underlayment layers are included in the finished flooring assembly 212, the total thickness of the acoustic underlayment layers can be approximately 1/8 to 1/4 inches in thickness (i.e., approximately 3 millimeters to 6 millimeters). Although the acoustic underlayment layers 216 are described as each having a thickness of approximately 1/16 or 1/8 inches, for other embodiments, the thickness can range from 1/16 to 1/4 inches. The acoustic underlayment layers 216 can be fabricated from any of a number of materials such as, for example, rubber, a polymer, cotton, and other such materials. When a pair of acoustic underlayment layers is utilized, each can be fabricated for a different material.

The three layers of the finished flooring product 212 can be sold or distributed as a kit, where the top finished layer 214, acoustic underlayment layer 216, and flooring product 200 are provided in sizes and arrangements to facilitate efficient and economical installation of the layers during construction or remodeling of a residential or commercial building.

The flooring product 200, the finished flooring product 212, and other similar arrangements can be manufactured at a central location and distributed and sold as a complete product to builders for use as flooring in homes and buildings. The components of the flooring product 200 (a pair of OSB layers 202, 204 and an acoustic barrier layer 206) or a finished flooring product 212 (top finished layer 214, acoustic underlayment layer 216, and flooring product 200) can be secured together into the marketable product using a variety of methods. In one example, an adhesive can be applied to secure components together. For example, an adhesive can be used to secure an OSB layer to a first surface of an acoustic barrier layer, and additional adhesive can be applied to secure another OSB layer to a second surface of the acoustic barrier layer. It will be understood that the surfaces of the OSB layers and the acoustic barrier layer can be prepared in advance of applying the adhesive. For example, the surfaces can be cleaned to remove dirt, debris, oils, etc. to better facilitate securing the OSB layers to the acoustic barrier layer. In another example, the surfaces can be "roughed" or "smoothed" to better facilitate the processes of securing together various layers.

In additional embodiments of the flooring product 200 and other similar arrangements, the adhesive can be applied in a pattern that provides adequate adherence of the components, but also retains the natural acoustic properties of the components and combination of the components. FIGS. 11A-11D illustrate exemplary adhesive patterns 302 applied to a surface 300 of an OSB layer, where an acoustic barrier layer will subsequently be adhered to the surface 300 of the OSB layer. One design factor to be considered in determining adhesive patterns is that although the adhesive patterns are designed to adhere the OSB layer and an acoustic barrier layer, the adhesive pattern can be applied such that the adhesive does not overly fill too many pores or cavities present on the surface of the OSB layer or acoustic barrier layer. The adhesive patterns 302 illustrated in FIGS. 11A-11D are merely examples of possible patterns for securing an OSB layer to an acoustic barrier layer. It will be understood that other adhesive patterns can be used with the embodiments disclosed herein. In one embodiment, the adhesive pattern is distributed across the surface of the OSB layer as to relatively evenly bear loads placed in the flooring product once assembled. As previously discussed, adhesive can alternatively or in addition be applied to the acoustic barrier layer, and such adhesive can be applied in patters such as those illustrated in FIGS. 11A-11D or in other patterns.

It will also be understood that there are alternative methods of securing together components to form a flooring product. For example, mechanical fasteners can be used to secure components together to form a flooring product. Such mechanical components include, among others, screws, rivets, nails, pegs, and so on.

Figure 13:
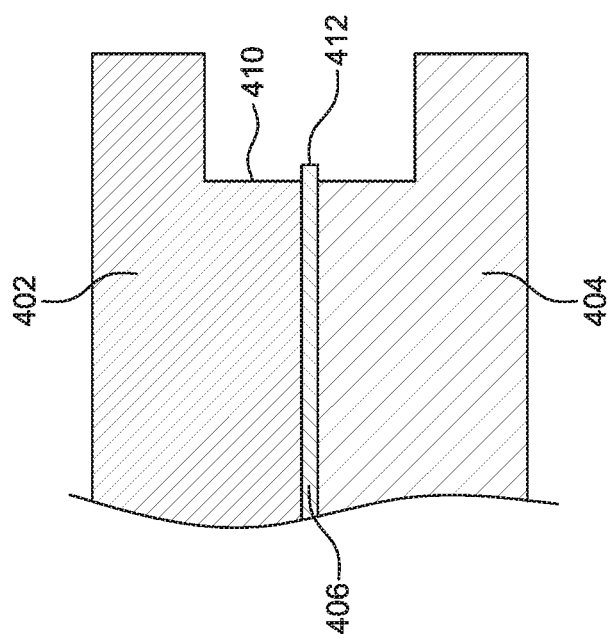
FIG. 13 schematically illustrates a cross-sectional view or the groove feature of the flooring product of FIG. 12.

Another embodiment of a flooring product 400 is schematically illustrated in cross-section in FIG. 12. The flooring product 400 includes a tongue and groove system to facilitate the engagement with or securing of the flooring product 400 to other similarly arranged flooring products 400. Similar to the previously described embodiment, the flooring product 400 can be constructed of three layers—a first OSB layer 402, a second OSB layer 404, and an acoustic barrier layer 406 sandwiched between the first and second OSB layers 402, 404. A tongue feature 408 is formed along a first edge of the flooring product 400 and a groove feature 410 is formed along the opposite edge. As best illustrated in FIG. 13, within the groove 410 of the flooring product 400, a portion of the acoustic barrier layer 406 extends beyond the first and second OSB layers 402, 404 and into the groove 410 to form a protrusion 412. In one embodiment, the protrusion 412 extends approximately 1/16 of an inch beyond the first and second OSB layers 402 and 404. In another embodiment, the protrusion 412 extends approximately 1/8 of an inch past beyond the first and second OSB layers 402 and 404. It will be understood that the extent that the protrusion extends beyond the OSB layers can be increased or decreased as required.

Figure 14:
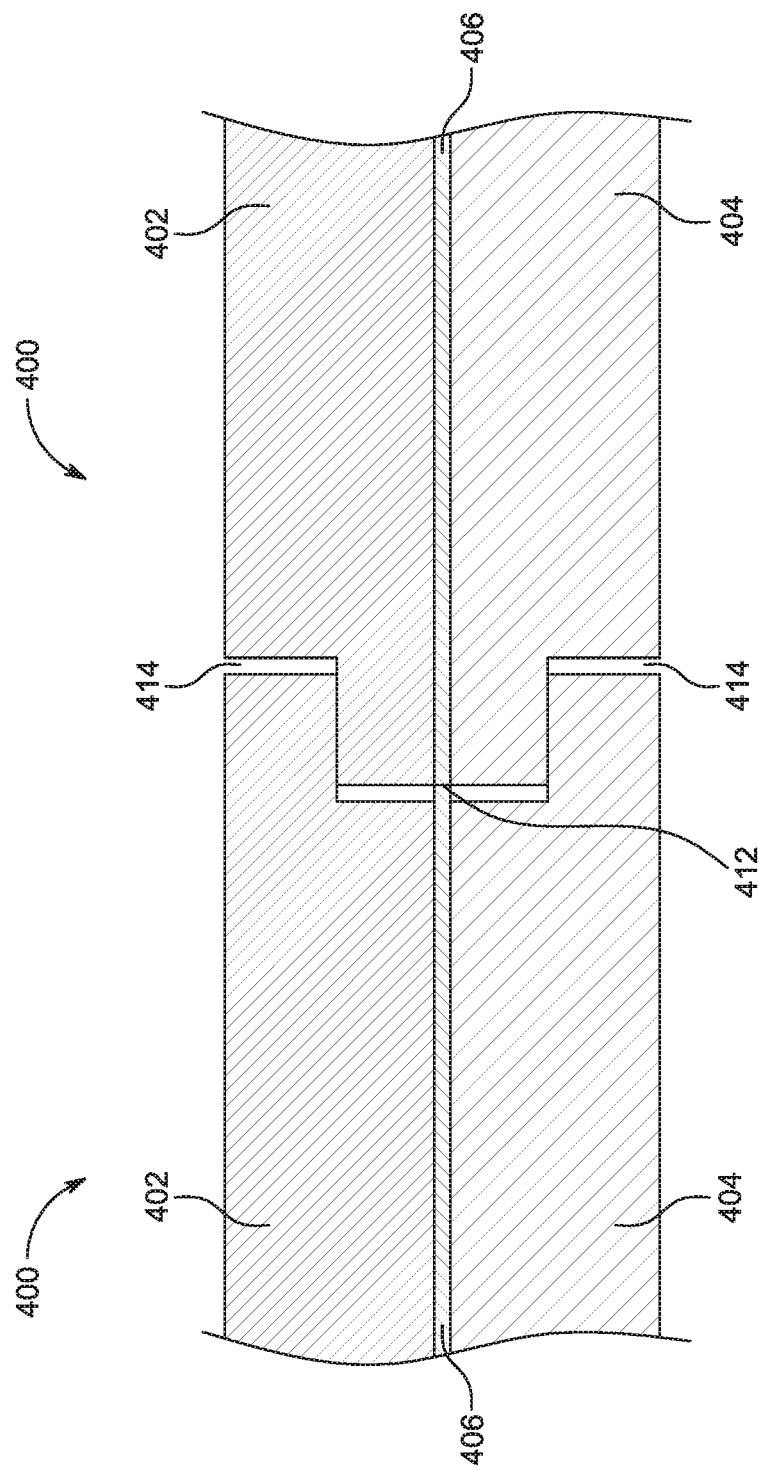
FIG. 14 schematically illustrates a cross-sectional view of two flooring products of FIG. 12 engaged via a tongue and groove system with the extending acoustic barrier layer of one flooring product engaged with the other flooring product.

FIG. 14 schematically illustrates a cross-sectional view of two flooring products 400 engaged via the tongue 408 and groove 410 features. As illustrated in FIG. 14, when the two flooring products 400 are engaged, the protrusion 412 of one flooring product 400 engages the acoustic barrier layer 406 of the other flooring product 400. Such engagement increases the continuity of acoustic barrier layers 406 across adjacent flooring products 400 after installation of the flooring products 400. Such continuity of the acoustic barrier layers 406 provides for better and more consistent acoustic barrier properties for the installed flooring assembly.

The protrusion 412 can provide additional benefits for a flooring assembly comprised of adjacent flooring products 400. Whether due to building code requirements, architectural design, or builder preference, flooring is often installed with a gap between subflooring components. Such a gap can provide sufficient room for expansion of the components and account for tolerances in the fabricating process of the components. As illustrated in FIG. 14, the protrusion 412 encourages the formation of a gap 414 between adjacently positioned flooring products 400. Such a gap 414 can be proportional to the length the protrusion 412 extends into the groove 410. For example, in one embodiment, once assembled, the flooring system can include a gap of approximately 1/8 of an inch between adjacent flooring products 400. In another embodiment, once assembled, the flooring system can include a gap of approximately 1/16 of an inch between adjacent flooring products 400.

It will be understood that although the protrusion 412 is illustrated and described as extending into the groove 410, a flooring product can also be designed and fabricated such that a protrusion extends beyond the first and second OSB layers on the tongue side of the flooring product. It will further be understood that a flooring product can also be designed and fabricated such that a first protrusion extends beyond the first and second OSB layers on the tongue side of the flooring precut and a second protrusion extends beyond the first and second OSB layer on the groove side of the flooring product.

Figure 15:
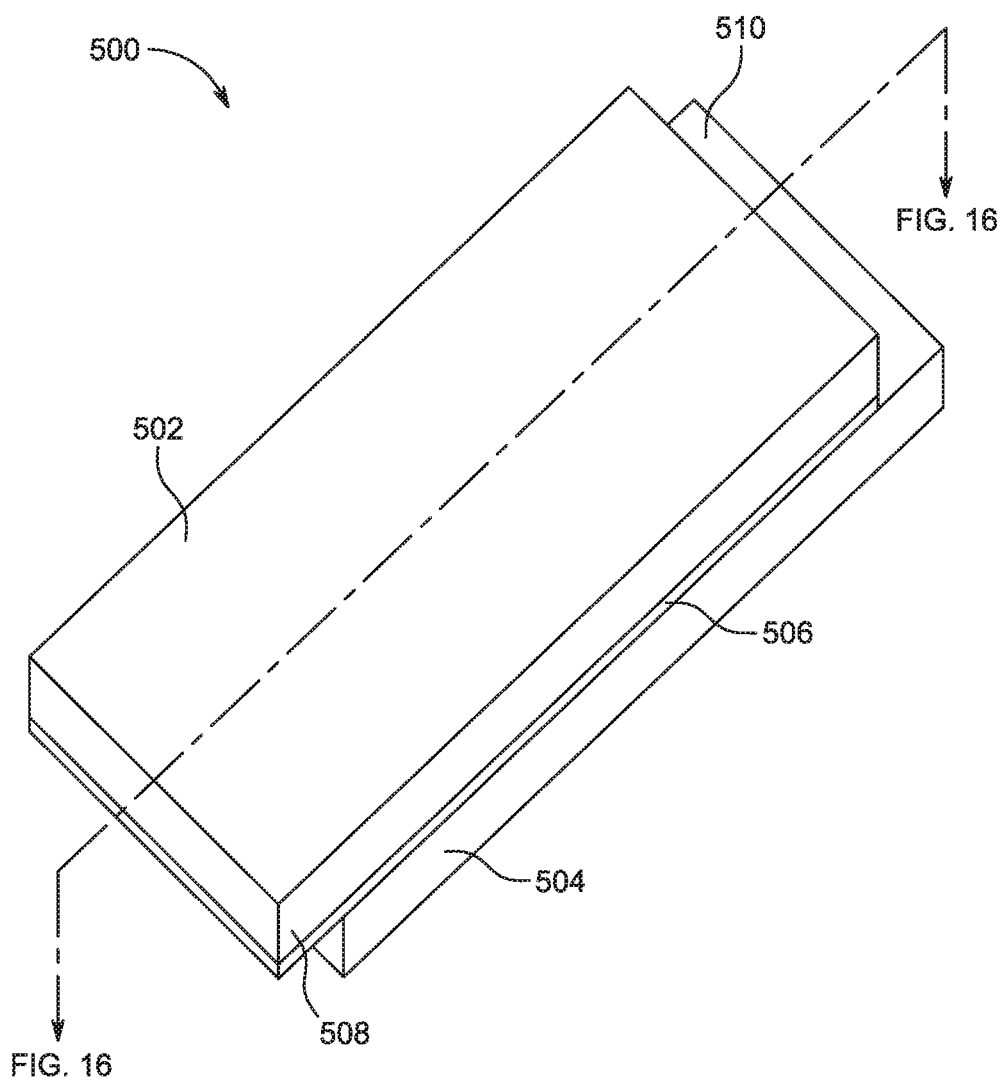
FIG. 15 schematically illustrates a cross-sectional view of a flooring product that includes lap joint features FIG. 16 schematically illustrates a cross-sectional view taken of the flooring product of FIG. 15 taken along the line shown in FIG. 15.
Figure 16:
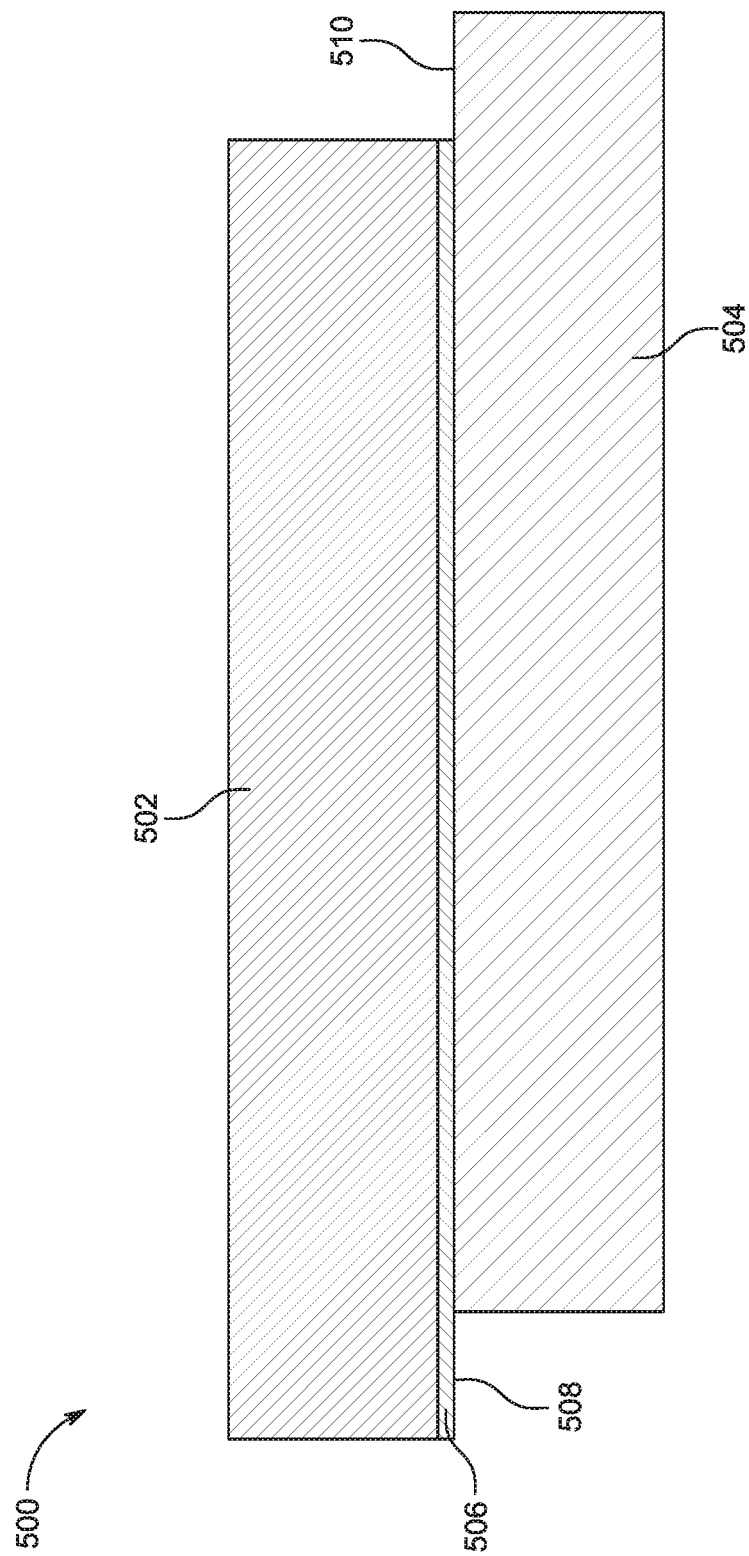
Figure 17:
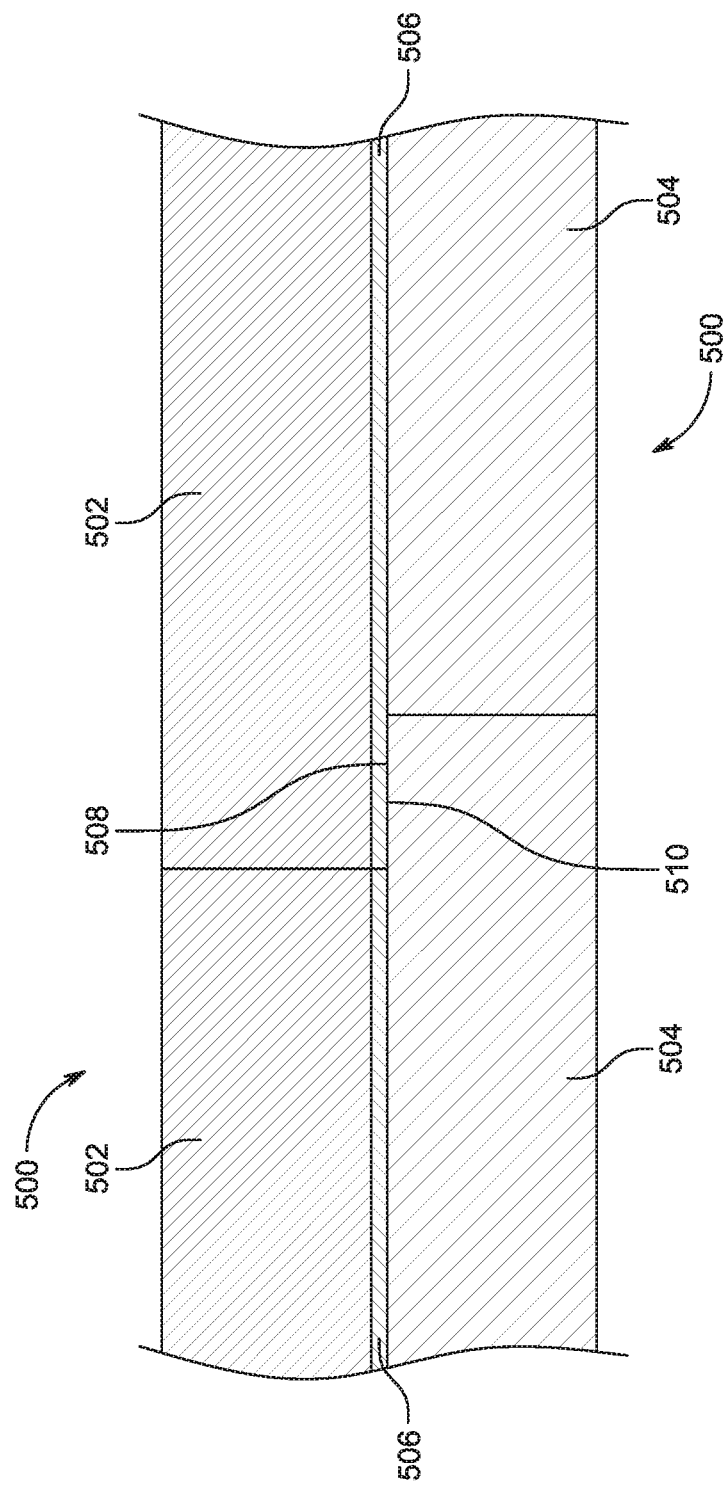
FIG. 17 schematically illustrates a cross-sectional view of two flooring products of FIG. 15 engaged via a lap joint system.

FIGS. 15-17 illustrate another feature for engaging or securing a plurality of flooring products 500. The engagement features combine to form a lap joint. FIG. 15 illustrates a perspective view of a flooring product 500 designed to create a lap joint upon installation of adjacent flooring products 500 into a flooring assembly. FIG. 16 is a cross-sectional view of the flooring product 500 of FIG. 15. The flooring product 500 can be constructed of three layers—a first OSB layer 502, a second OSB layer 504, and an acoustic barrier layer 506 sandwiched between the first and second OSB layers 502 and 504. A top lap portion 508 is formed along a first edge of the flooring product 500, and a bottom lap portion 510 is formed along the opposite edge of the flooring product 500. As illustrated in FIG. 17, when flooring products 500 are positioned adjacently during installation, the top lap portion 508 along one edge of a flooring product 500 can engage with the bottom lap portion 510 of an adjacent flooring product 500. The engagement of the top and bottom lap portions 508 and 510 can facilitate the sharing and transfer of weight and load forces between adjacent flooring products 500 thus, forming a system that is stiffer than comparable boards that are installed by simply abutted the boards next to each other. Furthermore, the flooring product 500 itself and its lap joint system of installation can provide continuity to the sound barrier properties of the flooring product 500.

Figure 18:
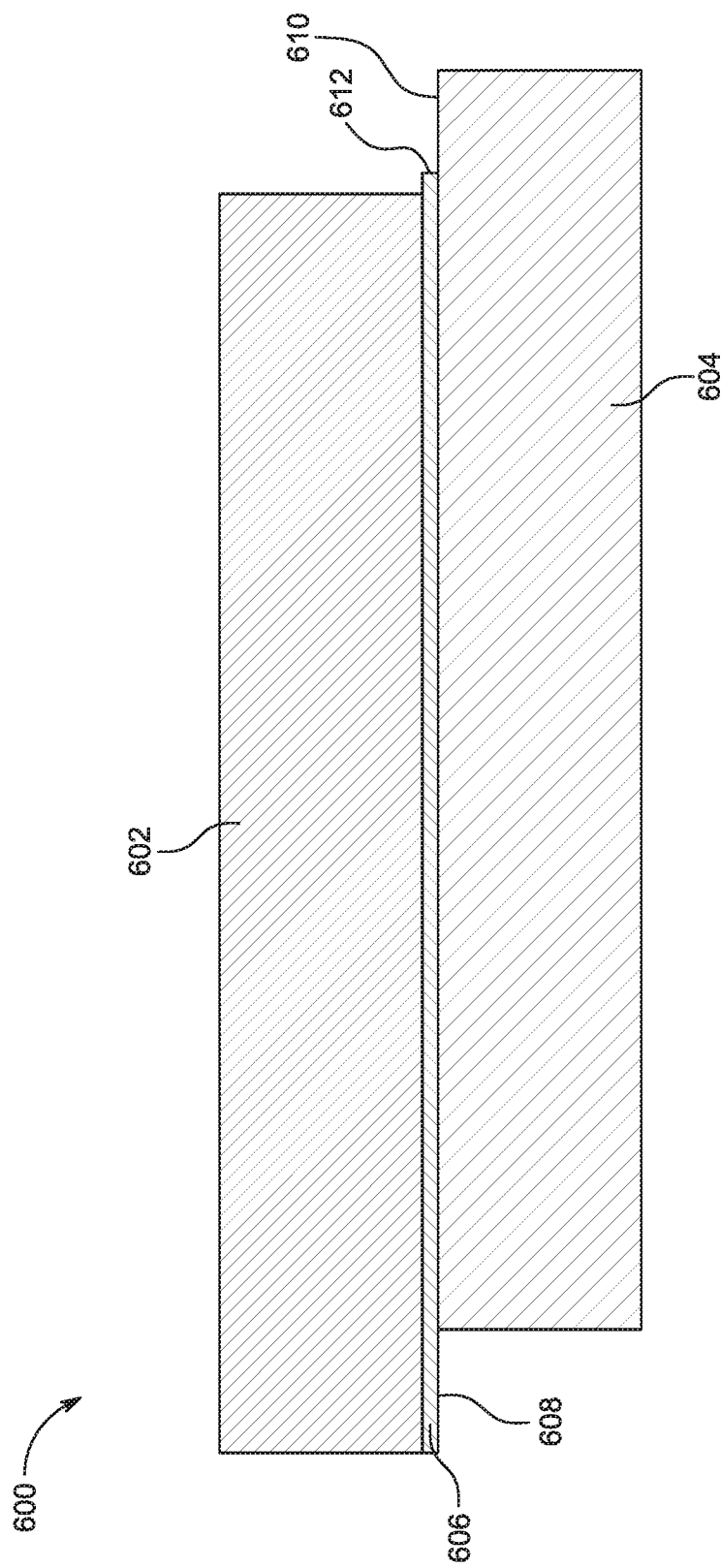
FIG. 18 schematically illustrates a cross-sectional view of a flooring product with lap joint features and the acoustic barrier layer extending into the lower lap joint feature.

In another embodiment of a flooring product 600, as illustrated in FIG. 18, the flooring product includes a first OSB layer 602, a second OSB layer 604, and an acoustic barrier layer 606 arranged to form a top lap portion 608 along a first edge and bottom lap portion 610 along a second edge. The acoustic barrier layer 606 includes a protrusion 612 that extends beyond the first OSB layer 602 and into a bottom lap portion 610. In one embodiment, the protrusion 612 extends approximately 1/16 of an inch beyond the first OSB layer 602. In another embodiment, the protrusion 612 extends approximately 1/8 of an inch past beyond the first OSB layer 602.

Figure 19:
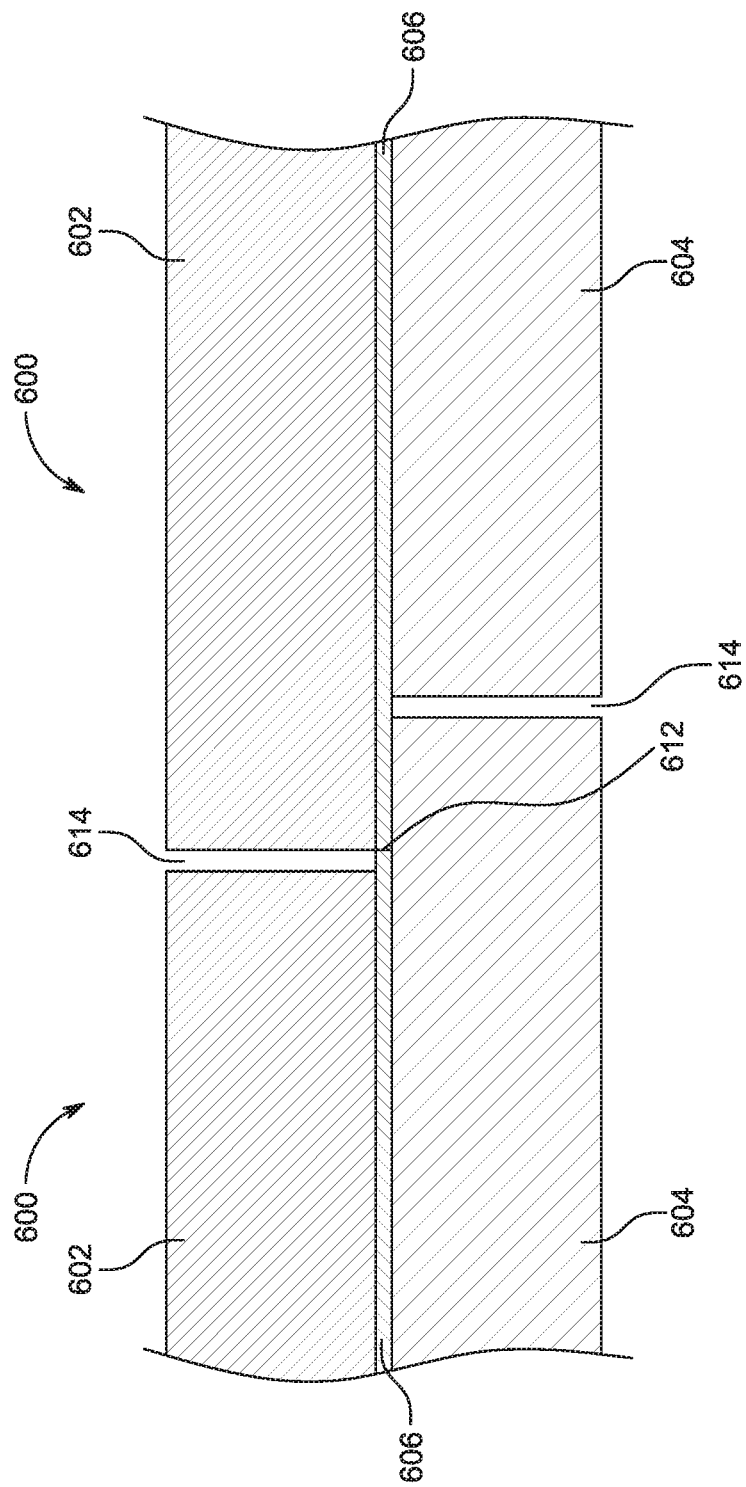
FIG. 19 schematically illustrates a cross-sectional view of two flooring products of FIG. 18 engaged via a lap groove system with the extending acoustic barrier layer of one flooring product engaged with the other flooring product.
Figure 20:
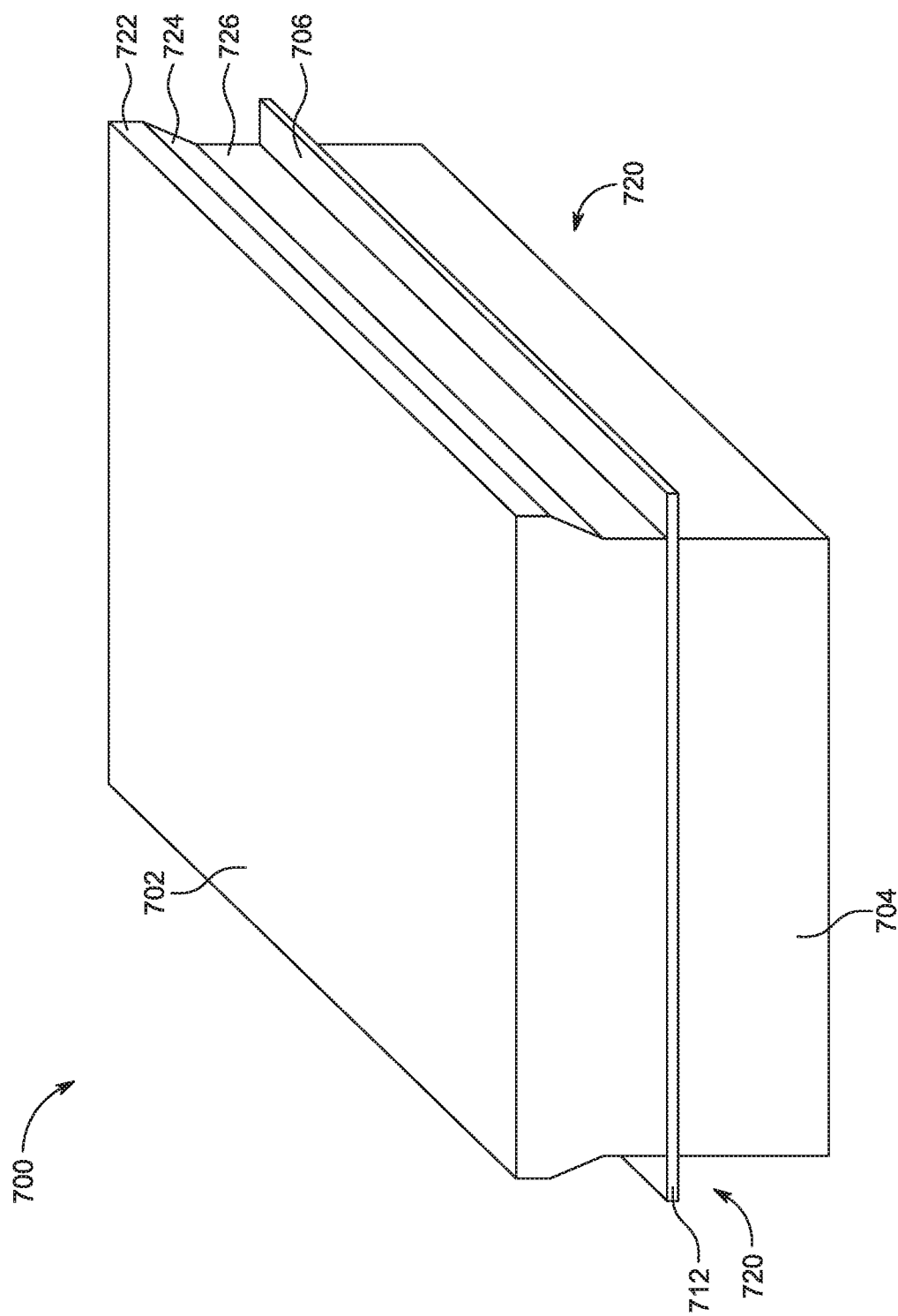
FIG. 20 schematically illustrates a perspective view of a flooring product with two opposing profiled edges and the acoustic barrier layer extending beyond the profiled edges.

FIG. 19 schematically illustrates a cross-sectional view of two flooring products 600 engaged via the lap joint features 608 and 610. As illustrated in FIG. 19, when the two flooring products 600 are engaged, the protrusion 612 of one flooring product 600 engages the acoustic barrier layer 606 of the other flooring product 600. Such engagement increases the continuity of acoustic barrier layers 606 across adjacent flooring products 600 after installation of the flooring products 600. Such continuity of the acoustic barrier layers 606 provides for better and more consistent acoustic barrier properties for the installed flooring assembly.

The protrusion 612 can provide the additional benefit of encouraging a gap between adjacent flooring products 600 in a flooring assembly. As illustrated in FIG. 19, the protrusion 612 causes a gap 614 to form between adjacent floor products 600. Such a gap 614 can be proportional to the length the protrusion 612 extends into the bottom lap portion 610. For example, in one embodiment, once assembled, the flooring products 600 can include a gap of approximately 1/8 of an inch. In another embodiment, once assembled, the flooring products 600 can include a gap of approximately 1/16 of an inch.

It will be understood that although the protrusion 612 is illustrated and described as extending onto the bottom lap portion, a flooring product can also be designed and fabricated such that a protrusion extends onto the top lap portion of the flooring product. It will further be understood that a flooring product can also be designed and fabricated such that a first protrusion extends onto the top lap portion and a second protrusion extends onto the bottom lap portion of the flooring product.

Flooring products can be arranged with both tongue and groove features and lap joint features. For example, an eight foot by two foot flooring product can have a tongue feature formed along one eight foot edge and a groove feature formed along the opposite eight foot edge, and the flooring product can have a top lap feature formed along one two foot edge and a bottom lap feature formed along the opposite two foot edge. When such flooring products are assembled into a flooring assembly, adjacent flooring products will be engaged by the tongue and groove features along the eight foot edge and engaged by the lap joint features along the two foot edge. Such an arrangement can provide a substantially stiff and stable flooring assembly. The protrusion features of acoustic barrier layers as described herein can be included in such embodiments to gain the benefits of such protrusions.

Figure 21:
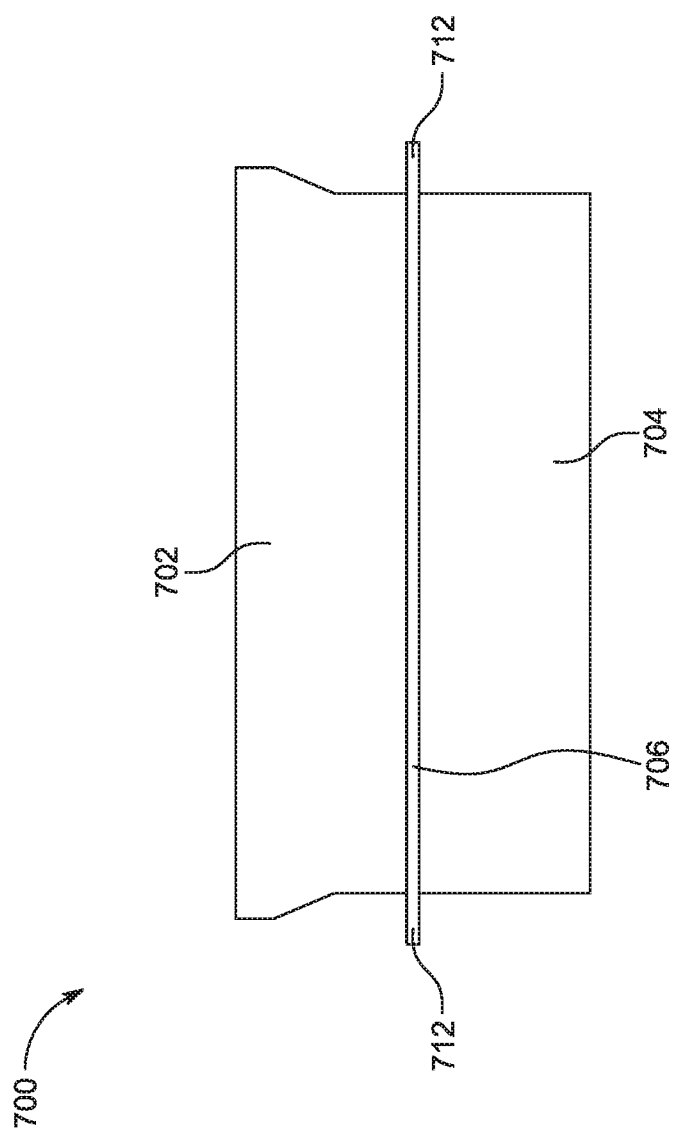
FIG. 21 schematically illustrates a front elevation view of the flooring product of FIG. 20.

As illustrated in FIGS. 20-37, flooring products can be designed to include "profiled" edges. As used herein, "profiled edges" generally means that the edges of flooring products are not simply planer, stepped, or recessed (such as when an edge includes a tongue and groove feature or a lap joint feature), but also include contours such as angled surfaces. A first example of a flooring product 700 with profiled edges is illustrated in FIGS. 20-23. The flooring product 700 includes a first OSB layer 702, a second OSB layer 704, and an acoustic barrier layer 706 positioned between the first 702 and second 704 OSB layers. The acoustic barrier layer 706 is arranged such that a protrusion 712 extends past the ends of the first OSB layer 702 and the second OSB layer 704 (as best illustrated in FIG. 21). Two edges of the flooring product 700 are profiled edges 720. Each profiled edge 720 is formed by features formed into the first OSB layer 702. In the embodiment of FIGS. 20-23, the first OSB layer 702 of the flooring product 700 includes an upper vertical face 722, an angled face 724, and a lower vertical face 726. The upper vertical face 722 extends from the top surface of the first OSB layer 702 downward until it intersects with the angled face 724. The angled face 724 extends from the end of the upper vertical face 722 downward until it intersects with the lower vertical face 726. The lower vertical face 726 extends from the end of the angled face 724 downward to the bottom surface of the first OSB layer 702. As illustrated in FIGS. 20-23, the lower vertical face 726 is recessed as compared to the upper vertical face 722, and the edge of the second OSB layer 704 is generally in the same plane as the lower vertical face 726.

Figure 22:
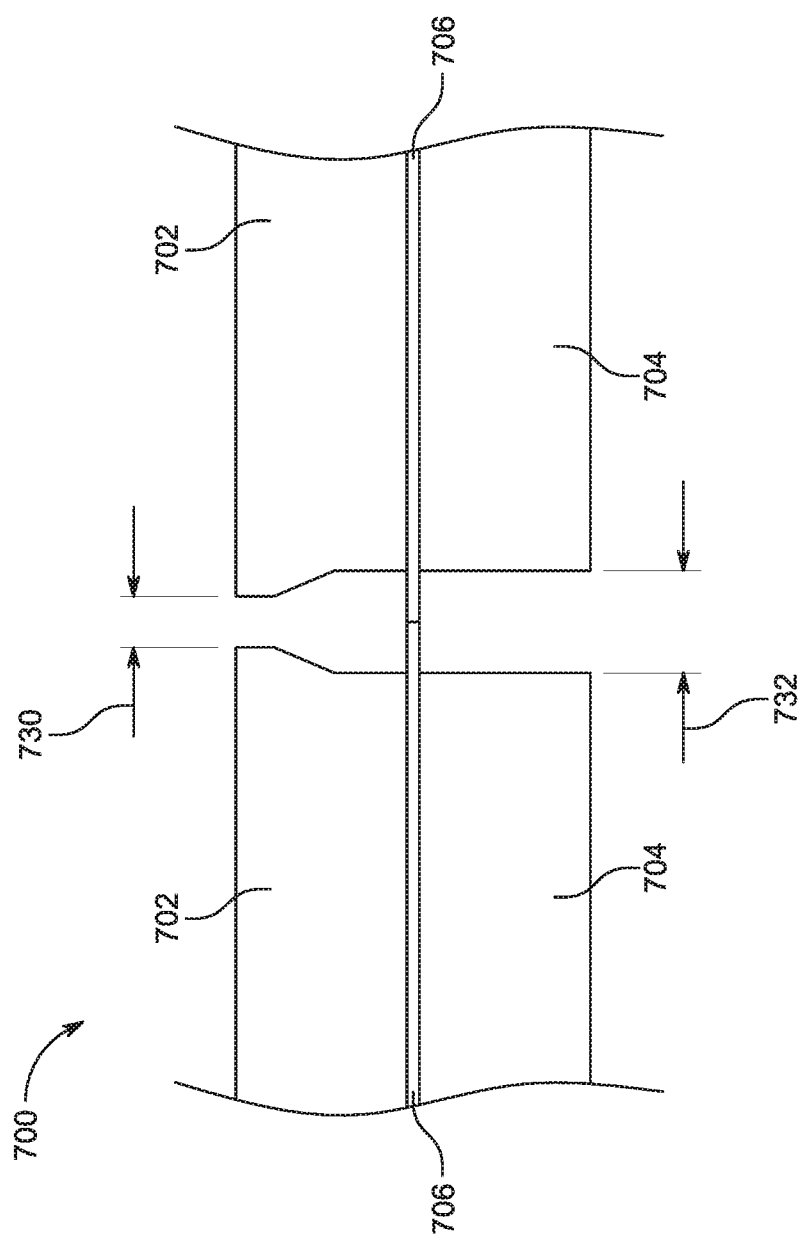
FIG. 22 schematically illustrates a front elevation view of two flooring products of FIG. 20 positioned adjacently such that the acoustic barrier layers of the two flooring products are engaged.
Figure 23:
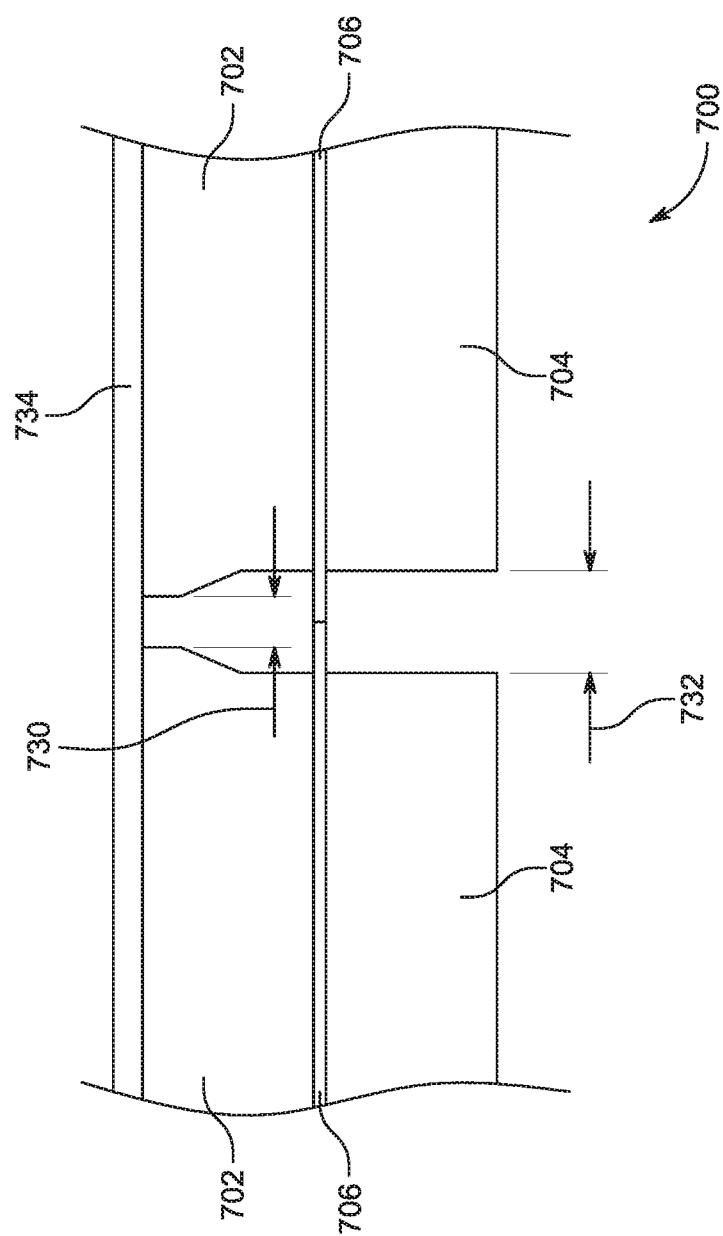
FIG. 23 schematically illustrates a front elevation view of the arrangement of the pair of flooring products of FIG. 22 with a finished flooring layer positioned on top of the pair of flooring products.

FIG. 22 illustrates a pair of engaged flooring products 700. When the pair of flooring products 700 is engaged, the respective protrusions 712 from the pair of flooring products 700 come into contact, which results in a gap 730 between the flooring products 700 near the top portion of the flooring products 700 and another gap 732 between the flooring products 700 near the bottom portion of the flooring products 700. In one example, the gap 730 near the top portion of the flooring products 700 is about ¹⁄₁₆ of an inch in width, and the gap 732 near the bottom portion of the flooring products 700 is about ³⁄₁₆ inches in width. FIG. 23 illustrates the arrangement of the pair of flooring products 700 of FIG. 22 with the addition of a top finished layer 734 on top of the engaged flooring products 700. Although the flooring product of FIGS. 20-23 illustrate gaps (730, 732) of ¹⁄₁₆ and ³⁄₁₆ inches, it will be understood that flooring products can be designed to result in gaps that are either larger or smaller than those described and illustrated herein.

Figure 24:
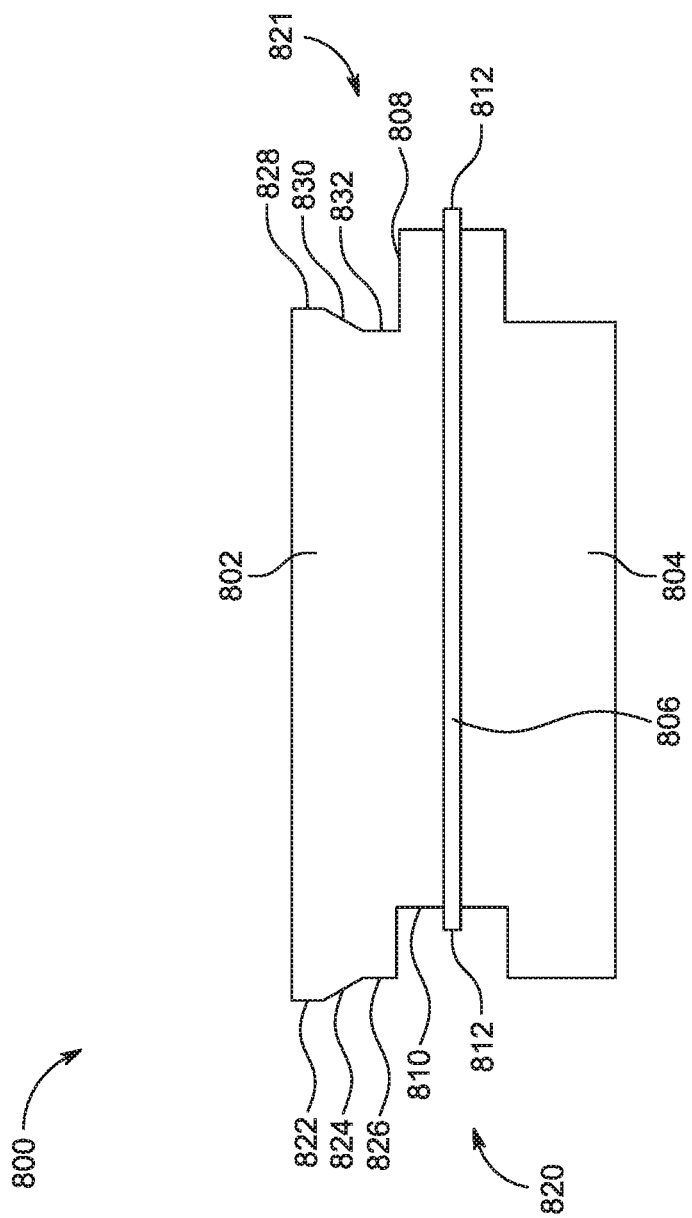
FIG. 24 schematically illustrates a front elevation view of a flooring product with profiled edges, tongue and groove features, and the acoustic barrier layer extending beyond the tongue feature in into the groove feature.
Figure 25:
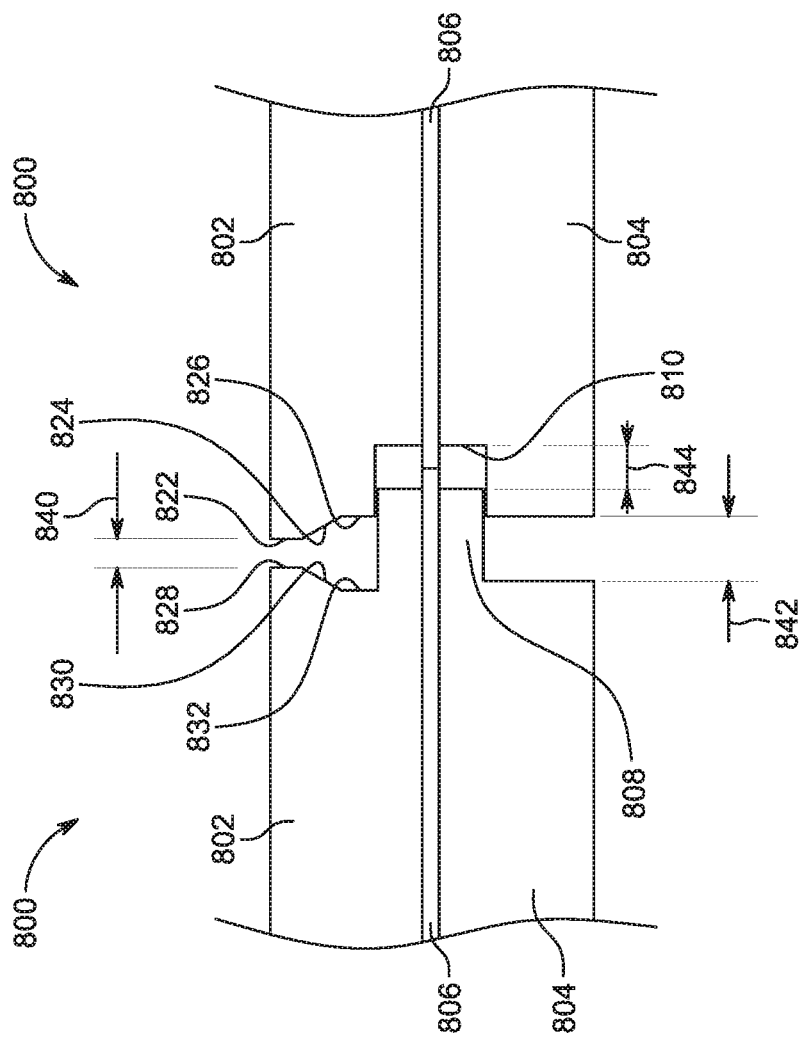
FIG. 25 schematically illustrates a front elevation view of two flooring products of FIG. 24 engaged via a tongue and groove system with the extending acoustic barrier layer of one flooring product engaged with the other flooring product.
Figure 26:
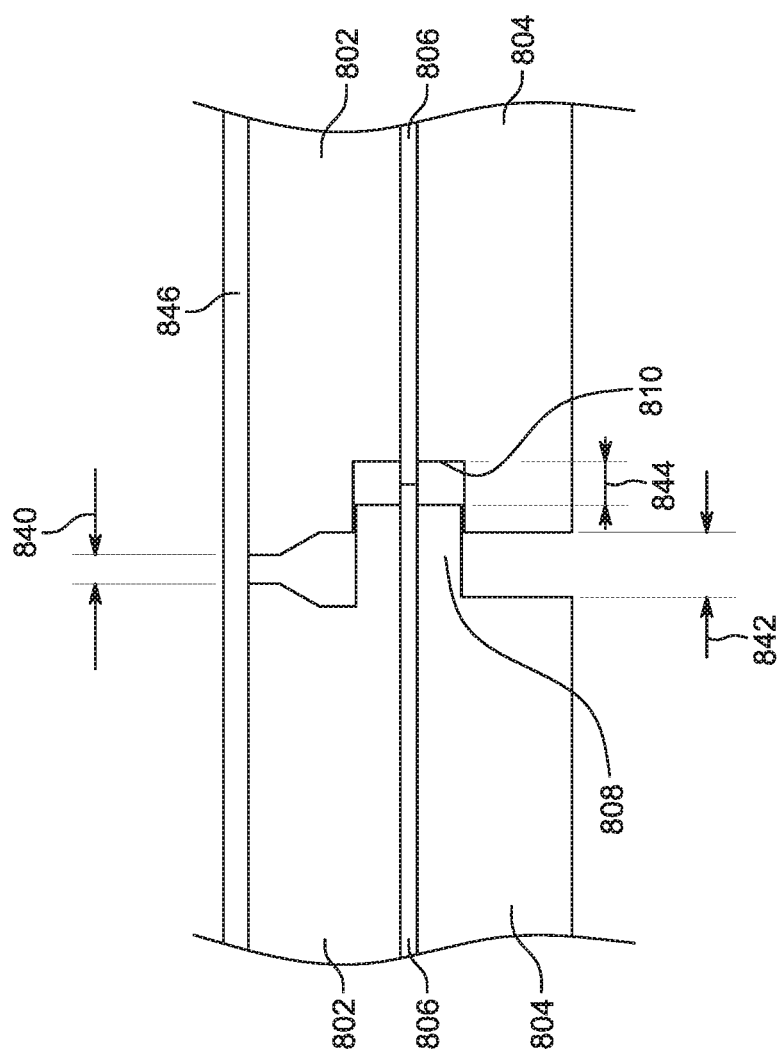
FIG. 26 schematically illustrates a front elevation view of the arrangement of the pair of flooring products of FIG. 25 with a finished flooring layer positioned on top of the pair of flooring products.

FIGS. 24-26 illustrate a flooring product 800 similar to the flooring product 700 of FIGS. 20-23, but with the addition of tongue and groove features. FIG. 24 illustrates a front view of the flooring product 800, which is comprised of a first OSB layer 802, a second OSB layer 804, and an acoustic barrier layer 806 positioned between the first 802 and second 804 OSB layers. The flooring product 800 includes a tongue feature 808 and a groove feature 810 similar to such features described herein. The acoustic barrier layer 806 includes protrusions 812 that extend into both the groove feature 810 and past the tongue feature 808. The flooring product 800 further includes a first profile edge 820 along the grooved edge of the flooring product 800 and a second profile edge 821 along the tongue edge of the flooring product 800.

Along the grooved edge of the flooring product 800, the first profiled edge 820 includes an upper vertical face 822, an angled face 824, and a lower vertical face 826. The upper vertical face 822 extends from the top surface of the first OSB layer 802 downward until it intersects with the angled face 824. The angled face 824 extends from the end of the upper vertical face 822 downward until it intersects with the lower vertical face 826. The lower vertical face 826 extends from the end of the angled face 824 downward to the top surface of the groove feature 810. Along the tongue edge of the flooring product 800, the second profiled edge 821 includes an upper vertical face 828, an angled face 830, and a lower vertical face 832. The upper vertical face 828 extends from the top surface of the first OSB layer 802 downward until it intersects with the angled face 830. The angled face 830 extends from the end of the upper vertical face 828 downward until it intersects with the lower vertical face 832. The lower vertical face 832 extends from the end of the angled face 830 downward to the top surface of the tongue feature 808. The lower vertical faces (826 and 832) are recessed as compared to the upper vertical faces (822 and 828), and the edge of the second OSB layer 804 is generally in the same plane as the lower vertical faces (826 and 832).

FIG. 25 illustrates a pair of engaged flooring products 800. When the pair of flooring products 800 is engaged, the tongue feature 808 of one flooring product 800 is inserted into the groove feature 810 of the other flooring product 800 until the protrusions 812 from the pair of flooring products 800 come into contact. When so engaged, a first gap 840 is formed between the flooring products 800 near the top portion of the flooring products 800, a second gap 842 is formed between the flooring products 800 near the bottom portion of the flooring products 800, and a third gap 844 is formed between the vertical surface of the tongue feature 808 and the vertical surface of the groove feature 810. In one example, the first gap 840 is about ¹⁄₁₆ of an inch in width, the second gap 842 is about ³⁄₁₆ inches in width, and the third gap 844 is about ⅛ of an inch in width. FIG. 26 illustrates the arrangement of the pair of flooring products 800 of FIG. 24 with the addition of a top finished layer 846 on top of the engaged flooring products 800. Although the flooring product of FIGS. 24-26 illustrate gaps (840, 842, and 844) of ¹⁄₁₆, ⅛, and ³⁄₁₆ inches, it will be understood that flooring products can be designed to result in gaps that are either larger or small that those described and illustrated herein.

Figure 27:
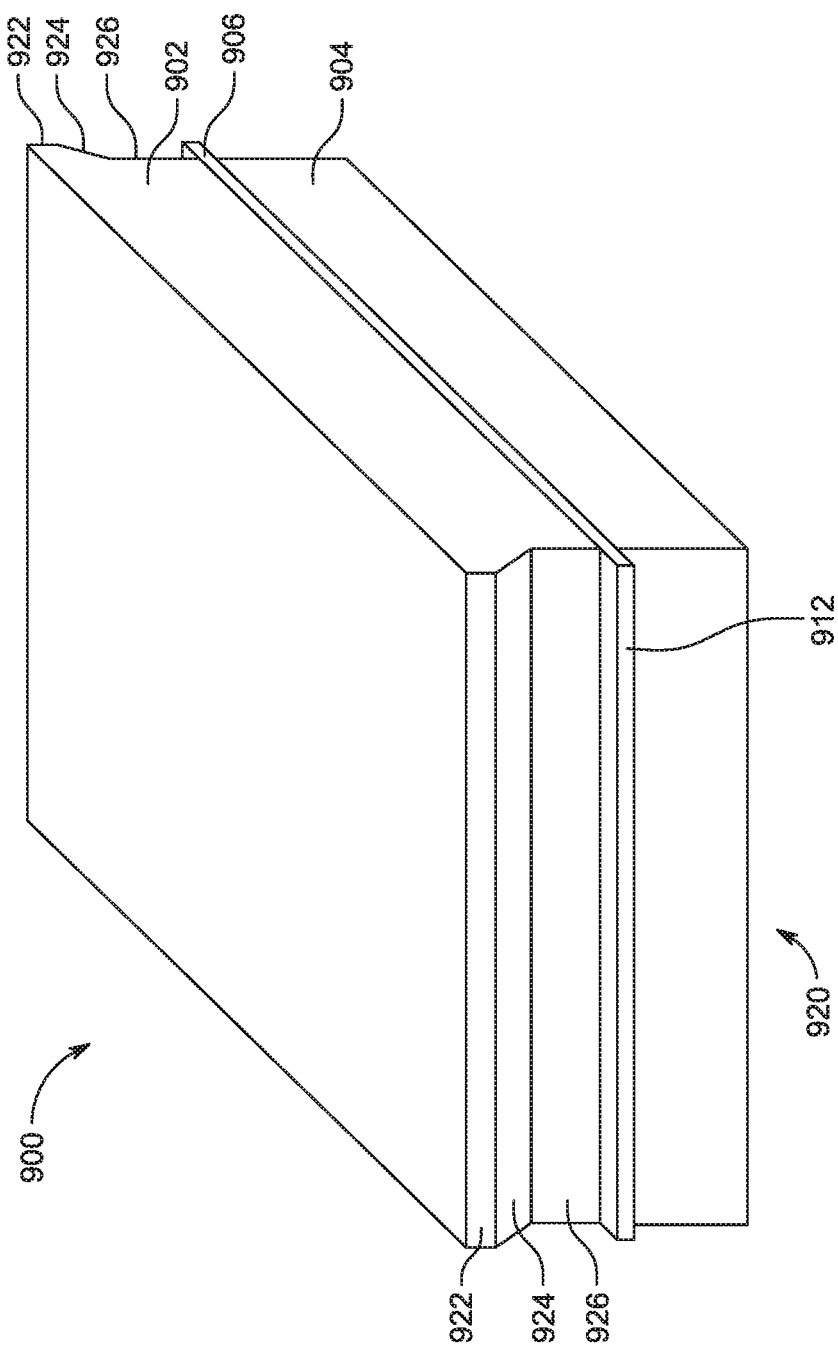
FIG. 27 schematically illustrates a perspective view of another flooring product with a pair of opposing profiled edges and the acoustic barrier layer extending beyond the profiled edges.

FIG. 27 illustrates another embodiment of a flooring product 900 similar to the flooring product 700 of FIGS. 20-23. The flooring product 900 includes a first OSB layer 902, a second OSB layer 904, and an acoustic barrier layer 906 positioned between the first 902 and second 904 OSB layers. Flooring product 900 differs in that the profiled edges 920 and the protrusion 912 of the acoustic barrier layer 906 are along the "short" edge of the flooring product 900. This is to say that flooring products can be manufactured so that one pair of opposing edges are longer than the other pair of opposing edges. As described herein, the dimensions of flooring products can include 8 foot by 4 foot products and 8 foot by 2 foot products. As will be understood, in these two examples, the 8 foot edge would be considered the "long" edge and the 4 foot edge and the 2 foot edge would be considered the "short" edge. Similar to the description of flooring product 700, flooring product 900 includes a pair of opposing profiled edges 920, each with an upper vertical face 922, an angled face 924, and a lower vertical face 926. When a pair of flooring products 900 are engaged, a first gap is formed near the top of the flooring product 900 and a second gap is formed near the bottom of the flooring product 900. A flooring product 900 such as that illustrated in FIG. 27 can also include tongue and groove features on the profiled edges similar to the description of the flooring product illustrated in FIGS. 24-26.

Figure 28:
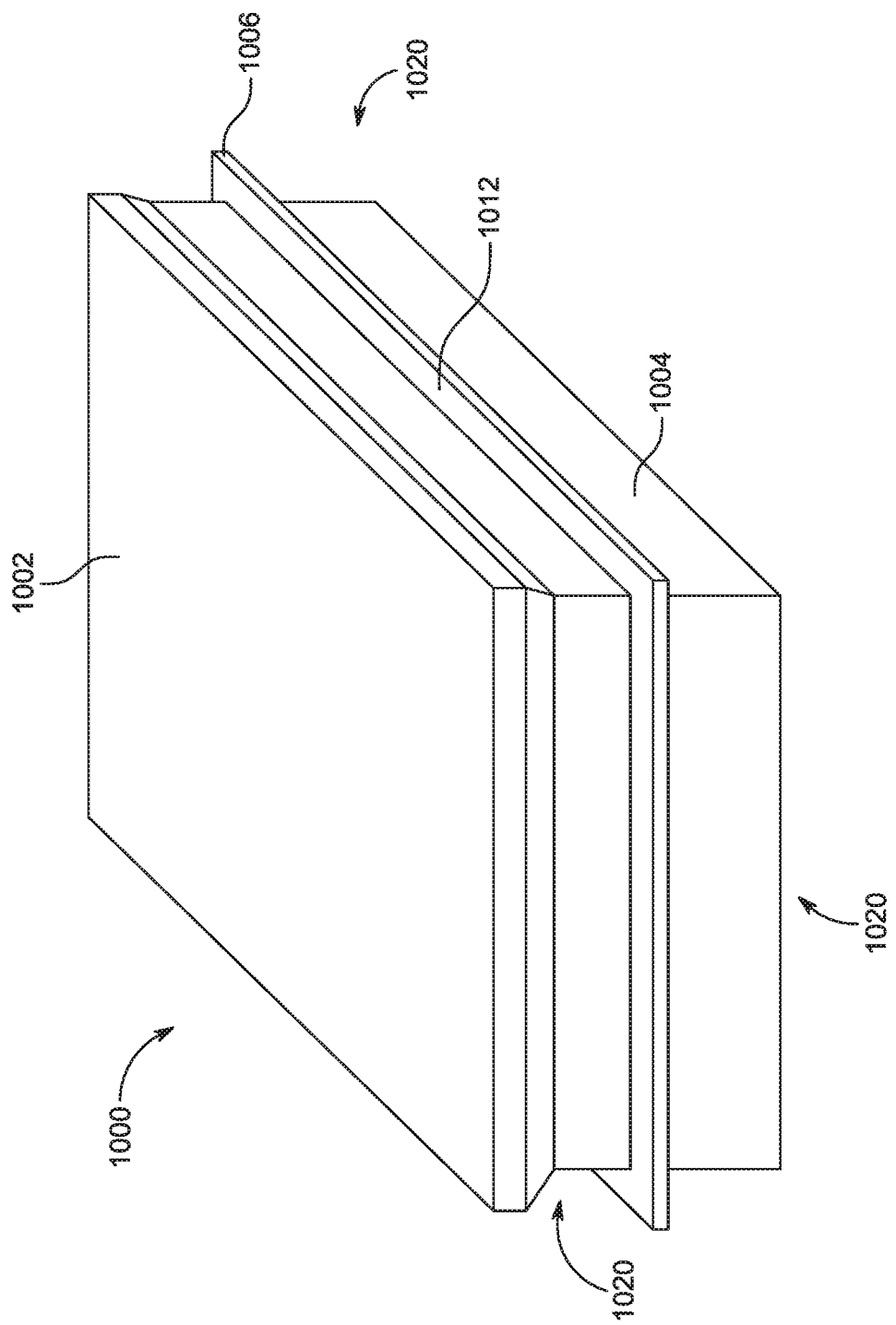
FIG. 28 schematically illustrates a perspective view of a flooring product with four profiled edges and the acoustic barrier layer extending beyond the profiled edges.
Figure 29:
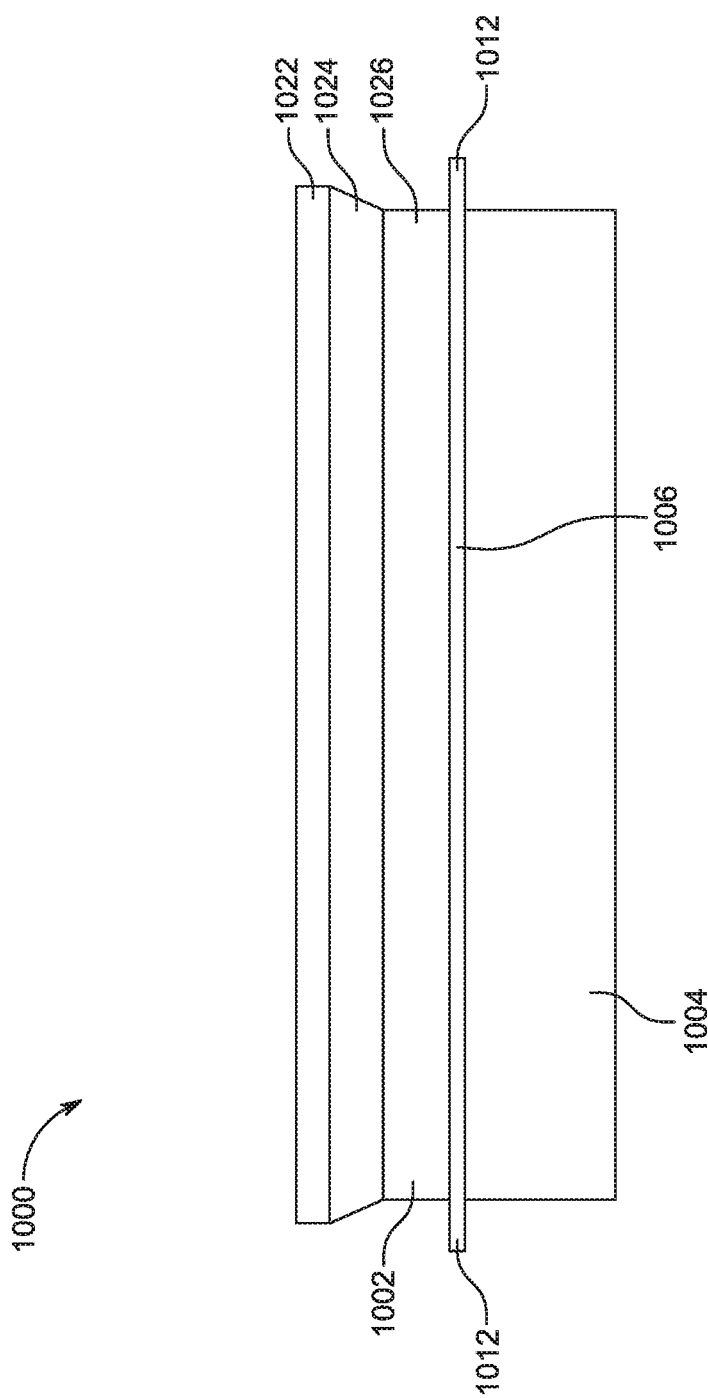
FIG. 29 schematically illustrates a side elevation view of the flooring product of FIG. 28.
Figure 30:
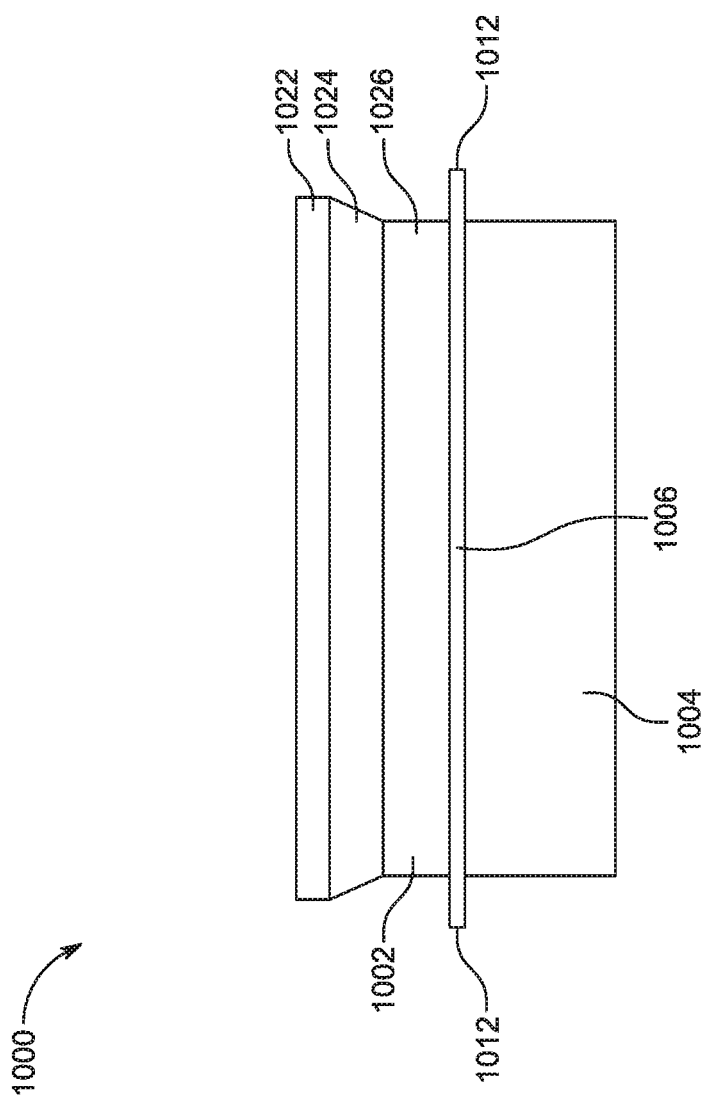
FIG. 30 schematically illustrates a front elevation view of the flooring product of FIG. 28.
Figure 31:
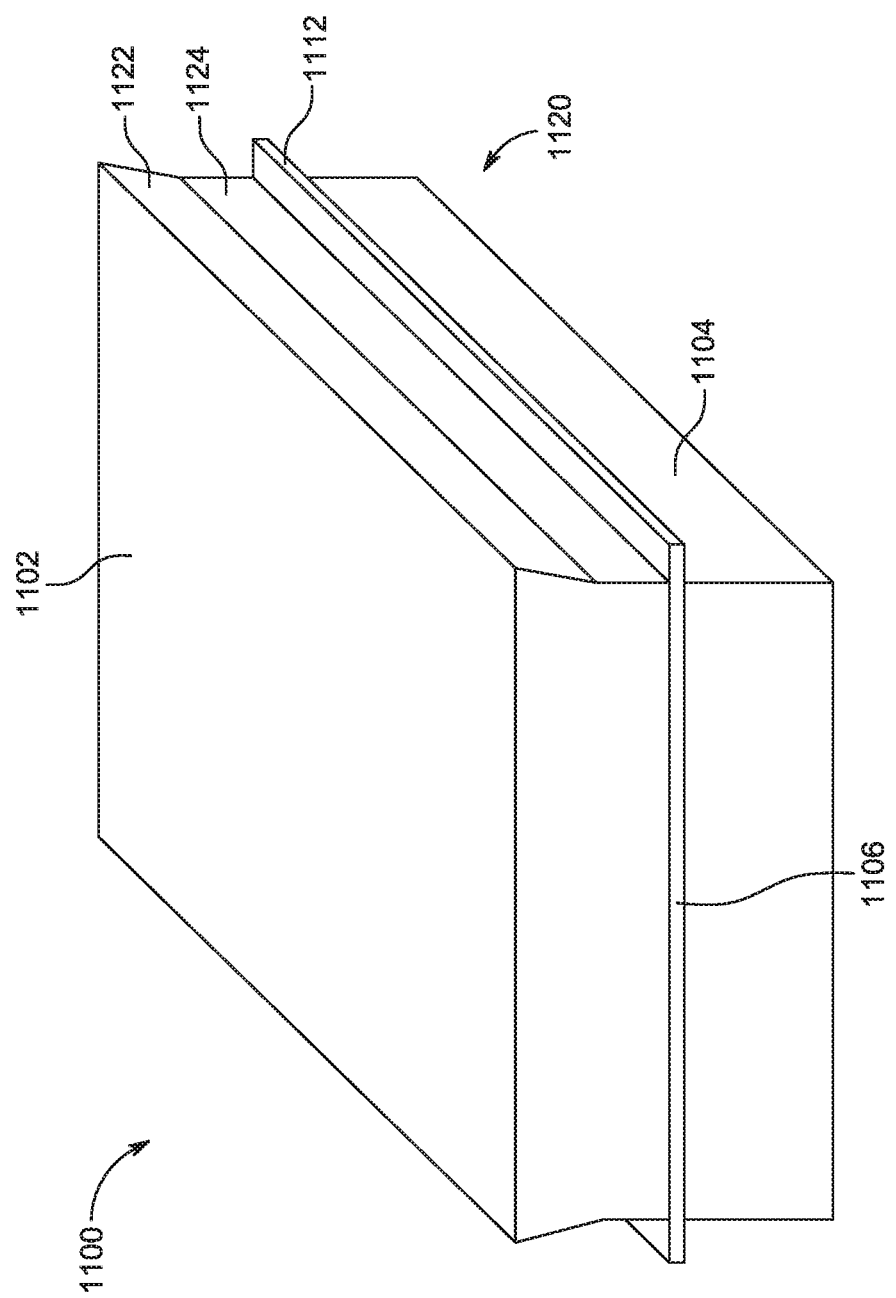
FIG. 31 schematically illustrates a perspective view of another flooring product with a pair of opposing profiled edges and the acoustic barrier layer extending beyond the profiled edges.

FIG. 28 illustrates another embodiment of a flooring product 1000 similar to the flooring product 700 of FIGS. 20-23 and the flooring product 900 of FIG. 27. The flooring product 1000 includes a first OSB layer 1002, a second OSB layer 1004, and an acoustic barrier layer 1006 positioned between the first 1002 and second 1004 OSB layers. Flooring product 1000 differs in that each of the four edges of the flooring product 1000 is a profiled edge 1020, and the protrusion 912 of the acoustic barrier layer 1006 extends along all four edges of the flooring product 1000. FIG. 29 illustrates a side elevation view of the long edge of the flooring product 1000, and FIG. 30 illustrates a front elevation view of the short edge of the flooring product 1000.

Similar to the descriptions of flooring products 700 and 900, each edge of the flooring product 1000 includes an upper vertical face 1022, an angled face 1024, and a lower vertical face 1026. When a pair of flooring products 1000 are engaged, a first gap is formed near the top of the flooring product 1000 and a second gap is formed near the bottom of the flooring product 1000. A flooring product 1000 such as that illustrated in FIGS. 28-30 can also include tongue and groove features on an opposing pair of profiled edges similar to the description of the flooring product illustrated in FIGS. 24-26, or on all four profiled edges.

Figure 32:
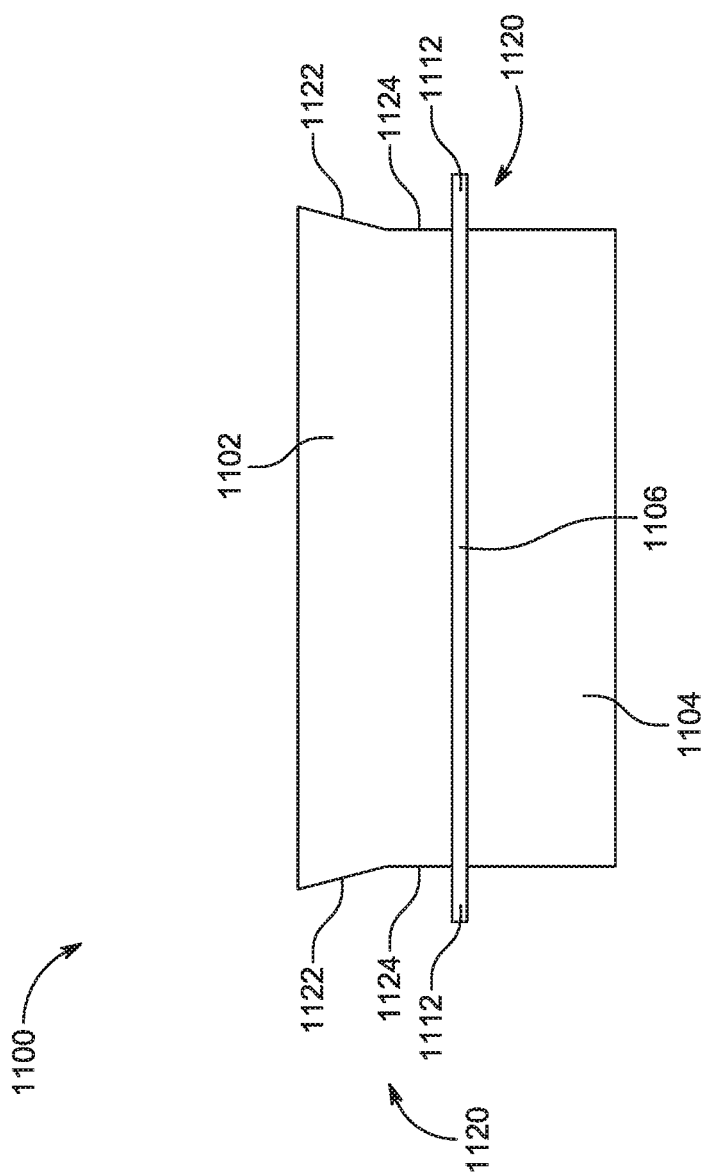
FIG. 32 schematically illustrates a front elevation view of the flooring product of FIG. 31.

FIGS. 31-34 illustrates a flooring product 1100 with an alternative profiled edge. The flooring product 1100 includes a first OSB layer 1102, a second OSB layer 1104, and an acoustic barrier layer 1106 positioned between the first 1102 and second 1104 OSB layers. The acoustic barrier layer 1106 is arranged such that a protrusion 1112 extends past the ends of the first OSB layer 1102 and the second OSB layer 1104 (as best illustrated in FIG. 32). Two edges of the flooring product 1100 are profiled edges 1120. Each profiled edge 1120 is formed by features formed into the first OSB layer 1102. The first OSB layer 1102 of the flooring product 1100 includes an angled face 1122 and a lower vertical face 1124. The angled face 1122 extends from the top surface of the first OSB layer 1102 downward until it intersects with the lower vertical face 1124. The lower vertical face 1124 extends from the end of the angled face 1122 downward to the bottom surface of the first OSB layer 1102. The lower vertical face 1124 is recessed as compared to the angled face 1122, and the edge of the second OSB layer 1104 is generally in the same plane as the lower vertical face 1126.

Figure 33:
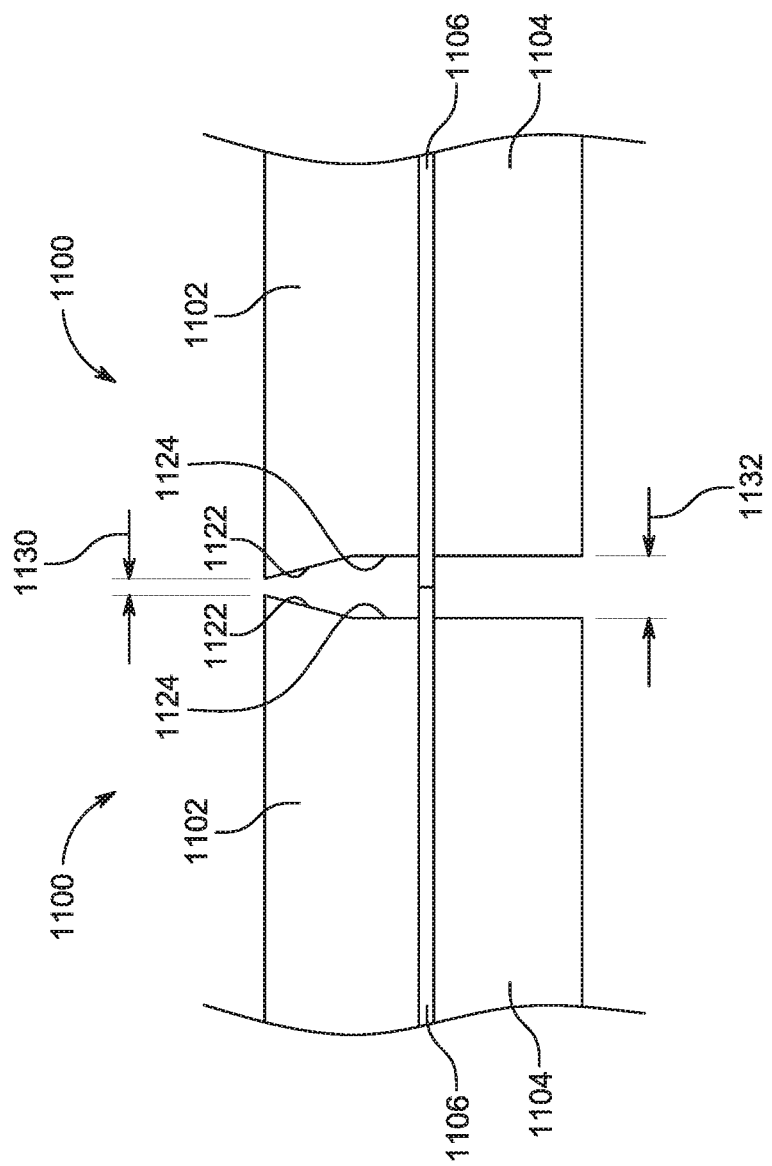
FIG. 33 schematically illustrates a front elevation view of two flooring products of FIG. 31 positioned adjacently such that the acoustic barrier layer of the two flooring products are engaged.
Figure 34:
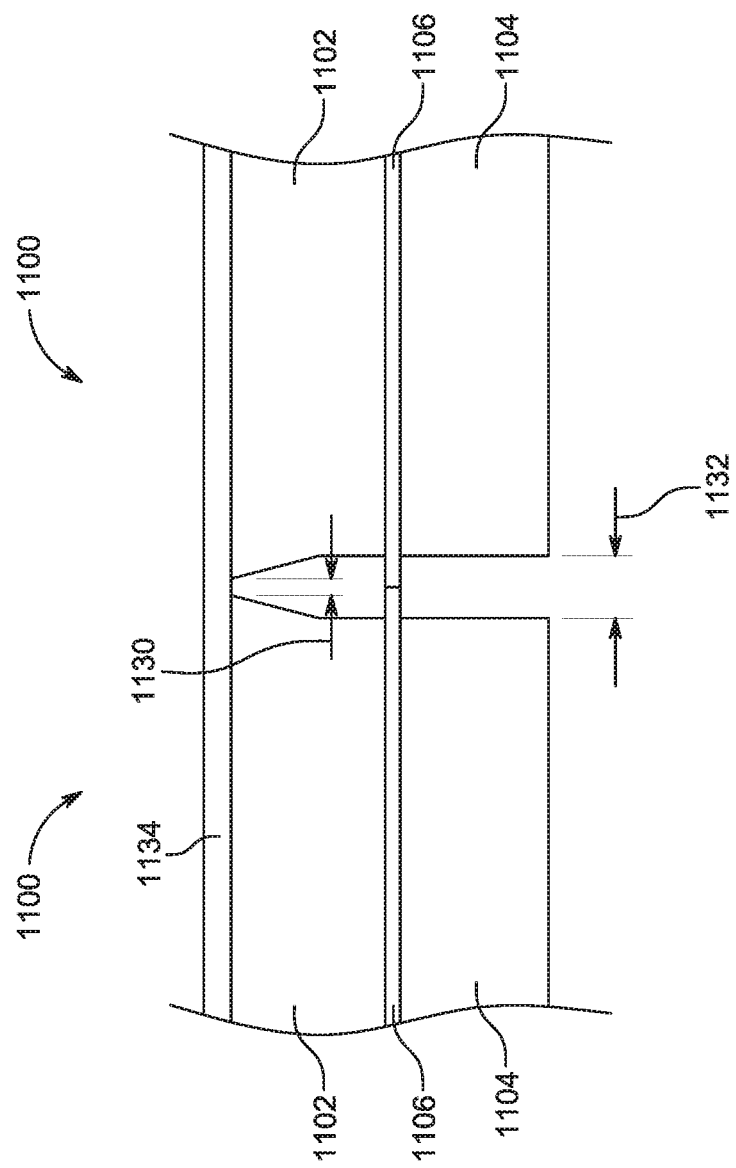
FIG. 34 schematically illustrates a front elevation view of the arrangement of the pair of flooring products of FIG. 31 with a finished flooring layer positioned on top of the pair of flooring products FIG. 35 schematically illustrates a front elevation view of a flooring product with profiled edges, tongue and groove features, and the acoustic barrier layer extending beyond the tongue feature in into the groove feature.

FIG. 33 illustrates a pair of engaged flooring products 1100. When the pair of flooring products 1100 is engaged, the respective protrusions 1112 from the pair of flooring products 1100 come into contact, which results in a first gap 1130 between the flooring products 1100 near the top portion of the flooring products 1100 and second gap 1132 between the flooring products 1100 near the bottom portion of the flooring products 1100. In one example, the gap 1130 near the top portion of the flooring products 1100 is about $\frac{1}{16}$ of an inch in width, and the gap 1132 near the bottom portion of the flooring products 1100 is about $\frac{3}{16}$ inches in width. FIG. 34 illustrates the arrangement of the pair of flooring products 1100 of FIG. 31 with the addition of a top finished layer 1134 on top of the engaged flooring products 1100.

Although the flooring product of FIGS. 31-34 illustrate gaps (1130, 1132) of $\frac{1}{16}$ and $\frac{3}{16}$ inches, it will be understood that flooring products can be designed to result in gaps that are either larger or small that those described and illustrated herein.

Figure 35:
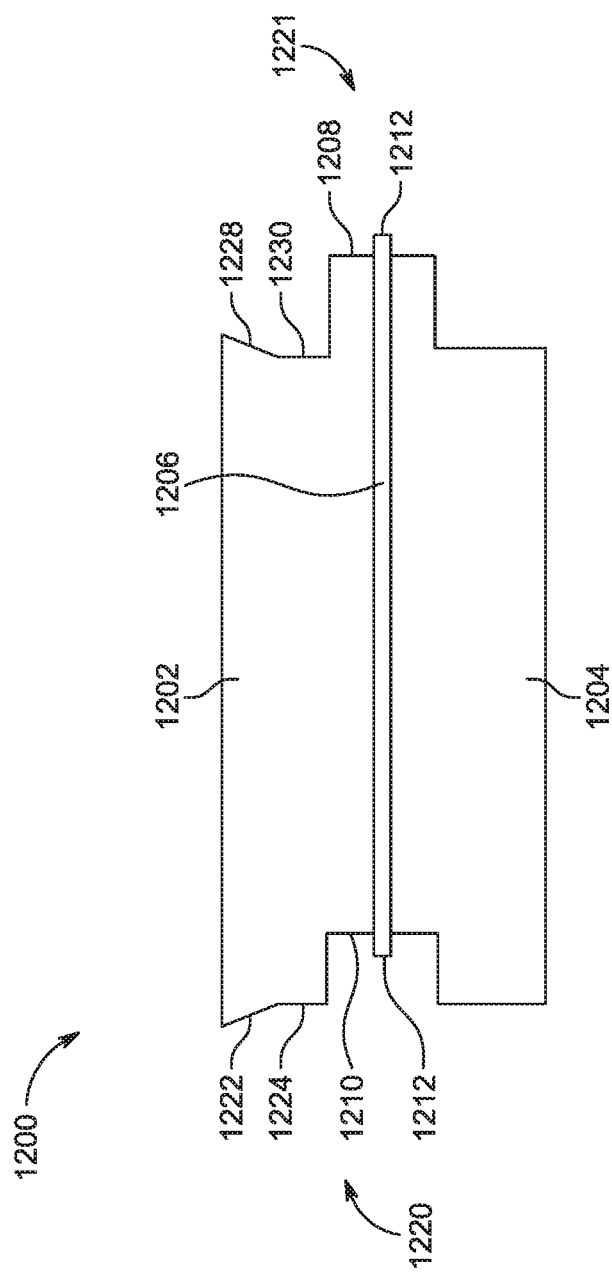
Figure 36:
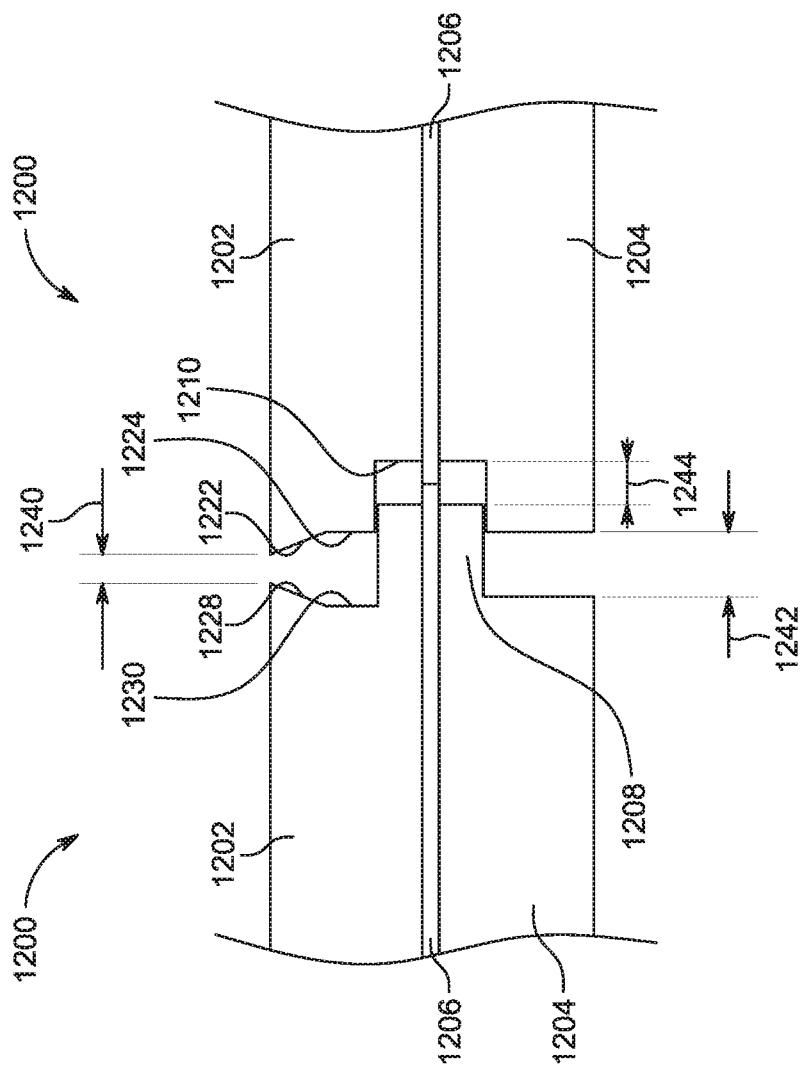
FIG. 36 schematically illustrates a front elevation view of two flooring products of FIG. 35 engaged via a tongue and groove system with the extending acoustic barrier layer of one flooring product engaged with the other flooring product.
Figure 37:
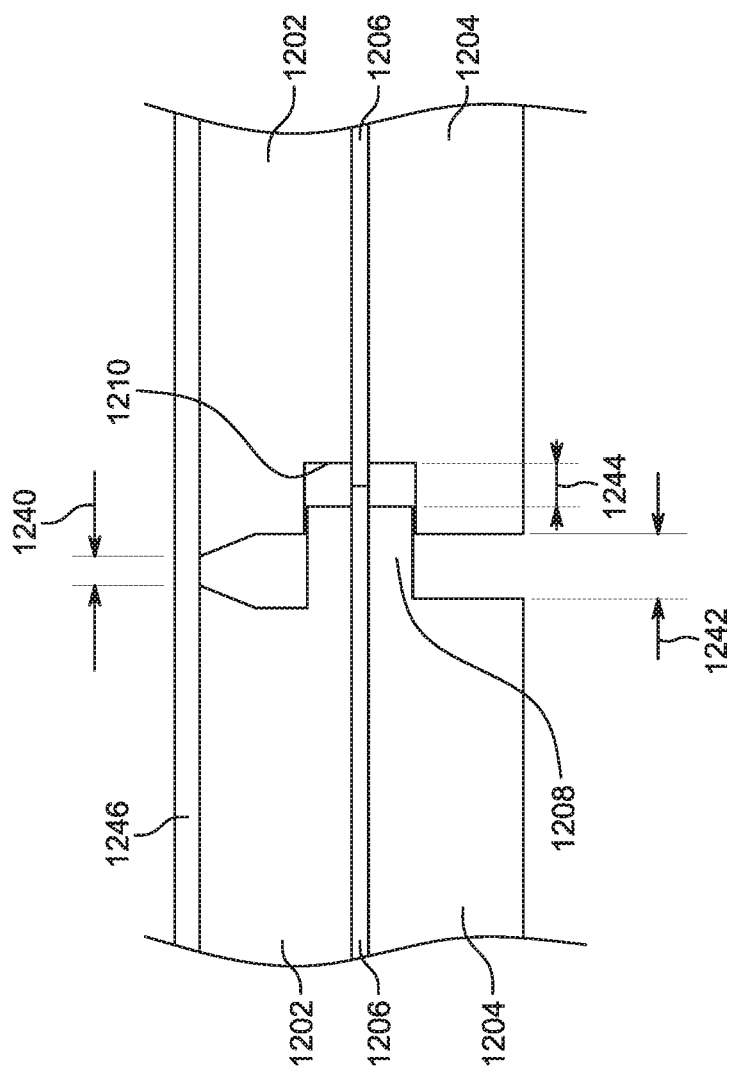
FIG. 37 schematically illustrates a front elevation view of the arrangement of the pair of flooring products of FIG. 35 with a finished flooring layer positioned on top of the pair of flooring products.

FIGS. 35-37 illustrate a flooring product 1200 similar to the flooring product 1100 of FIGS. 31-35, but with the addition of tongue and groove features. FIG. 35 illustrates a front view of the flooring product 1200, which is comprised of a first OSB layer 1202, a second OSB layer 1204, and an acoustic barrier layer 1206 positioned between the first 1202 and second 1204 OSB layers. The flooring product 1200 includes a tongue feature 1208 and a groove feature 1210 similar to such features described herein. The acoustic barrier layer 1206 includes protrusions 1212 that extend into both the groove feature 1210 and past the tongue feature 1208. The flooring product 1200 further includes a first profile edge 1220 along the grooved edge of the flooring product 1200 and a second profile edge 1221 along the tongue edge of the flooring product 1200.

Along the grooved edge of the flooring product 1200, the first profiled edge 1220 includes an angled face 1222 and a lower vertical face 1224. The angled face 1222 extends from the top surface of the first OSB layer 1202 downward until it intersects with the lower vertical face 1224. The lower vertical face 1224 extends from the end of the angled face 1222 downward to the top surface of the groove feature 1210. Along the tongue edge of the flooring product 1200, the second profiled edge 1221 includes an angled face 1228 and a lower vertical face 1230. The angled face 1228 extends from the top surface of the first OSB layer 1202 downward until it intersects with the lower vertical face 1230. The lower vertical face 1230 extends from the end of the angled face 1230 downward to the top surface of the tongue feature 1208. The lower vertical faces (1224 and 1230) are recessed as compared to the angled faces (1222 and 1228), and the edge of the second OSB layer 1204 is generally in the same plane as the lower vertical faces (1224 and 1230).

FIG. 36 illustrates a pair of engaged flooring products 1200. When the pair of flooring products 1200 is engaged, the tongue feature 1208 of one flooring product 1200 is inserted into the groove feature 1210 of the other flooring product 1200 until the protrusions 1212 from the pair of flooring products 1200 come into contact. When so engaged, a first gap 1240 is formed between the flooring products 1200 near the top portion of the flooring products 1200, a second gap 1242 is formed between the flooring products 1200 near the bottom portion of the flooring products 1200, and a third gap 1244 is formed between the vertical surface of the tongue feature 1208 and the vertical surface of the groove feature 1210. In one example, the first gap 1240 is about $\frac{1}{16}$ of an inch in width, the second gap 1242 is about $\frac{3}{16}$ inches in width, and the third gap 1244 is about $\frac{1}{8}$ of an inch in width. FIG. 37 illustrates the arrangement of the pair of flooring products 1200 of FIG. 36 with the addition of a top finished layer 1246 on top of the engaged flooring products 1200. Although the flooring product of FIGS. 35-37 illustrate gaps (1240, 1242, and 1244) of $\frac{1}{16}$, $\frac{1}{8}$, and $\frac{3}{16}$ inches, it will be understood that flooring products can be designed to result in gaps that are either larger or smaller than those described and illustrated herein.

The components of the flooring products can be individually shipped to a construction site for assembly in the field. Workmen in the field can secure the component of the flooring product using adhesives, mechanical components, and other techniques. In another embodiment, adhesive can be pre-applied to one or more of the components, and the adhesives are cured in the field. In one example, a plurality of OSB layers and acoustic barrier layers can be transported to a construction site as individual components. Workmen on site can secure two OSB layers and an acoustic barrier layer together to make a composite product similar to the flooring product discussed herein. Such a composite product can be assembled as the workmen are installing the floor. Alternatively, such composite layers can be assembled by workmen near the location of final installation and the composite product can be installed as part of the floor. In another example, large sheets of OSB and acoustic barrier material can be transported to a construction site. Such large sheets can be cut into sizes applicable to the floor being installed. Once cut to appropriate size, two OSB layers and an acoustic barrier layer can be assembled into a composite layer for use in installing the floor. Alternatively, once cut to appropriate size, two OSB layers and an acoustic barrier layer can be assembled as the floor is installed.

Constructing buildings using flooring assemblies described herein can provide substantial time and cost savings for builders as compared to using traditional building materials and techniques. In traditional building techniques, workmen first complete the framing of each story of a building, then subsequently return to each story to complete the flooring assembly. Such a technique includes hauling flooring materials through a partially completed building such as up stairways the through framed doorways and hallways. Such techniques also include the need for custom cutting flooring materials to accommodate framed walls and installed features on each story of the building. When building with the flooring products disclosed herein, workmen can install a complete flooring assembly as each story of a building is completed. For example, workmen can install a plurality of four foot by eight foot flooring products to complete the flooring assembly on a given story of a building. The workmen subsequently erect the framing for that story on top of the completed flooring assembly. Once framing is completed, the workmen move to the next story without the need to return and complete the flooring. Such a technique limits the time consuming and labor intensive task of moving flooring materials in small quantities because materials can be moved in bulk and placed on each story as that story is built out. In addition, because the flooring assembly system is installed before framing, the need for custom cutting of flooring materials is substantially limited.

The floor assemblies as described herein can provide for a substantial acoustic barrier to control the propagation of noise from one room to another. Certain flooring products can include high density materials, which can provide for the absorption and/or deflection of acoustic energy directed at the described flooring assemblies. It will be appreciated that the materials described herein are generally materials that can be used as is (with the exception of cutting to size) during construction. There is no need for the use of water or other "wet" elements or components, and, thus, there is no time needed for drying, curing or setting of the materials. Additionally, all the materials described herein can be generally used during construction regardless of the ambient temperature.

Flooring assemblies disclosed herein have been tested for use as acoustic barriers to determine the STC and IIC ratings for various arrangements of flooring assemblies. Standard protocols were used. STC was measured using ASTM E90-09 and calculated according to ASTM E413-10. IIC was measured using ASTM E492-09 and calculated according to ASTM E989-10. Generally, a score of 50 in a laboratory setting and a score of 45 for in-filed testing under either the STC or IIC protocol meets local, state, and federal building regulations. Table 1 includes exemplary arrangements that have achieved a score of 50 or higher under the protocols.

TABLE 1

| | Layer 1 | Layer 2 | Layer 3 | Layer 4 | Result | Notes |
|---|---|---|---|---|---|---|
| 1 | Cotton UL | ¾" OSB | 5 mm rubber | ¾" OSB | 50 STC | |
| 2 | vinyl flooring | ¾" OSB | 2 mm rubber | ¾" OSB | 52 IIC | |
| 3 | vinyl plank | 12.7 mm OSB | 2 mm rubber | 18.3 mm OSB | 61 STC | |
| 4 | vinyl plank | 12.7 mm OSB | 2 mm rubber | 18.3 mm OSB | 58 IIC | |
| 5 | vinyl plank | 18.3 mm OSB | 2 mm rubber | 18.3 mm OSB | 60 STC | |
| 6 | vinyl plank | 12.7 mm OSB | 2 mm rubber | 18.3 mm OSB | 55 IIC | |
| 7 | vinyl plank | 23/32" OSB | 2 mm rubber | 23/32" OSB | 62 STC | Secured with screws |
| 8 | vinyl plank | 23/32" OSB | 2 mm rubber | 23/32" OSB | 56 IIC | Secured with screws |
| 9 | vinyl plank | 23/32" OSB | 2 mm rubber | 23/32" OSB | 63 STC | Layers 2, 3, and 4 adhered together |
| 10 | vinyl plank | 23/32" OSB | 2 mm rubber | 23/32" OSB | 57 IIC | Layers 2, 3, and 4 adhered together |
| 11 | Engineering wood | 23/32" OSB | 2 mm rubber | 23/32" OSB | 62 STC | Layers 2, 3, and 4 adhered together |
| 12 | Engineering wood | 23/32" OSB | 2 mm rubber | 23/32" OSB | 59 IIC | Layers 2, 3, and 4 adhered together |

Figure 38:
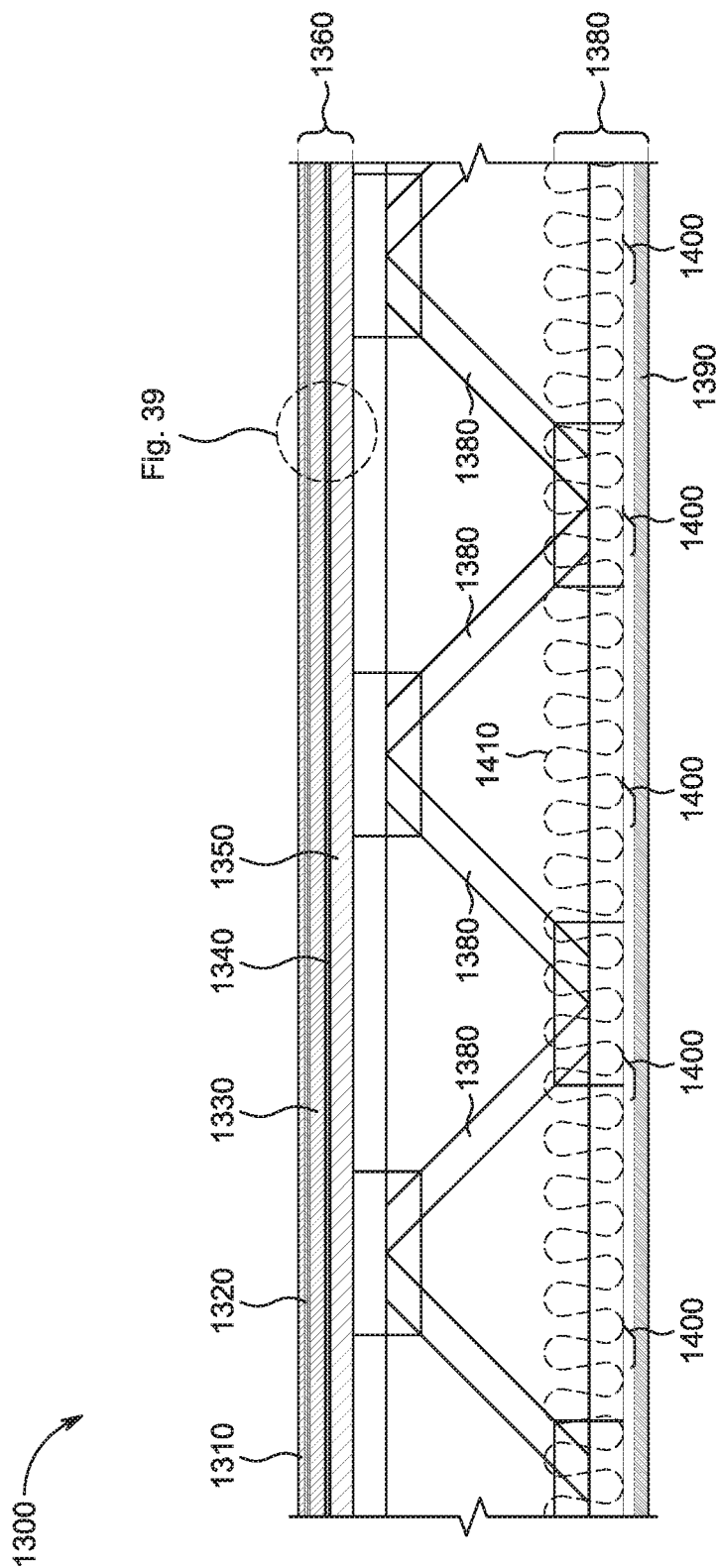
FIG. 38 schematically illustrates a front elevation view of a ceiling/floor assembly for a building.
Figure 39:
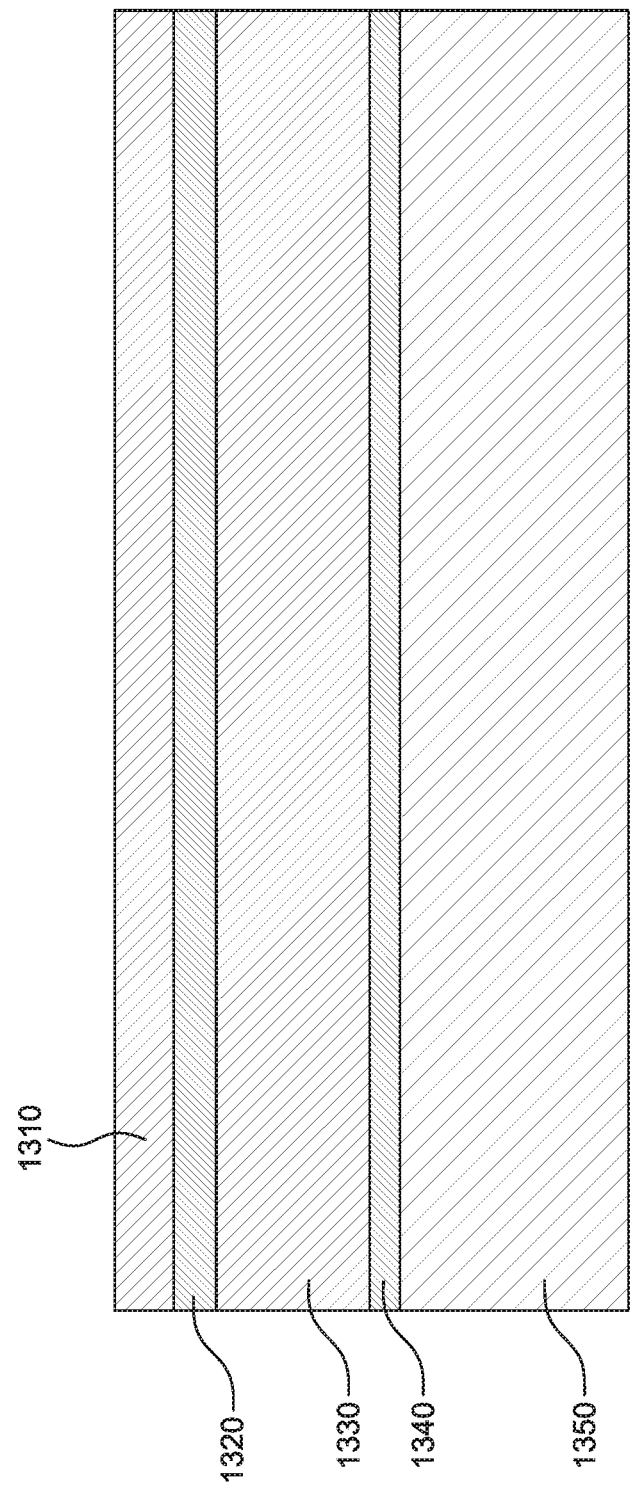
FIG. 39 schematically illustrates a front elevation view of a flooring product and other layers for use with the ceiling/floor assembly of FIG. 38.
Figure 40:
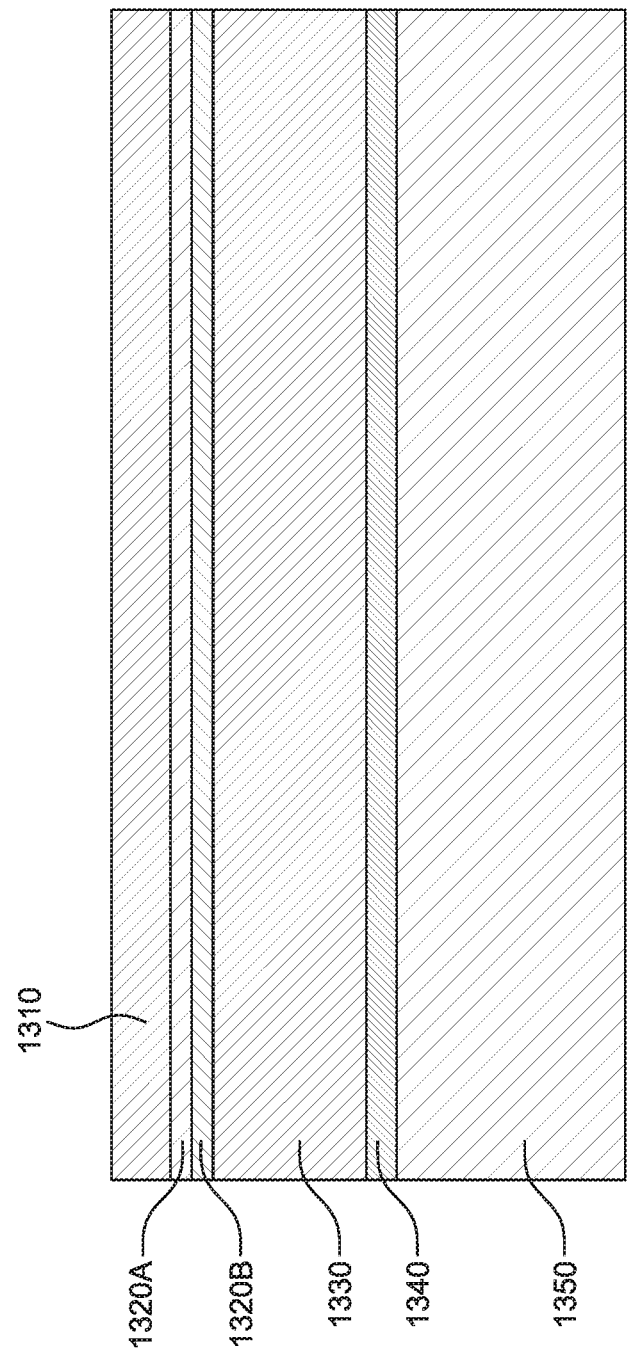
FIG. 40 schematically illustrates a front elevation view of an alternative arrangement of a flooring product and other layers for use with the ceiling/floor assembly of FIG. 38.

FIG. 38 illustrates an exemplary ceiling/floor assembly system 1300 for a building. FIG. 39 illustrates a detailed portion of the ceiling/floor assembly system 1300, and FIG. 40 illustrates a detailed portion of an alternative ceiling/floor assembly system. The ceiling/floor assembly system 1300 includes flooring products and additional components. It will be understood that a "ceiling/floor assembly system" can include components of the ceiling of the story below the story where the ceiling/floor assembly system 1300 is installed, which includes any truss or joist system that connects or spans the floor and ceiling, as well as a floor for the story for which the ceiling/floor assembly system is installed.

Portions of the ceiling/floor assembly system 1300 can be prefabricated off-site and transported on-site to a building under construction. For example, two or more layers of the ceiling/floor assembly system 1300 can be secured together using, for example, adhesives, mechanical fasteners or the like during a fabrication process and be delivered to a construction site as a ready to install assembly. Alternatively, portions or all of the ceiling/floor assembly system 1300 can be transported on-site to a building under construction and two or more layers can be secured together by workers prior to or during installation of the ceiling/floor assembly system 1300 using, for example, adhesives or mechanical fasteners.

As illustrated in FIG. 38, the ceiling/floor assembly system 1300 includes a top finished layer 1310 that can be exposed to the occupants of a room once construction has been completed. Similar to previous description, the top finished layer 1210 can be comprised of any number of materials considered "finished flooring," such as vinyl tile, hardwood, manufactured material, engineering flooring, etc. In one example, the top finished layer 1310 is a luxury vinyl tile ("LVT"). The LVT can be approximately 1/16 to 1/4 inches in thickness. In one embodiment, the top finished layer 1310 can be approximately 1/8 inches (i.e., approximately 3 millimeters) in thickness. In one example, the top finished layer 1310 can float or be held in place by a variety of adhesives or other such methods.

As illustrated in FIG. 39, the ceiling/floor assembly system 1300 includes an acoustic underlayment layer 1320 below the top finished layer 1310. The underlayment layer 1320 can be fabricated for any of a number of materials such as, for example, rubber, a polymer, cotton, or other such materials. The underlayment layer 1320 can be approximately 1/8 to 1/4 inches in thickness (i.e., approximately 3 millimeters to 6 millimeters). In an alternative arrangement, as illustrated in FIG. 40, the ceiling/floor assembly system 1300 can include a pair of acoustic underlayment layers 1320A and 1320B. The acoustic underlayment layers 1320A and 1320B can each be approximately 1/8 or 3/32 inches in thickness (i.e., approximately 3 millimeters or 4 millimeters). When a pair of acoustic underlayment layers 1320A and 1320B are included in the ceiling/floor assembly system 1300, the total thickness of the acoustic underlayment layers 1320A and 1320B can be approximately 1/4 inches in thickness (i.e., approximately 6 millimeters). Although the acoustic underlayment layers 1320A and 1320B are described as each having a thickness of approximately 1/8 or 3/32 inches, for other embodiments, the thickness can range from 1/16 to 1/4 inches. The underlayment layers 1320A and 1320B can be fabricated for any of a number of materials such as, for example, rubber, a polymer, cotton, and other such materials. The underlayment layers 1320A and 1320B can each be fabricated for different materials.

The ceiling/floor assembly system 1300 can include a first OSB layer 1330 below the acoustic underlayment layer 1320. The first OSB layer 1330 can be approximately 3/4 inches in thickness. The ceiling/floor assembly system 1300 includes an additional acoustical barrier layer 1340 below the first OSB layer 1330. The acoustical barrier layer 1340 can be approximately 1/16 to 1/4 inches in thickness. In one embodiment, the acoustical barrier layer 1340 is approximately 1/8 inches in thickness (i.e., approximately 3 millimeters). The ceiling/floor assembly system 1300 includes a second OSB layer 1350 below the acoustical barrier layer 1340. The second OSB layer 1350 can be approximately 3/4 inches in thickness. Although the first 1330 and second 1350 OSB layers are described as having a thickness of approximately 3/4 inches, for other embodiments, the thickness can range from 1/4 to 1 1/8 inches. In one embodiment, the first OSB layer 1330 has a thickness of approximately 1/2 inches and second OSB layer 1350 has a thickness of approximately 3/4 inches. In one embodiment, the OSB layers 1330 and 1350 have a density of approximately 0.024 pounds per cubic inch.

The layers described above (top finished layer 1310, acoustic underlayment layer 1320, first OSB layer 1330, the additional acoustical barrier layer 1340, and the second OSB layer 1350) generally form a subfloor or sub-deck 1360 of a room or apartment in a building. As illustrated in FIG. 38, a series of trusses 1370 or other similar load bearing and structural components can connect the subfloor 1360 to the ceiling 1380 of the room or apartment located one story below. The trusses 1370 can be arranged to accommodate any reasonable distance between the subfloor 1360 and ceiling 1380.

The ceiling 1380 includes a gypsum wall board layer 1390. The gypsum wall board layer 1390 can be approximately 5/8 inches in thickness. Above the gypsum wall board layer 1390 is a series of resilient channels 1400. Above the resilient channels 1400 is an insulating material 1410. The insulating material 1410 can include properties for insulating against acoustic energy such as air-borne and impact noises. The insulating material 1410 can be constructed of a mineral wall material and in one example can be 3 1/2 inches in thickness.

Figure 41:
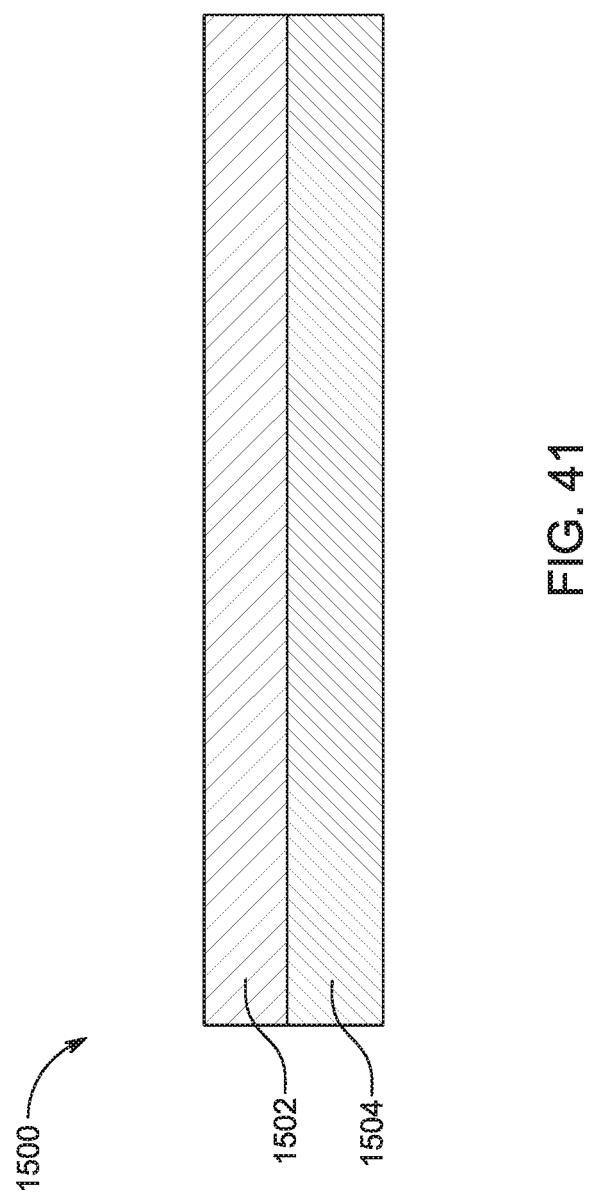
FIG. 41 schematically illustrates one exemplary embodiment of an acoustic underlayment layer.

FIG. 41 illustrates an exemplary embodiment of another acoustic underlayment layer 1500, which can be used in place of previously described acoustic underlayment layers 1320 (also 1320A and 1320B). The acoustic underlayment layer 1500 includes a first layer 1502 and a second layer 1504. The first layer 1502 can be made from rubber and the second layer 1504 can be made from cotton. In one embodiment, the first layer 1502 is made from recycled materials, such as used automobile tires. In one embodiment, the second layer 1504 can also be made from recycled materials such as used denim. Although the first and second layers 1502 and 1504 are described as manufactured from recycled materials, the first and second layers 1502 and 1504 can also be manufactured from virgin or other non-recycled material. The first layer 1502 and the second layer 1504 can be secured to one another to form the acoustic underlayment layer 1500 by an adhesive such as contact glue or other such compounds. It will be understood that the materials as described for underlayment 1500 can be used to fabricate underlayment layers 1320, 1320A, and 1320B.

Figure 42:
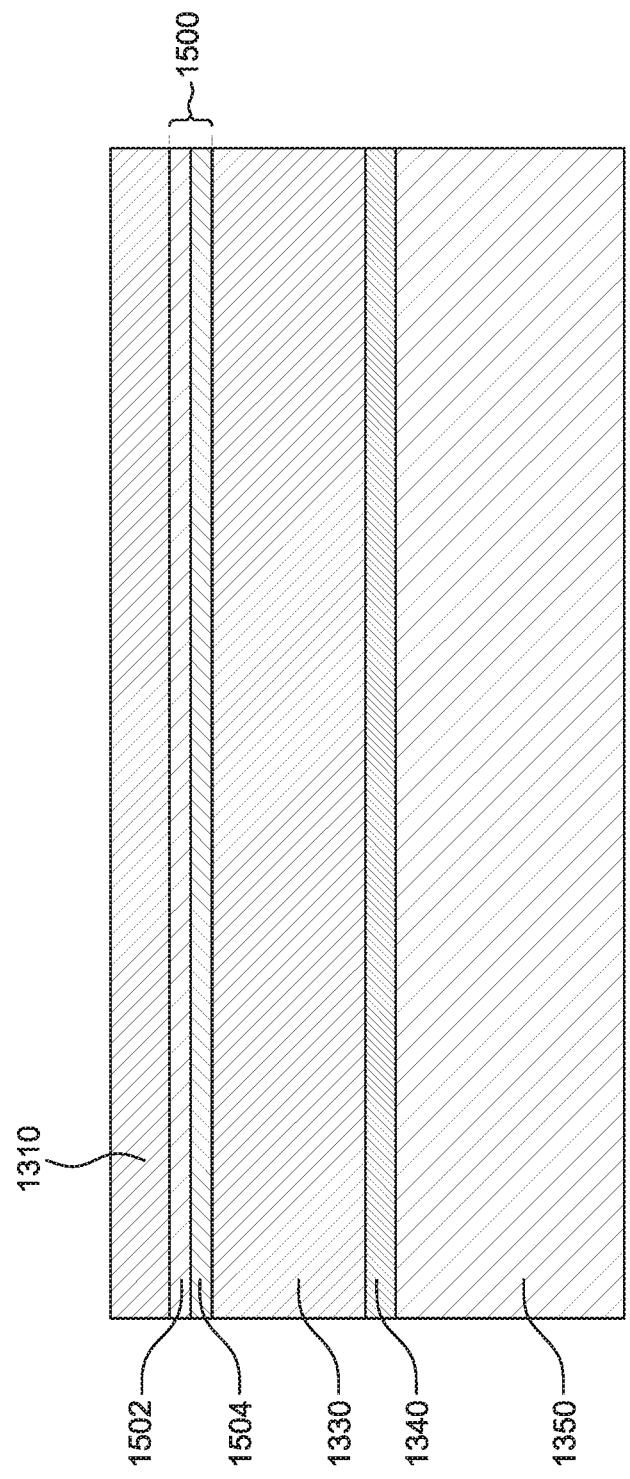
FIG. 42 schematically illustrates a front elevation view of another alternative arrangement of a flooring product and other layers for use with the ceiling/floor assembly of FIG. 38.

As illustrated in FIG. 42, once the acoustic underlayment layer 1500 is formed, it can be used to construct the "flooring" portion of a ceiling/floor assembly system similar to the ceiling/floor assembly system 1300 illustrated in FIGS. 38, 39, and 40, where the acoustic underlayment layer 1500 of FIG. 41 is used in placed of the acoustic underlayment layer 1320 of FIGS. 38 and 39 (or the pair of acoustical underlayment layers 1320A and 1320B of FIG. 40). In one embodiment, the overall thickness of the acoustic underlayment layer 1500 is approximately 1/4 inches (approximately 6 millimeters), with the first layer 1502 approximately 1/8 inches thick (i.e., approximately 3 millimeters) and the second layer approximately 3/32 inches in thickness (i.e., approximately 4 millimeters). For other embodiments, the thickness of the first layer 1502 can range from 1/16 to 1/4 inches and the thickness of the second layer 1504 can range from 1/16 to 1/2 inches.

The density of the acoustic underlayment layers 1320, 1320A, 1320B, and 1500 can be adjusted based on the level of acoustic absorption and deflection desired in the application of a ceiling/floor assembly system. Furthermore, the density of the acoustic underlayment layers 1320, 1320A, 1320B, and 1500 can also be adjusted so that the stiffness of the acoustic underlayment layers 1320, 1320A, 1320B, and 1500 is sufficient to support the top finished layer 1310. For example, if the top finished layer 1310 is made of long slats of hardwood or engineered hardwood flooring with a "tongue and groove" connecting system, the acoustic underlayment layer 1500 can be arranged to have sufficient stiffness such that the top finished layer 1310 does not flex to the point that the slats separate. One method of stiffening the acoustic underlayment layers with multiple layers, such as underlayment layers 1320A, 1320B and underlayment layer 1500 (comprised of layers 1502 and 1504) is for a first layer 1320A or 1502 to have a relatively high density. One method of achieving a relatively high density is to form the first layer 1320A or 1502 from tightly compacted, finely ground recycled tires. In one embodiment, the density of the first layer 1320A or 1502 is approximately 0.72 grams/cm$^3$ as measured according to ASTM D297. Such principles also apply to acoustic barrier layers described herein.

Figure 6:
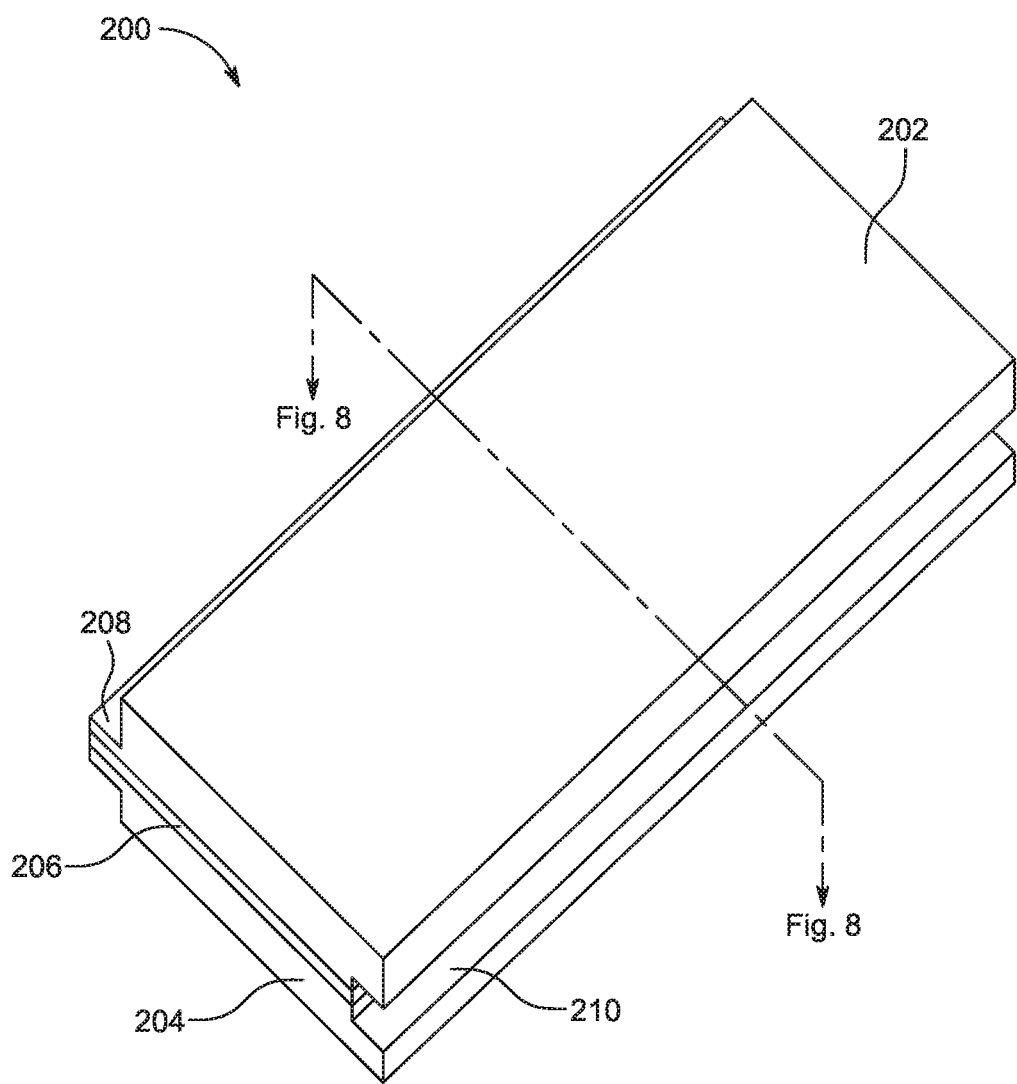
FIG. 6 schematically illustrates an exemplary perspective view of a flooring product that includes tongue and groove features.
Figure 43:
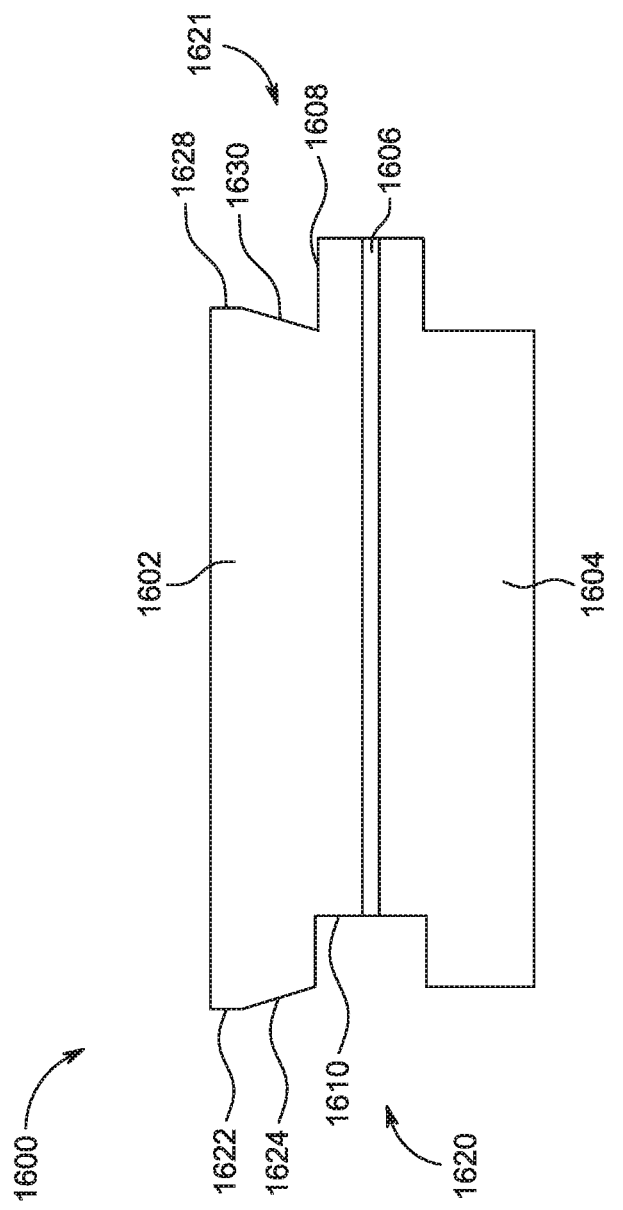
FIG. 43 schematically illustrates a front elevation view of a flooring product with profiled edges and tongue and groove features.
Figure 44:
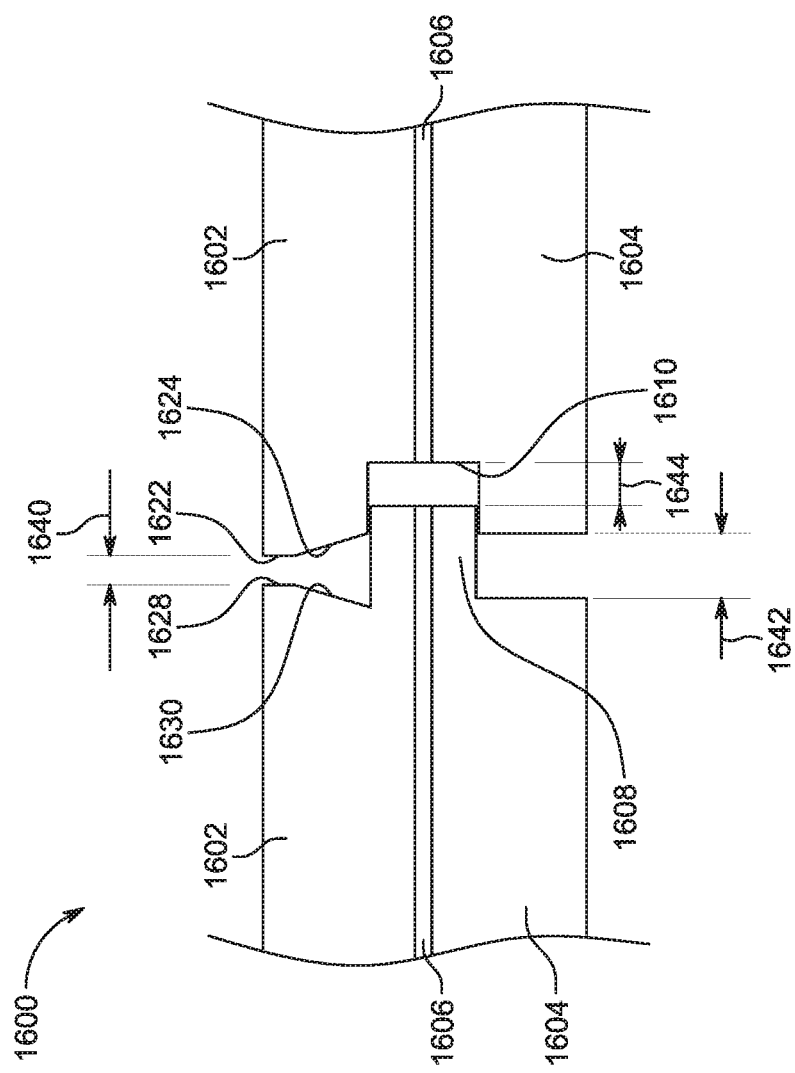
FIG. 44 schematically illustrates a front elevation view of two flooring products of FIG. 43 engaged via a tongue and groove system.
Figure 45:
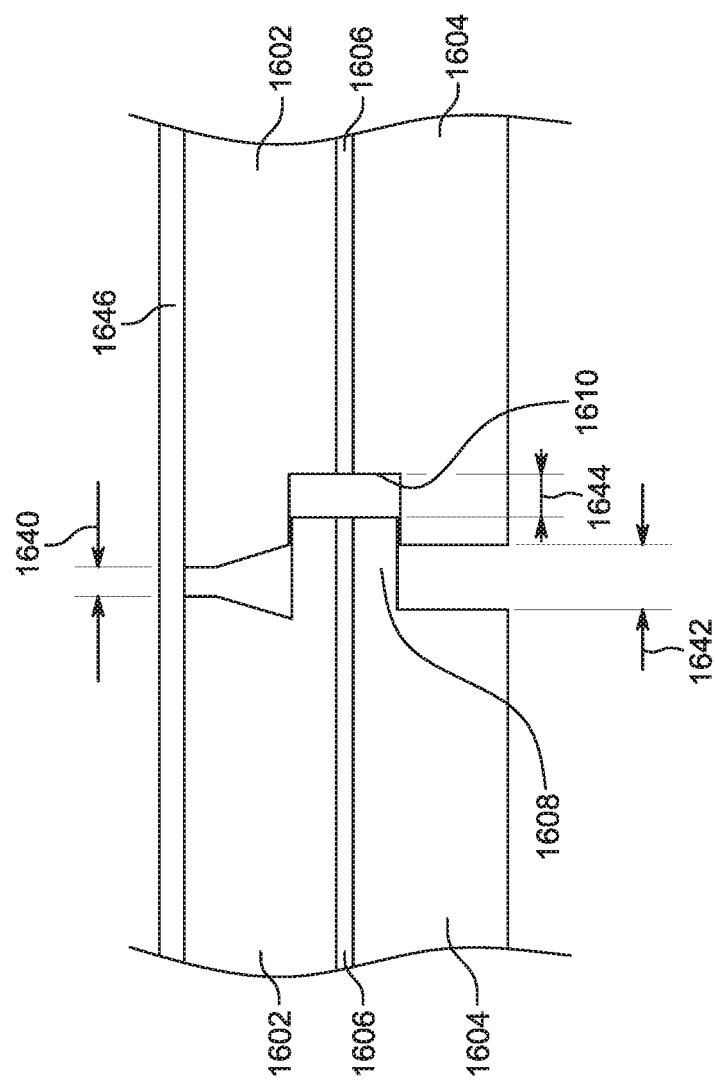
FIG. 45 schematically illustrates a front elevation view of the arrangement of the pair of flooring products of FIG. 43 with a finished flooring layer positioned on top of the pair of flooring products.

FIGS. 43-45 illustrate a flooring product 1600 that combines the features of the flooring product 200 illustrated in FIGS. 6-8 and the flooring product 800 illustrated in FIGS. 24-26. FIG. 43 illustrates a front view of the flooring product 1600. As in flooring product 200, flooring product 1600 is comprised of a first OSB layer 1602, a second OSB layer 1604, and an acoustic barrier layer 1606 positioned between the first 1602 and second 1604 OSB layers, where the flooring product 1600 includes a tongue feature 1608 and a groove feature 1610. As in flooring product 200 illustrated in FIGS. 6-8, the acoustic barrier layer 1606 of flooring product 1600 is sized to match the first 1602 and second 1604 OSB layers such that the acoustic barrier layer 1606 does not extend beyond the first 1602 and second 1604 OSB layers.

As in the flooring product 800 illustrated in FIGS. 24-26, FIGS. 43-45 illustrate the flooring product 1600 as further including a first profile edge 1620 along the grooved edge of the flooring product 1600 and a second profile edge 1621 along the tongue edge of the flooring product 1600. Along the grooved edge of the flooring product 1600, the first profiled edge 1620 includes an upper vertical face 1622 and an angled face 1624. The upper vertical face 1622 extends from the top surface of the first OSB layer 1602 downward until it intersects with the angled face 1624. The angled face 1624 extends from the end of the upper vertical face 1622 downward to the top surface of the groove feature 1610. Along the tongue edge of the flooring product 1600, the second profiled edge 1621 includes an upper vertical face 1628 and an angled face 1630. The upper vertical face 1628 extends from the top surface of the first OSB layer 1602 downward until it intersects with the angled face 1630. The angled face 1630 extends from the end of the upper vertical face 1628 downward to the top surface of the tongue feature 1608.

FIG. 44 illustrates a pair of engaged flooring products 1600. When the pair of flooring products 1600 is engaged, the tongue feature 1608 of one flooring product 1600 is inserted into the groove feature 1610 of the other flooring product 1600. When so engaged, a first gap 1640 is formed between the flooring products 1600 near the top portion of the flooring products 1600, a second gap 1642 is formed between the flooring products 1600 near the bottom portion of the flooring products 1600, and a third gap 1644 is formed between the vertical surface of the tongue feature 1608 and the vertical surface of the groove feature 1610. In one example, the first gap 1640 is about 1/16 of an inch in width, the second gap 1642 is about 3/16 inches in width, and the third gap 1644 is about 1/16 to 1/8 of an inch in width. FIG. 45 illustrates the arrangement of the pair of flooring products 1600 of FIG. 43 with the addition of a top finished layer 1646 on top of the engaged flooring products 1600. Although the flooring product of FIGS. 43-45 illustrate gaps (1640, 1642, and 1644) of 1/16, 1/16 to 1/8, and 3/16 inches, it will be understood that flooring products can be designed to result in gaps that are either larger or small that those described and illustrated herein.

Figure 46:
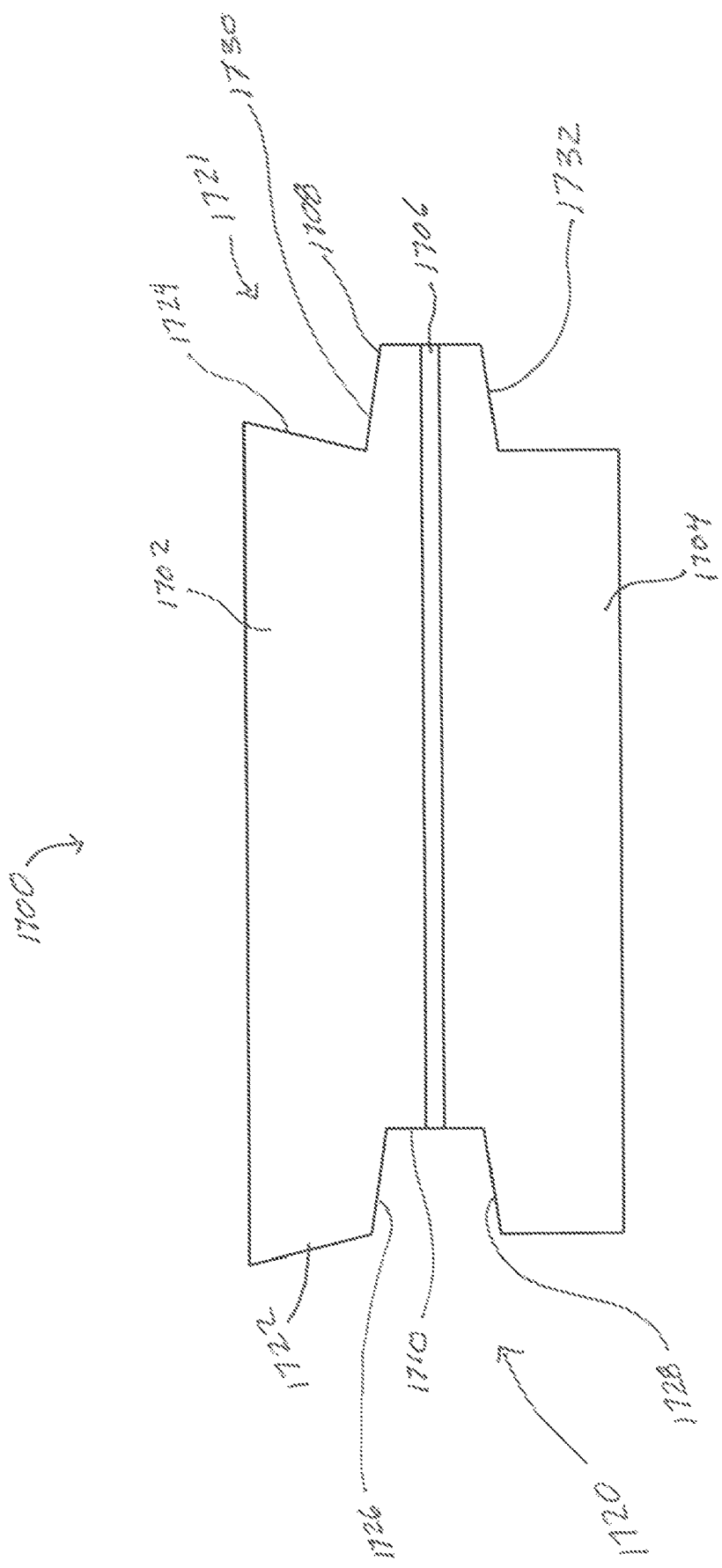
FIG. 46 schematically illustrates a front elevation view of a flooring product with profiled edges and tapered tongue and groove features.
Figure 47:
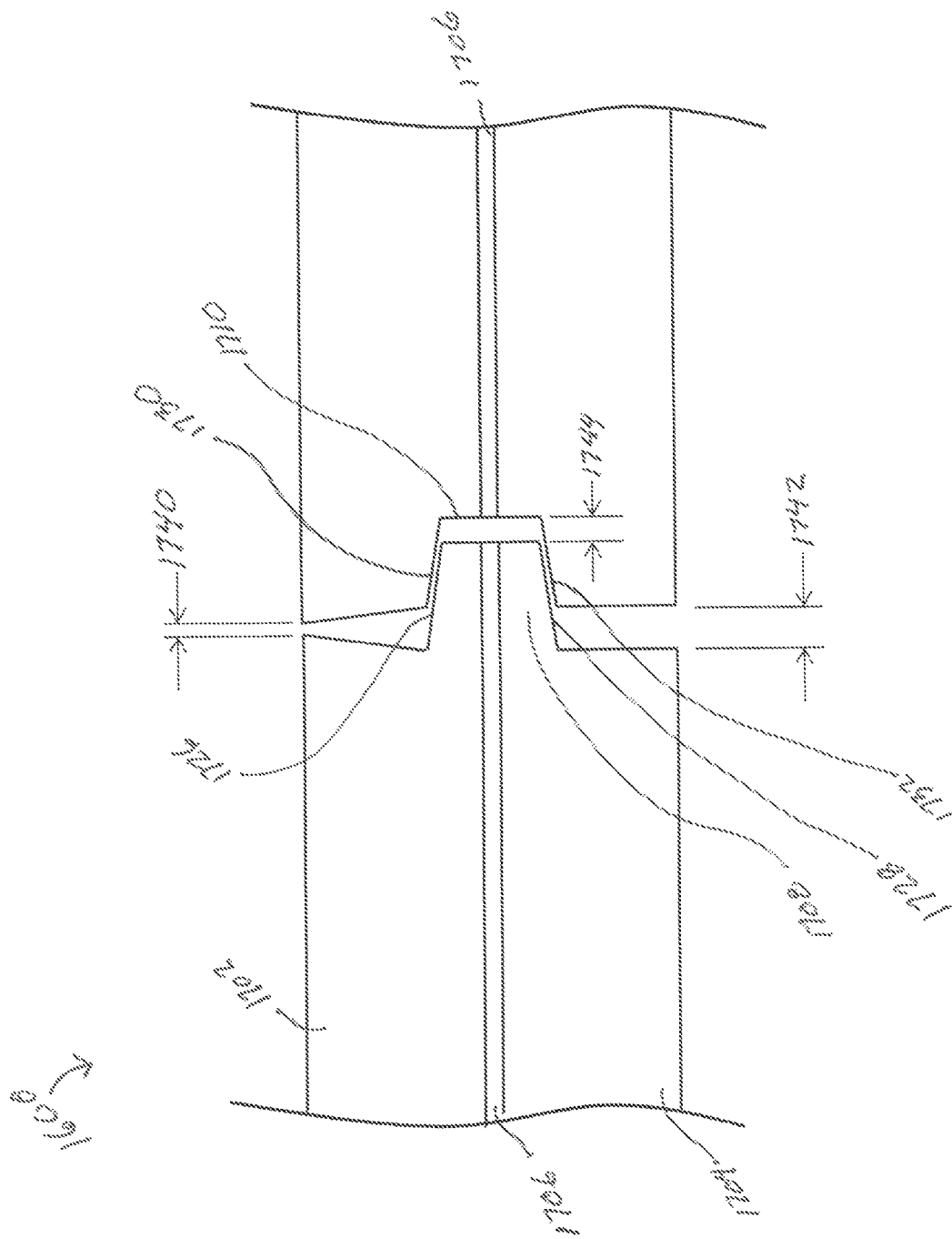
FIG. 47 schematically illustrates a front elevation view of two flooring products of FIG. 46 engaged via a tapered tongue and groove system.
Figure 48:
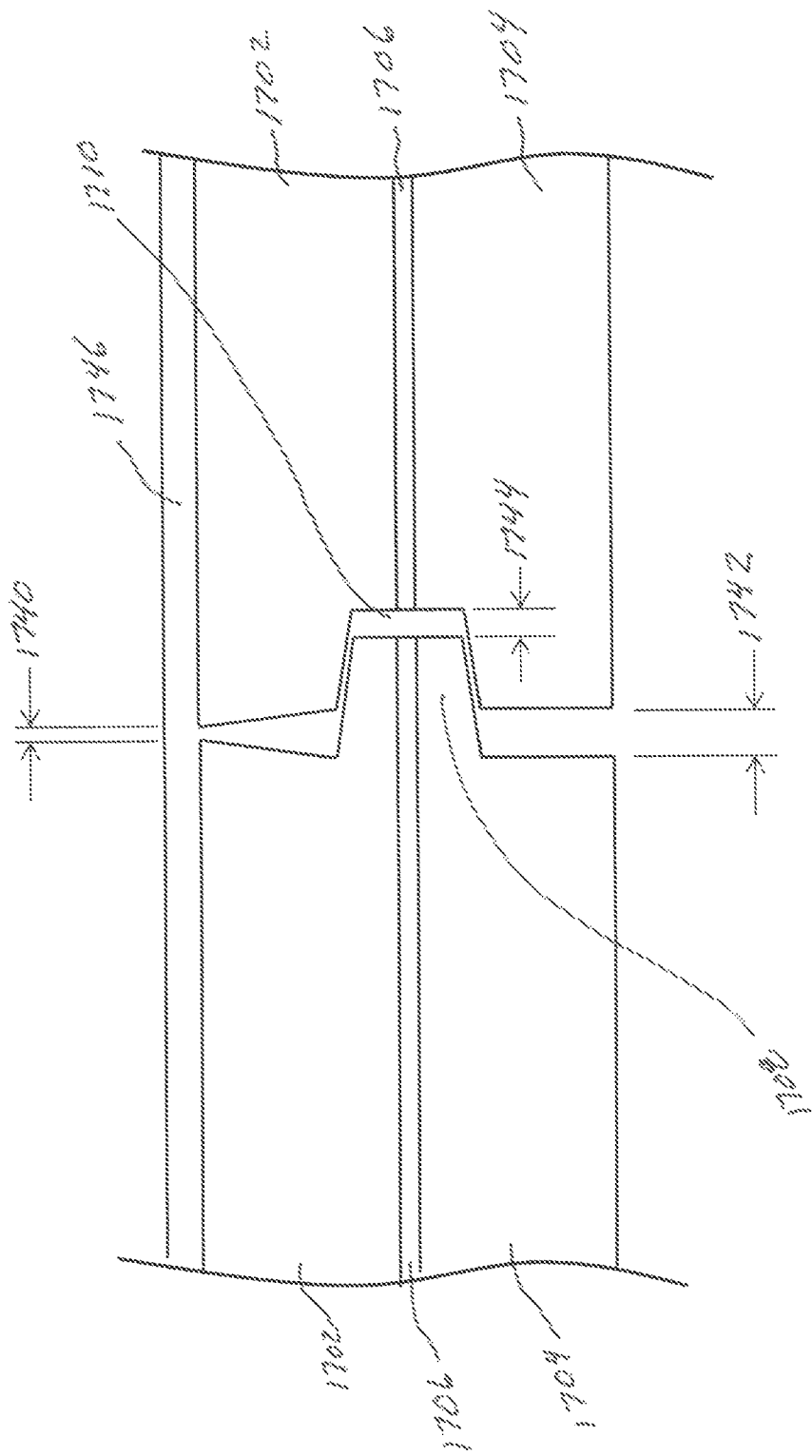
FIG. 48 schematically illustrates a front elevation view of the arrangement of the pair of flooring products of FIG. 46 with a finished flooring layer positioned on top of the pair of flooring products.

FIGS. 46-48 illustrate another flooring product 1700. FIG. 46 illustrates a front view of the flooring product 1700. The flooring product 1700 is comprised of a first OSB layer 1702, a second OSB layer 1704, and an acoustic barrier layer 1706 positioned between the first 1702 and second 1704 OSB layers, where the flooring product 1700 includes a tongue feature 1708 and a groove feature 1710. While the acoustic barrier layer 1706 of flooring product 1700 is sized to match the first 1702 and second 1704 OSB layers such that the acoustic barrier layer 1706 does not extend beyond the first 1702 and second 1704 OSB layers, it will be understood that the acoustic barrier layer 1706 can be arranged such that a portion of the acoustic barrier layer 1706 extends either into the groove feature 1710, past the end of the tongue feature 1708, or both.

The flooring product 1700 illustrated in FIGS. 46-48 including a first profile edge 1720 along the grooved edge of the flooring product 1700 and a second profile edge 1721 along the tongue edge of the flooring product 1700. Along the grooved edge of the flooring product 1700, the first profiled edge 1720 includes an angled face 1722 that is inwardly inclined and extends from the top surface of the first OSB layer 1702 downward until it intersects with the top surface of the groove feature 1710. Along the tongue edge of the flooring product 1700, the second profiled edge 1721 includes an angled face 1724 that is inwardly inclined and extends from the top surface of the first OSB layer 1702 downward until it intersects with the top surface of the tongue feature 1708. The tongue feature 1708 is a tapered in that it includes a downwardly angled surface 1730 that extends from the lower end of the angled face 1724 to the upper distal edge of the tongue feature 1708, and an upwardly angled surface 1732 that extends from the side of the second OSB layer 1704 to the lower distal edge of the tongue feature 1708. The groove feature 1710 is tapered in that it includes a downwardly angled surface 1726 that extends from the lower end of the angled face 1722 to the upper inner edge of the groove feature 1710, and an upwardly angled surface 1728 that extends from the side of the second OSB layer 1704 to the lower inner edge of the tongue feature 1708. It will be understood that when two flooring products 1700 are assembled, the angled surfaces (1726, 1728, 1730, and 1732) of the tongue 1708 and groove 1710 features are arranged such that the angled surfaces (1726, 1728) of the tongue feature 1708 will engage the angled surfaces (1730, and 1732) of groove 1710 features.

FIG. 47 illustrates such a pair of engaged flooring products 1700. When the pair of flooring products 1700 is engaged, the tongue feature 1708 of one flooring product 1700 is inserted into the groove feature 1710 of the other flooring product 1700 until the angled surfaces (1730 and 1732) of the tongue feature 1708 physically engage the angled features (1726 and 1728) of the groove feature 1710. Such an engagement can cause a friction fit between the two flooring products 1700 such as to reversible secure the two flooring products 1700 together. In one example, upon insertion of the tongue feature 1708 into the groove feature 1710, one flooring product 1700 can be tapped or otherwise struck by a tool, such as a rubber hammer, to further seat and secure the tongue feature 1708 into the groove feature 1710. When so engaged, a first gap 1740 is formed between the flooring products 1700 near the top portion of the flooring products 1700, a second gap 1742 is formed between the flooring products 1700 near the bottom portion of the flooring products 1700, and a third gap 1744 is formed between the vertical surface of the tongue feature 1708 and the vertical surface of the groove feature 1710. In one example, the first gap 1740 is about 1/16 of an inch in width, the second gap 1742 is about 3/16 of an inches in width, and the third gap 1744 is about 1/8 to 3/16 of an inch in width. FIG. 48 illustrates the arrangement of the pair of flooring products 1700 of FIG. 46 with the addition of a top finished layer 1746 on top of the engaged flooring products 1700. Although the flooring product of FIGS. 46-48 illustrate gaps (1740, 1742, and 1744) of 1/16, 3/16, and 1/16 to 3/16 inches, it will be understood that flooring products can be designed to result in gaps that are either larger or small that those described and illustrated herein.

Figure 49:
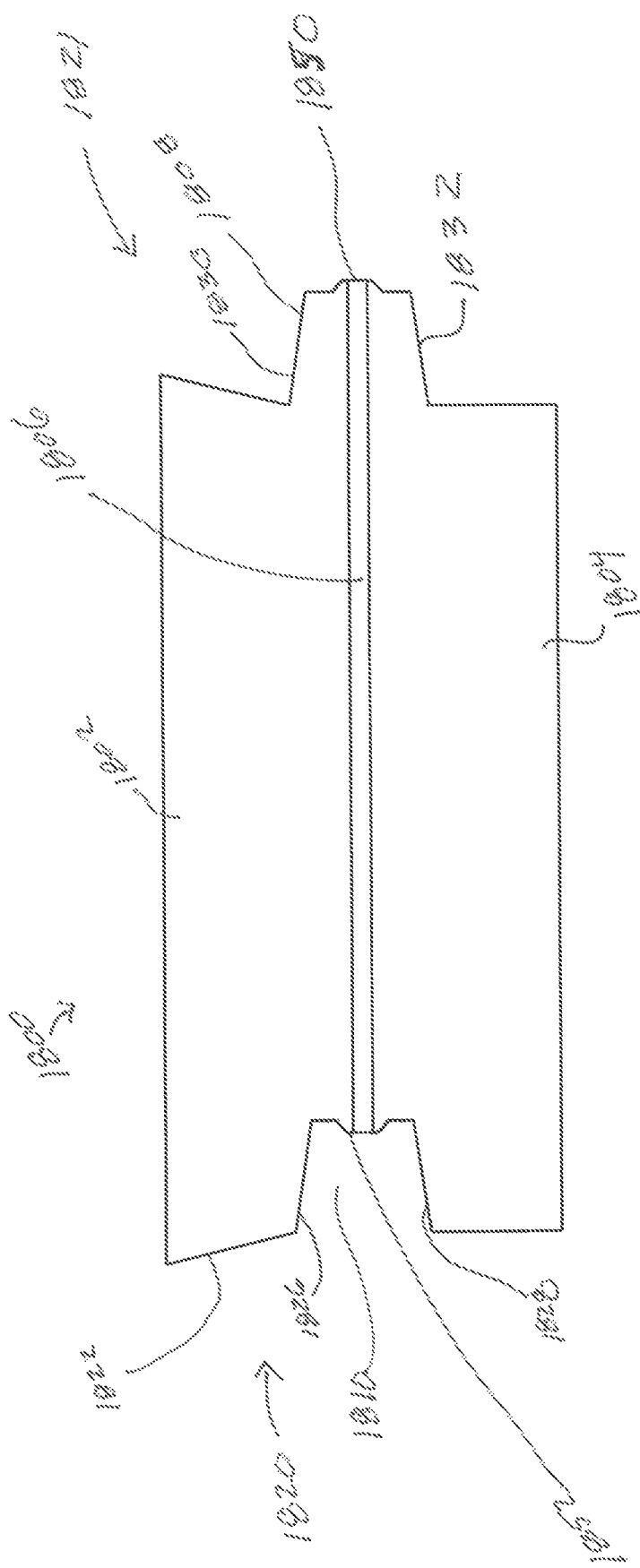
FIG. 49 schematically illustrates a front elevation view of a flooring product with angled profiled edges and tapered tongue and groove features further including rounded bulges.
Figure 50:
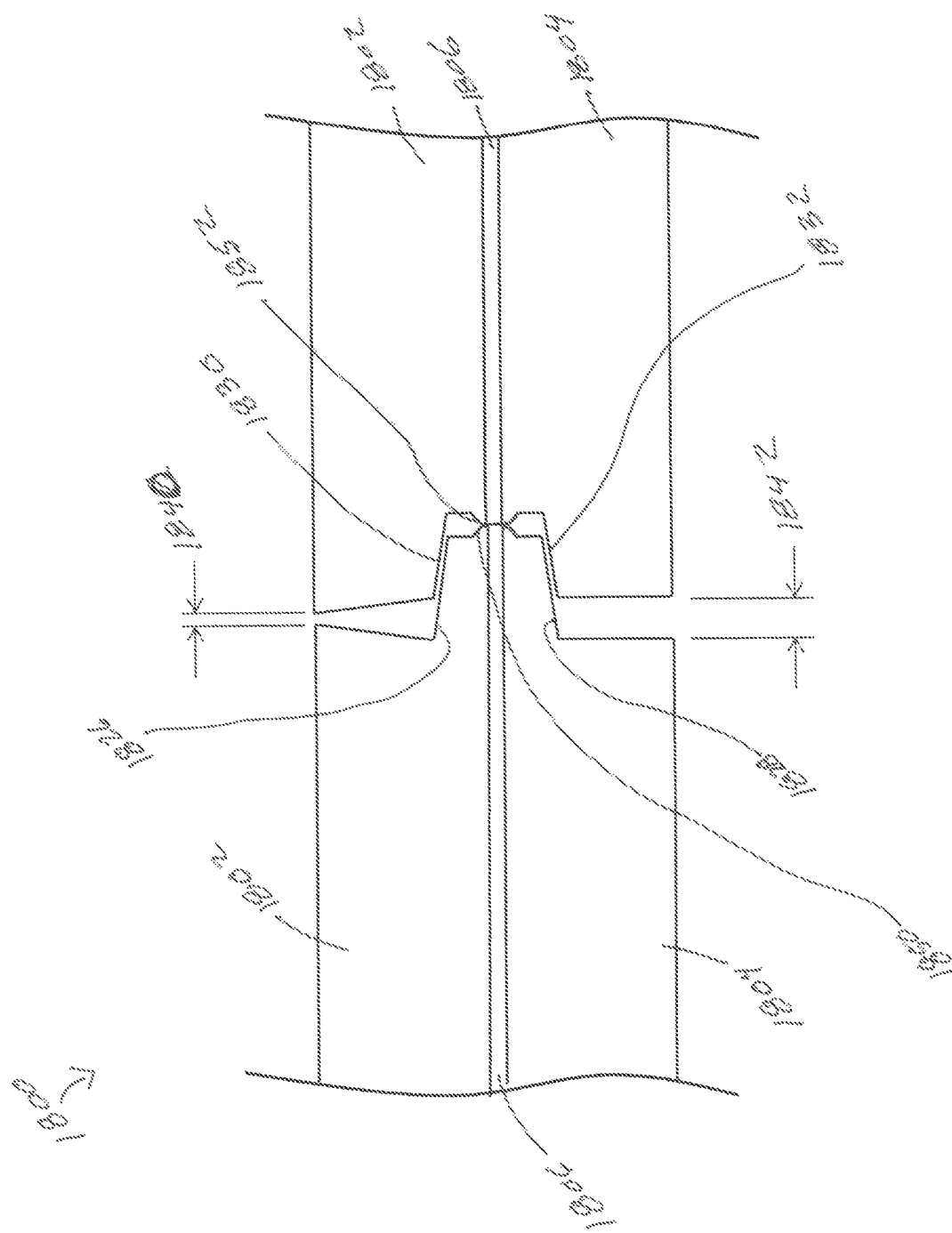
FIG. 50 schematically illustrates a front elevation view of two flooring products of FIG. 49 engaged via a tongue and groove system.
Figure 51:
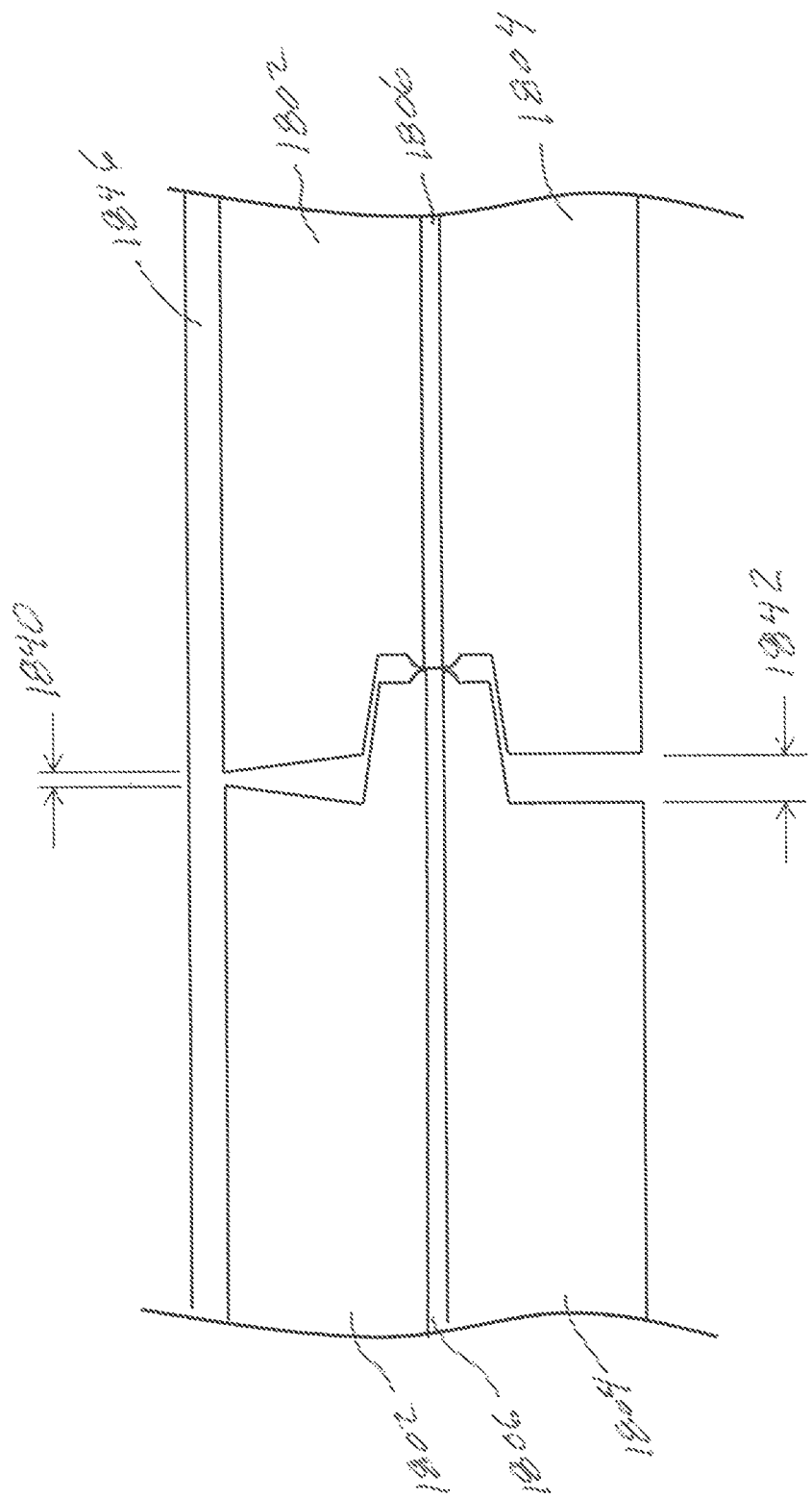
FIG. 51 schematically illustrates a front elevation view of the arrangement of the pair of flooring products of FIG. 49 with a finished flooring layer positioned on top of the pair of flooring products.

FIGS. 49-51 illustrate another flooring product 1800 that include additional elements to the groove and tongue features. FIG. 49 illustrates a front view of the flooring product 1800. The flooring product 1800 is comprised of a first OSB layer 1802, a second OSB layer 1804, and an acoustic barrier layer 1806 positioned between the first 1802 and second 1804 OSB layers, where the flooring product 1800 includes a tongue feature 1808 and a groove feature 1810. The acoustic barrier layer 1806 of flooring product 1800 is sized to match the first 1802 and second 1804 OSB layers such that the acoustic barrier layer 1806 does not extend beyond the first 1802 and second 1804 OSB layers.

The flooring product 1800 illustrated in FIGS. 49-51 including a first profile edge 1820 along the grooved edge of the flooring product 1800 and a second profile edge 1821 along the tongue edge of the flooring product 1800. Along the grooved edge of the flooring product 1800, the first profiled edge 1820 includes an angled face 1822 that is inwardly inclined and extends from the top surface of the first OSB layer 1802 downward until it intersects with the top surface of the groove feature 1810. Along the tongue edge of the flooring product 1800, the second profiled edge 1821 includes an angled face 1824 that is inwardly inclined and extends from the top surface of the first OSB layer 1802 downward until it intersects with the top surface of the tongue feature 1808. The tongue feature 1808 is a tapered in that it includes a downwardly angled surface 1830 that extends from the lower end of the angled face 1824 to the upper distal edge of the tongue feature 1808, and an upwardly angled surface 1832 that extends from the side of the second OSB layer 1804 to the lower distal edge of the tongue feature 1808. The groove feature 1810 is tapered in that it includes a downwardly angled surface 1826 that extends from the lower end of the angled face 1822 to the upper inner edge of the groove feature 1810, and an upwardly angled surface 1828 that extends from the side of the second OSB layer 1804 to the lower inner edge of the tongue feature 1810. The tongue feature 1808 includes an additional element, a rounded bulge 1850 extending from the outer edge of the tongue feature 1808. The groove feature 1810 includes an additional element, a rounded bulge 1852 extending from the inner edge of the tongue feature 1810. It will be understood that when two flooring products 1800 are assembled, in addition to the angled surfaces (1826, 1828, 1830, and 1832) of the tongue 1808 and groove 1810 features being arranged such that the angled surfaces (1826, 1828) of the tongue feature 1808 may engage the angled surfaces (1830, and 1832) of groove 1810 features, but the rounded bulge 1850 of the tongue feature 1808 can engage the rounded bulge 1852 of the groove feature 1810 upon assembly. In one example, the rounded bulges 1850, 1852 extend approximately 11/32 of an inch past the edges of the tongue feature 1808 and groove feature 1810 respectively.

FIG. 50 illustrates such a pair of engaged flooring products 1800. When the pair of flooring products 1800 is engaged, the tongue feature 1808 of one flooring product 1800 is inserted into the groove feature 1810 of the other flooring product 1800. In one example, the flooring products 1800 are engaged until the angled surfaces (1830 and 1832) of the tongue feature 1808 physically engage the angled features (1826 and 1828) of the groove feature 1810. Such an engagement can cause a friction fit between the two flooring products 1800 such as to reversible secure the two flooring products 1800 together. In one example, the flooring products 1800 are engaged until the rounded bulge 1880 of the tongue feature 1808 engages with the rounded bulge 1852 of the groove feature 1810. It will be understood that the engagement of the rounded bulges 1850, 1852 can be coupled with the friction fit of the angled surfaces (1826, 1828, 1830, and 1832) when assembling flooring products 1800. It will be understood that upon insertion of the tongue feature 1808 into the groove feature 1810, one flooring product 1800 can be tapped or otherwise struck by a tool, such as a rubber hammer, to further seat and secure the tongue feature 1808 into the groove feature 1810. When so engaged, a first gap 1840 is formed between the flooring products 1800 near the top portion of the flooring products 1800 and a second gap 1842 is formed between the flooring products 1800 near the bottom portion of the flooring products 1800. Typically, there will be no or a very small gap between the rounded bulge 1850 of the tongue feature 1808 and the rounded bulge 1852 of the groove feature 1810. In one example, the first gap 1840 is about 1/16 of an inch in width and the second gap 1842 is about 3/16 inches in width. FIG. 51 illustrates the arrangement of the pair of flooring products 1800 of FIG. 49 with the addition of a top finished layer 1846 on top of the engaged flooring products 1800. Although the flooring product of FIGS. 49-51 illustrate gaps (1840 and 1842) of 1/16 and 3/16 inches, it will be understood that flooring products can be designed to result in gaps that are either larger or small that those described and illustrated herein.

Figure 52:
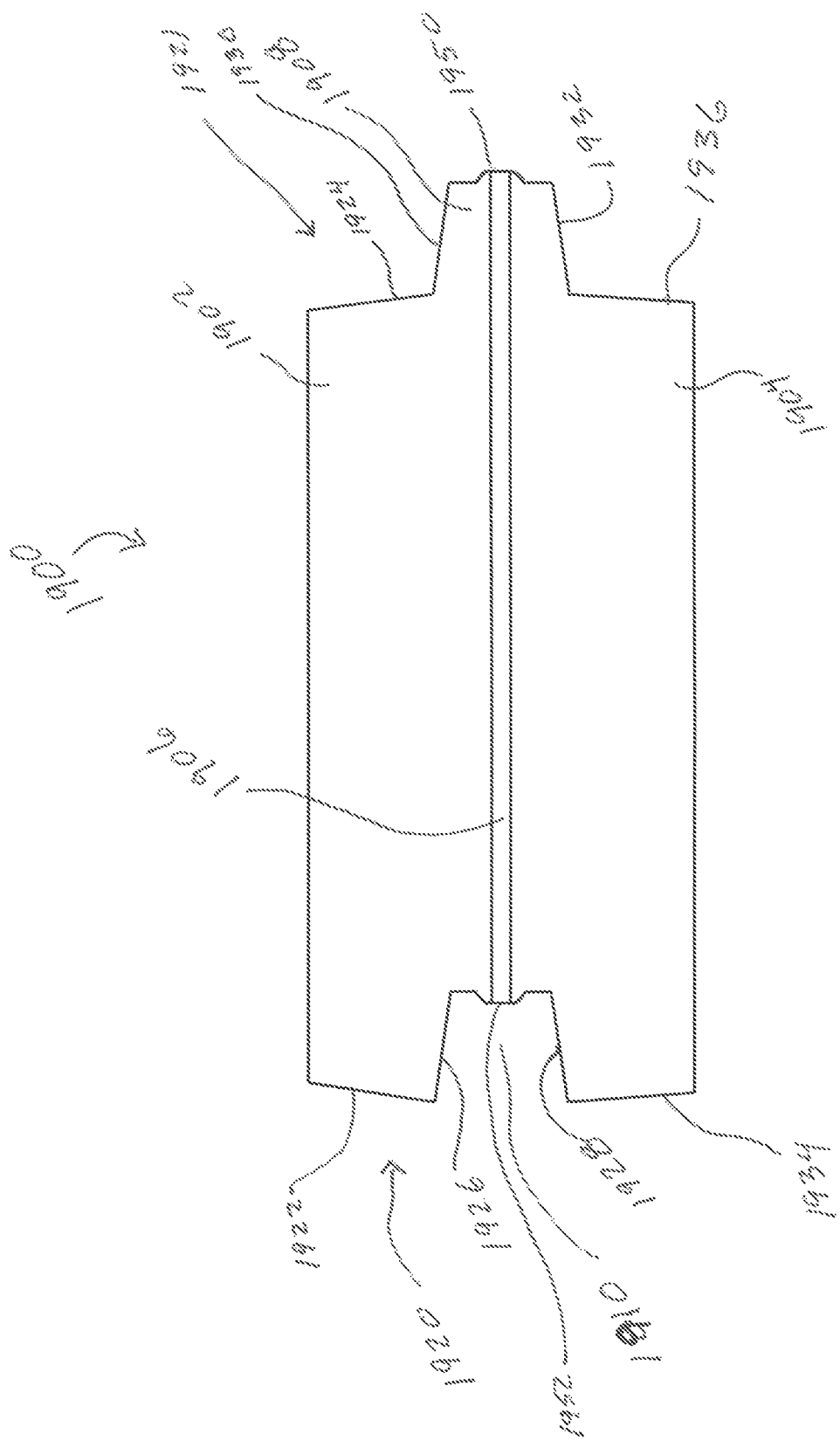
FIG. 52 schematically illustrates a front elevation view of a flooring product with reverse angled profiled edges and tapered tongue and groove features further including rounded bulges.
Figure 53:
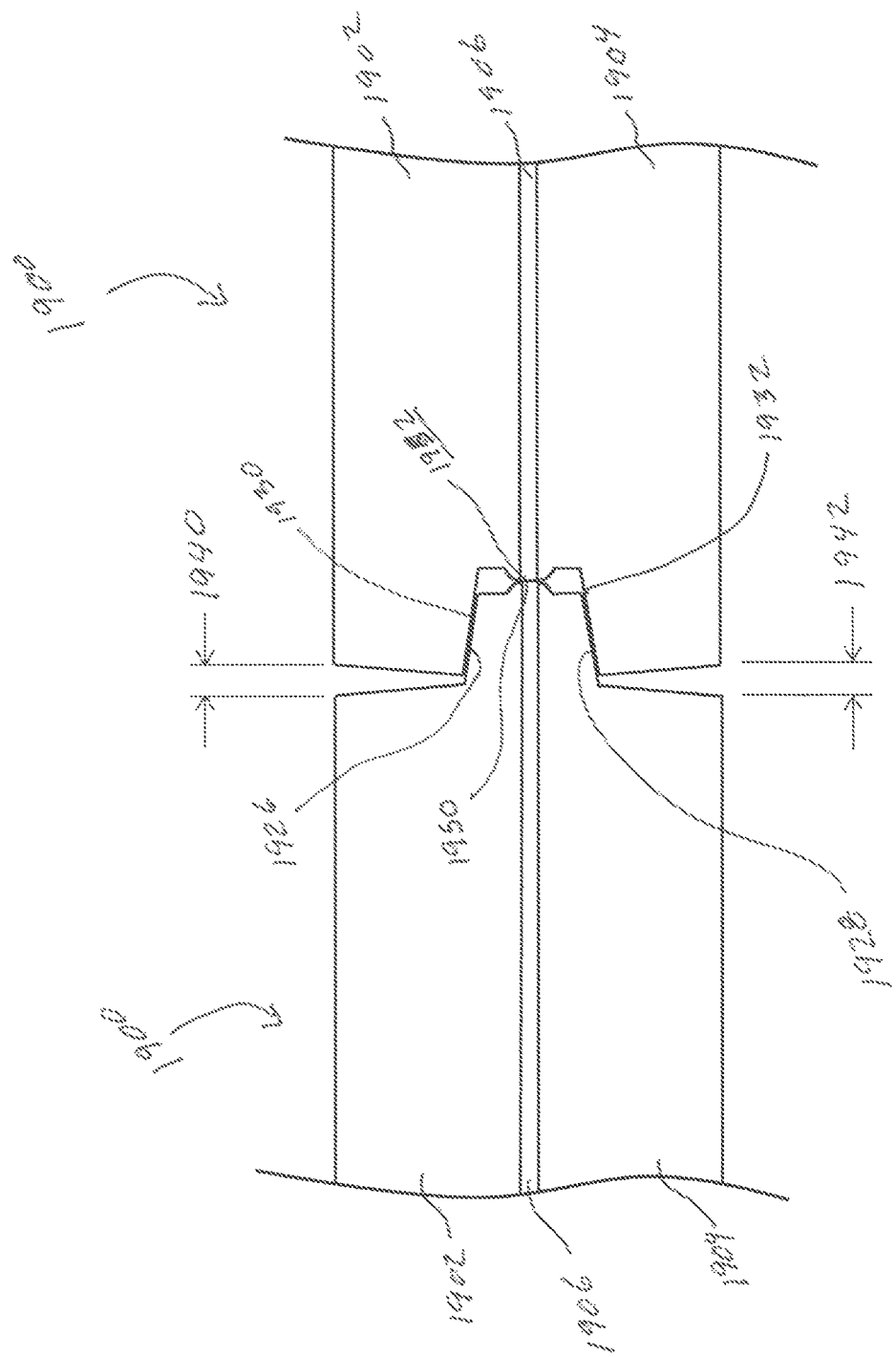
FIG. 53 schematically illustrates a front elevation view of two flooring products of FIG. 52 engaged via a tongue and groove system.
Figure 54:
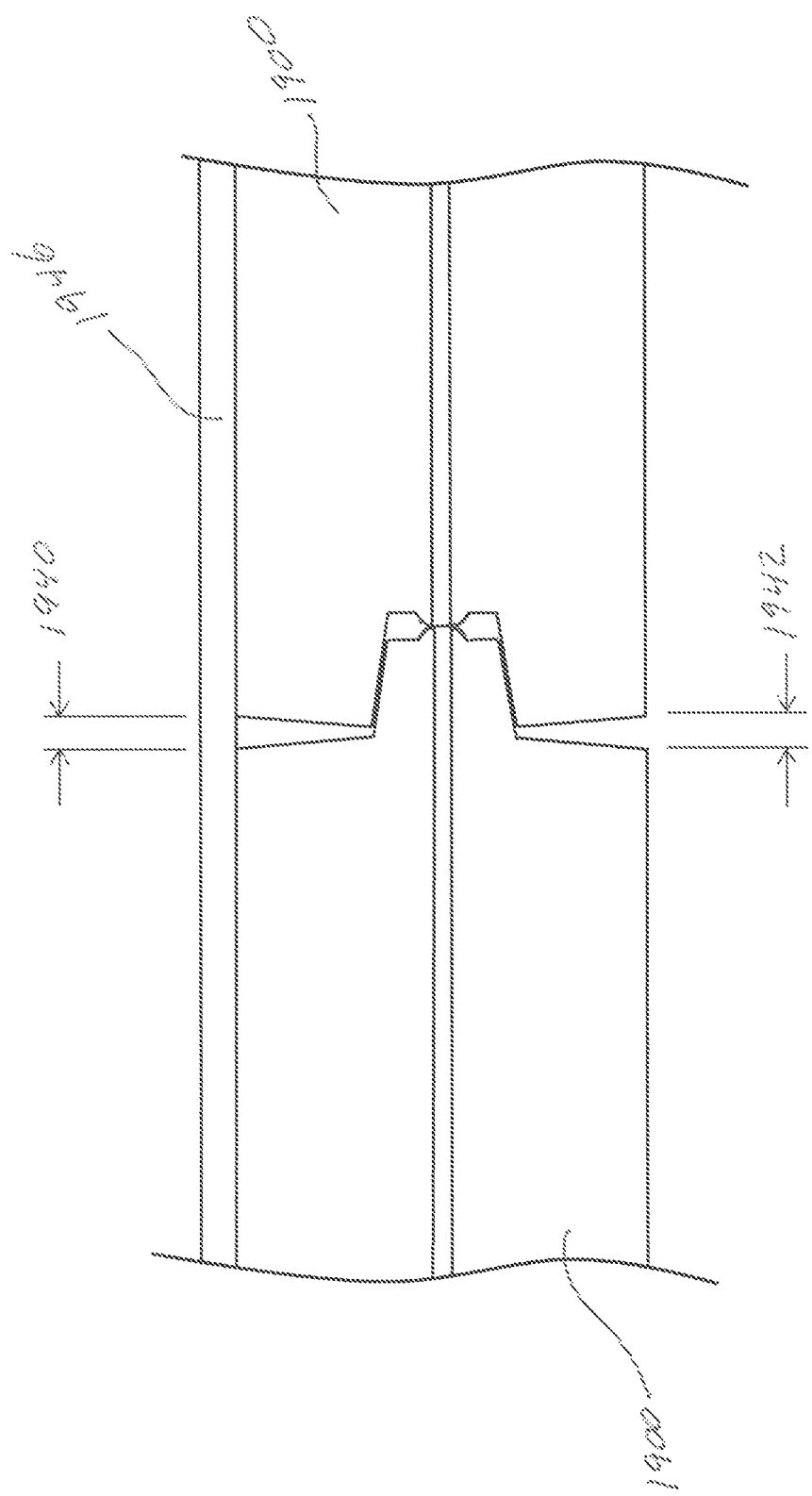
FIG. 54 schematically illustrates a front elevation view of the arrangement of the pair of flooring products of FIG. 52 with a finished flooring layer positioned on top of the pair of flooring products.

FIGS. 52-54 illustrate another flooring product 1900 that include a variation of the profiled faces. FIG. 52 illustrates a front view of the flooring product 1900. The flooring product 1900 is comprised of a first OSB layer 1902, a second OSB layer 1904, and an acoustic barrier layer 1906 positioned between the first 1902 and second 1904 OSB layers, where the flooring product 1900 includes a tongue feature 1908 and a groove feature 1910. The acoustic barrier layer 1906 of flooring product 1900 is sized to match the first 1902 and second 1904 OSB layers such that the acoustic barrier layer 1906 does not extend beyond the first 1902 and second 1904 OSB layers.

The flooring product 1900 illustrated in FIGS. 52-54 including a first profile edge 1920 along the grooved edge of the flooring product 1900 and a second profile edge 1921 along the tongue edge of the flooring product 1900. Along the grooved edge of the flooring product 1900, the first profiled edge 1920 includes an angled face 1922 that is outwardly inclined and extends from the top surface of the first OSB layer 1902 downward until it intersects with the top surface of the groove feature 1910. Along the tongue edge of the flooring product 1900, the second profiled edge 1921 includes an angled face 1924 that is outwardly inclined and extends from the top surface of the first OSB layer 1902 downward until it intersects with the top surface of the tongue feature 1908. The tongue feature 1908 is a tapered in that it includes a downwardly angled surface 1930 that extends from the lower end of the angled face 1924 to the upper distal edge of the tongue feature 1908, and an upwardly angled surface 1932 that extends from the side of the second OSB layer 1904 to the lower distal edge of the tongue feature 1908. The groove feature 1910 is tapered in that it includes a downwardly angled surface 1926 that extends from the lower end of the angled face 1922 to the upper inner edge of the groove feature 1910, and an upwardly angled surface 1928 that extends from the side of the second OSB layer 1904 to the lower inner edge of the tongue feature 1910. Similar to flooring product 19800, the tongue feature 1908 includes an additional element, a rounded bulge 1950 extending from the outer edge of the tongue feature 1908. The groove feature 1910 also includes an additional element, a rounded bulge 1952 extending from the inner edge of the tongue feature 1910. It will be understood that when two flooring products 1900 are assembled, in addition to the angled surfaces (1926, 1928, 1930, and 1932) of the tongue 1908 and groove 1910 features being arranged such that the angled surfaces (1926, 1928) of the tongue feature 1908 may engage the angled surfaces (1930, and 1932) of groove 1910 features, but the rounded bulge 1950 of the tongue feature 1908 can engage the rounded bulge 1952 of the groove feature 1910 upon assembly. In one example, the rounded bulges 1950, 1952 extend approximately ⅟32 to ⅟16 of an inch past the edges of the tongue feature 1908 and groove feature 1910 respectively.

FIG. 50 illustrates such a pair of engaged flooring products 1900. When the pair of flooring products 1900 is engaged, the tongue feature 1908 of one flooring product 1900 is inserted into the groove feature 1910 of the other flooring product 1900. In one example, the flooring products 1900 are engaged until the angled surfaces (1930 and 1932) of the tongue feature 1908 physically engage the angled features (1926 and 1928) of the groove feature 1910. Such an engagement can cause a friction fit between the two flooring products 1900 such as to reversible secure the two flooring products 1900 together. In one example, the flooring products 1900 are engaged until the rounded bulge 1950 of the tongue feature 1908 engages with the rounded bulge 1952 of the groove feature 1910. It will be understood that the engagement of the rounded bulges 1950, 1952 can be coupled with the friction fit of the angled surfaces (1926, 1928, 1930, and 1932) when assembling flooring products 1900. It will be understood that upon insertion of the tongue feature 1908 into the groove feature 1910, one flooring product 1900 can be tapped or otherwise struck by a tool, such as a rubber hammer, to further seat and secure the tongue feature 1908 into the groove feature 1910. When so engaged, it will be understood that paring of two outwardly inclined angled face 1922, 1924 form a first gap 1940 between the flooring products 1900 near the top portion of the flooring products 1900 and a second gap 1942 near the bottom portion of the flooring products 1900. Typically, there will be no or a very small gap between the rounded bulge 1950 of the tongue feature 1908 and the rounded bulge 1952 of the groove feature 1910. In one example, the first gap 1940 is about 3/32 of an inch in width and the second gap 1942 is about 3/32 inches in width. FIG. 54 illustrates the arrangement of the pair of flooring products 1900 of FIG. 52 with the addition of a top finished layer 1946 on top of the engaged flooring products 1900. Although the flooring product of FIGS. 52-54 illustrate gaps (1940 and 1942) of 3/32 inches, it will be understood that flooring products can be designed to result in gaps that are either larger or small that those described and illustrated herein.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:
1. A flooring product comprising:
   a first oriented strand board comprising:
   a first surface;
   a second surface opposite the first surface;
   a first profiled edge;
   a first stepped section, where the first profiled edge is angled outwardly and extends from the second surface of the first oriented strand board to the first stepped section;
   a second profiled edge opposite the first profiled edge; and
   a first recessed section, where the second profiled edge is angled outwardly and extends from the second surface of the first oriented strand board to the first recessed section;
   a second oriented strand board comprising:
   a first surface;
   a second surface opposite the first surface;
   a third profiled edge;
   a second stepped section, where the second profiled edge is angled outwardly and extends from the second surface of the second oriented strand board to the second stepped section;
   a fourth profiled edge opposite the third profiled edge; and
   a second recessed section, where the fourth profiled edge is angled outwardly and extends from the second surface of the first oriented strand board to the second recessed section;
   an acoustic barrier layer positioned between the first oriented strand board and the second oriented strand board, where a first surface of the acoustic barrier layer is at least partially secured with adhesive to the first surface of the first oriented strand board and a second surface of the acoustic barrier layer is at least partially secured with adhesive to the first surface of the second oriented strand board;
   wherein, upon the securing of the acoustic barrier layer to the first oriented strand board and the second oriented strand board, the first stepped section and the second stepped section are arranged to form a tongue where the acoustic barrier layer extends from the tongue to form a first rounded bulge, and the first recessed section and the second recessed section are arranged to form a groove where the acoustic barrier layer extends into the groove to form a second rounded bulge.

2. The flooring product of claim 1, wherein the first oriented strand board and second oriented strand board are comprised of high density material.

3. The flooring product of claim 1, wherein the first and second oriented strand boards are each between approximately 0.25 inches and 1.125 inches in thickness.

4. The flooring product of claim 1, wherein the acoustic barrier layer is between approximately 0.0625 inches and 0.25 inches in thickness.

5. The flooring product of claim 1, wherein the density of the acoustic barrier layer is between approximately 0.55 grams/cm$^3$ and approximately 0.72 grams/cm$^3$.

6. The flooring product of claim 1, wherein the flooring product meets or exceeds a rating of 50 when tested by the standards of the Sound Transmission Class test.

7. The flooring product of claim 1, wherein the flooring product meets or exceeds a rating of 50 when tested by the standards of the Impact Insulation Class test.

8. A flooring system comprising:
    a plurality of flooring products, each flooring product comprising:
        a first oriented strand board comprising:
            a first surface;
            a second surface opposite the first surface;
            a first profiled edge;
            a first stepped section, where the first profiled edge is angled inwardly and extends from the second surface of the first oriented strand board to the first stepped section;
            a second profiled edge opposite the first profiled edge; and
            a first recessed section, where the second profiled edge is angled inwardly and extends from the second surface of the first oriented strand board to the first recessed section;
        a second oriented strand board comprising:
            a first surface;
            a second surface opposite the first surface;
            a third profiled edge;
            a second stepped section, where the second profiled edge is angled inwardly and extends from the second surface of the second oriented strand board to the second stepped section;
            a fourth profiled edge opposite the third profiled edge; and
            a second recessed section, where the fourth profiled edge is angled inwardly and extends from the second surface of the first oriented strand board to the second recessed section;
        an acoustic barrier layer positioned between the first oriented strand board and the second oriented strand board, where a first surface of the acoustic barrier layer is secured with adhesive to the first surface of the first oriented strand board and a second surface of the acoustic barrier layer is secured with adhesive to the first surface of the second oriented strand board;
        wherein, upon the securing of the acoustic barrier layer to the first oriented strand board and the second oriented strand board, the first stepped section and the second stepped section are arranged to form a tongue where the acoustic barrier layer extends from the tongue to form a first rounded bulge, and the first recessed section and the second recessed section are arranged to form a groove where the acoustic barrier layer extends into the groove to form a second rounded bulge;
    wherein, when two flooring products are assembled such that the tongue of a first flooring products is inserted into the groove of a second flooring product, the first rounded bulge of the first flooring product is in contact with the second rounded bulge of the second flooring product.

9. The flooring product of claim 8, wherein the first oriented strand board and second oriented strand board are comprised of high density material.

10. The flooring product of claim 8, wherein the first and second oriented strand boards are each between approximately 0.25 inches and 1.125 inches in thickness.

11. The flooring product of claim 8, wherein the acoustic barrier layer is between approximately 0.0625 inches and 0.25 inches in thickness.

12. The flooring product of claim 8, wherein the density of the acoustic barrier layer is between approximately 0.55 grams/cm$^3$ and approximately 0.72 grams/cm$^3$.

13. The flooring product of claim 8, wherein the flooring product meets or exceeds a rating of 50 when tested by the standards of the Sound Transmission Class test.

14. The flooring product of claim 8, wherein the flooring product meets or exceeds a rating of 50 when tested by the standards of the Impact Insulation Class test.

* * * * *